(12) United States Patent
Schwaiger

(10) Patent No.: US 11,727,611 B2
(45) Date of Patent: *Aug. 15, 2023

(54) SYSTEM AND METHOD FOR PROVIDING A RELATIONAL TERRAIN FOR SOCIAL WORLDS

(71) Applicant: Jim Schwaiger, Huron, SD (US)

(72) Inventor: Jim Schwaiger, Huron, SD (US)

( * ) Notice: Subject to any disclaimer, the term of this patent is extended or adjusted under 35 U.S.C. 154(b) by 151 days.

This patent is subject to a terminal disclaimer.

(21) Appl. No.: 17/346,145

(22) Filed: Jun. 11, 2021

(65) Prior Publication Data

US 2021/0407157 A1 Dec. 30, 2021

Related U.S. Application Data

(63) Continuation of application No. 16/914,252, filed on Jun. 26, 2020, now Pat. No. 11,055,885.

(51) Int. Cl.
*G06T 11/20* (2006.01)
*A63F 13/5378* (2014.01)
*A63F 13/533* (2014.01)

(52) U.S. Cl.
CPC .......... *G06T 11/206* (2013.01); *A63F 13/533* (2014.09); *A63F 13/5378* (2014.09); *A63F 2300/307* (2013.01); *A63F 2300/308* (2013.01); *G06T 2200/24* (2013.01)

(58) Field of Classification Search
CPC .... A63F 13/822; A63F 13/795; A63F 13/352; A63F 13/533; A63F 13/5378; A63F 2300/307; A63F 2300/308; G06T 11/206; G06T 2200/24; G06T 17/05; G06T 2210/36; G06T 11/203; G06T 15/10; G06T 2210/56; G06F 16/29; G06F 3/04815; G06F 16/9035; G01C 21/32; G01C 21/3697
See application file for complete search history.

(56) References Cited

U.S. PATENT DOCUMENTS

| | | |
|---|---|---|
| 8,485,897 B1 | 7/2013 | Marsland et al. |
| 2002/0069018 A1 | 6/2002 | Brueckner et al. |
| 2012/0001915 A1 | 1/2012 | Peterson |
| 2014/0114845 A1 | 4/2014 | Rogers et al. |
| 2015/0105147 A1* | 4/2015 | Franzas ................ A63F 13/833 463/31 |
| 2017/0007925 A1 | 1/2017 | Archer |
| 2017/0340971 A1* | 11/2017 | Schwaiger ............. A63F 13/20 |
| 2017/0358057 A1* | 12/2017 | Dexter .................. G06T 11/001 |
| 2019/0262715 A1* | 8/2019 | Ohashi .................. A63F 13/795 |

* cited by examiner

*Primary Examiner* — Xilin Guo
(74) *Attorney, Agent, or Firm* — John Rizvi; John Rizvi, P.A.—The Patent Professor ®

(57) ABSTRACT

A relational terrain for social {/virtual} worlds is provided. A user owned property (villa) may be composed of one or more terrain masses (tiles). Relational links may be established between a villa and multiple other villas. Relational maps display a villa and the villas with which it has relational links. Villas exist in relational space which reflects the relations between villas, and allows a villa to be in more than one location at the same time, maximizing interaction and property value. A portal can be created to support specialized functionality/interaction, allowing data to be passed and/or changed when a user moves from one villa to a (destination villa/another).

13 Claims, 40 Drawing Sheets

2100

Positive .... Negative

Casual ...... Dislike

Like ........ Contempt

Love ........ Disgust

Passionate . . . Scorn

Obsessed . . . . Revile

2500

+Friends .... +Interests .... +Visited .... +Associated .... +Visitors

2600B

2800A

SYSTEM AND METHOD FOR PROVIDING A RELATIONAL TERRAIN FOR SOCIAL WORLDS

CROSS-REFERENCE TO RELATED APPLICATIONS

The present continuation patent application claims priority benefit of the [U.S. nonprovisional patent application [PCT international patent application designating the United States] Ser. No. 16/914,252, 26 Jun. 2020, System and Method for Providing a Relational Terrain for Social Worlds under 35 U.S.C. 120. The contents of this/these related patent application is incorporated herein by reference for all purposes to the extent that such subject matter is not inconsistent herewith or limiting hereof.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to the virtual definition of terrain in multi-dimensional space based on social relationships relative to adjacent and/or other virtual terrain by sacrificing rigid adherence to traditional fixed terrain. More particularly, certain embodiments of the invention relate to further developments regarding relational databases, as embodied by software routines and/or modules that are at least partially executed by computer hardware. Directional relational links, e.g., as related to provider a user and/or game player access to specified virtual areas may be routine in database applications, where computer databases may reside in such virtual space, providing accessibility to users and potentially subjecting the same to defined rules governing their respective access to certain virtual areas.

Nevertheless, currently available techniques fail to base positioning of virtual worlds and/or terrain therein by implementing maps using relational approach and thus continue to rely on map locations as being related or otherwise dictated by their once-set physical positions, e.g., possibly permitting for repositioning of map elements but still adhering to an initial positioning based on physical map placement. The notion of presenting a virtual map as a type of freely reconfigurable mosaic based on relationships between participants has yet to be discussed in the art. Generating and using virtual maps as a fluid mosaic may facilitate a next step of considering relationships, e.g., social relationships, as defined between individual tiles, where such definitions may also be fluid and relational rather than based on rigid physical position.

Facebook is a particular example where the use of relational space may be used to relate other users. On Facebook, for example, almost everyone is relatively social, and a huge number of games compete with each other for a tiny share of the smaller population of people interested in seriously playing games. The present invention more generally defines, in virtual worlds, user owned properties, e.g., villas that exist in relational space. Villas relate to each other not through physical location but through relations (relational links). Each villa may have relations with numerous other villas of interest, which is functionally similar to placing the villa near its points of interest. Thus, the present invention is applicable to social interactions and virtual real estate/ social worlds.

Available video and/or computer games may provide for fictional empires for their players, e.g., Clash of Clans, where such empires have no true position or fixed positional relationships with other empires. These empires may then be intermittently repositioned to become adjacent to another empire (often based on similar size/rating) for combat, but such a scheme does not attempt to create persistent, long-standing, relations between empires as proposed by the presently disclosed embodiments, but rather transitory agglomerations of characters, objects and/or virtual land, etc.

Available video games and popular social media platforms do not provide for building social worlds using relational space to facilitate user-owned real estate. Such a general purpose social world as envisioned herein may be adapted for an innumerable number of end-use cases and conditions. Further, such an environment is fundamentally dissimilar from social media platforms such as Facebook®, which may be considered to be a huge virtual world built from text and pictures, running almost exclusively on social relationships, but without provisions for navigation therein a spatial dimension.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Systems and processes use pheromones, e.g., defined as a secreted or excreted chemical factor that triggers a social response in members of the same species, propagation to provide direction and/or distance information to a remote destination through the use of localized decision making processes. Locally available information may be exchanged and translated with global information through the use of a pheromone vocabulary and multi-layer grid systems. Self-organizing networks of sensors provide remote monitoring of a space.

By way of educational background, another aspect of the prior art generally useful to be aware of includes the mapping of spatial data to linear indexing for efficient computational storage, retrieval, integration, transmission, visual display, analysis, fusion, and modeling. Such innovations may be based on space being decomposed into uniform discrete closely packed (hexagonal) cell areas. Each resolution of close-packed cells can be further divided into incongruent but denser clusters of close-packed cells. Spatial indexing may be applied to build a relationship with the spatially close cells of any resolution.

Yet another aspect of the prior art relates to systems and methods of rendering a three-dimensional ("3D") virtual environment rendering, the system having a central processing device, a plurality of user devices in data communication with the central processing device, a plurality of application servers in data communication with the central processing device, and software executing on the central processor. The software creates and renders a 3D virtual environment, receives user data from each of the plurality of user devices, and renders the user data received from each of the user devices in the 3D virtual environment. The software further receives application data from each of the application servers, renders the application data received from each of the application servers in the 3D virtual environment, and outputs the rendered 3D virtual environment to each of the user devices. The 3D virtual environment serves as a direct user interface with the Internet by allowing users to visually navigate the World Wide Web.

Prior art further relates to a method of placing game objects in a game, the method including receiving user input that indicates a desired placement of a new game object at a target location in a virtual in-game environment of the computer-implemented game.; The new game object is identified as a current game object for processing thereof by: using one or more computer processors, determining for the current game object a set of proximate game objects which are within a threshold distance from the current game object; and adapting a property of the current game object based upon the set of proximate game objects within the threshold proximity distance; and, for each particular game object in the set of proximate game objects, identifying that particular game object as the current game object and recursively processing the current game object.

By way of educational background, other prior art discusses a system, computer-readable storage medium storing at least one program, and a computer-implemented method for providing branded virtual objects in a virtual environment. A graphical user interface is provided to a requestor device, where a request is received therefrom to present a branded virtual object to a player of a multiplayer online game. During rendering of the online game, a request is received from the player to locate a virtual object in a virtual environment of the player in the online game, and the player is presented with an option to select the branded virtual object for placement in the virtual environment, The branded virtual object may be inserted in the virtual environment at a placement position in the virtual environment selected by the player responsive to the player selecting the branded virtual object, and a selection count associated with the branded virtual object is updated.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
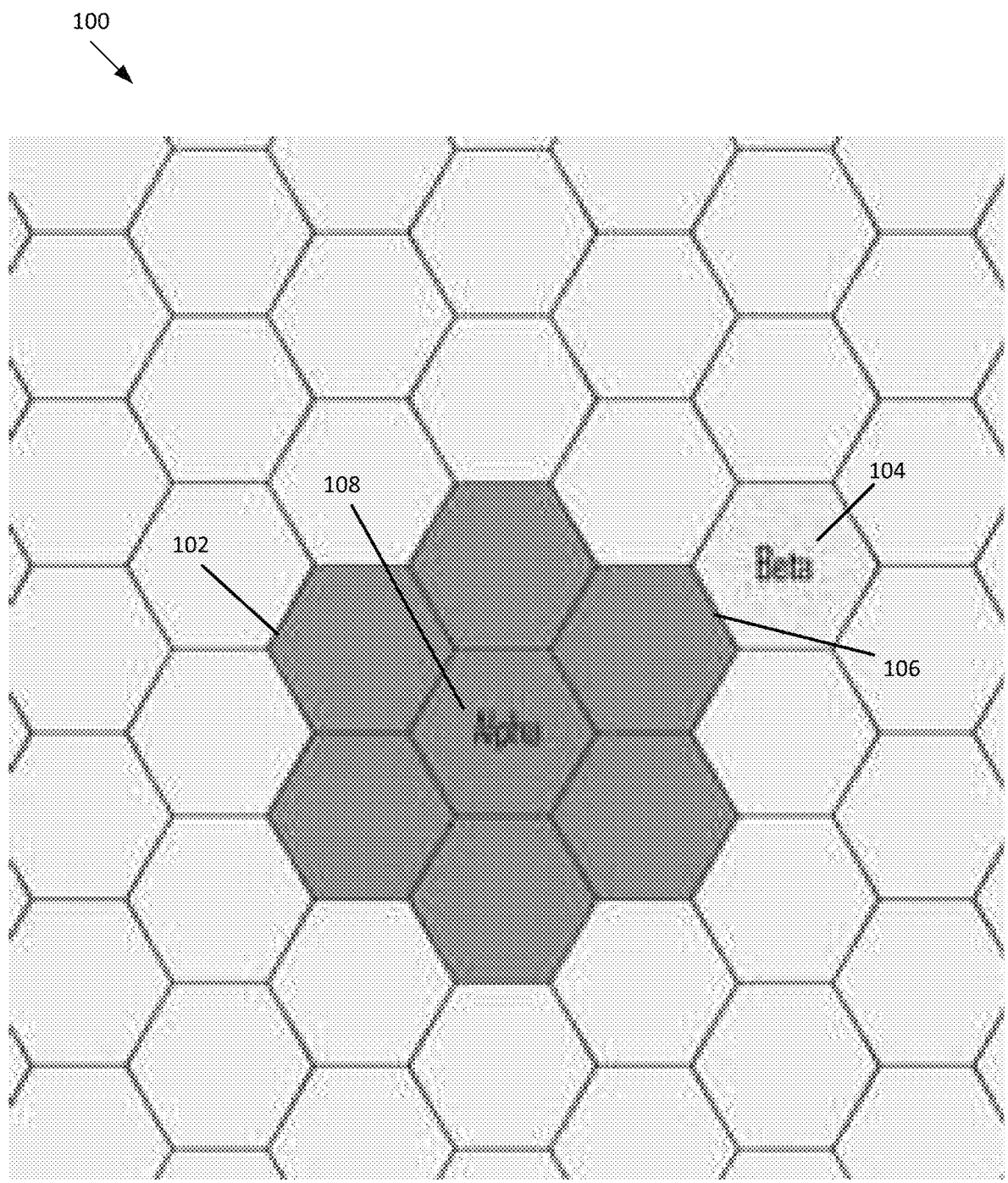
FIG. 1 illustrates an exemplary schematic diagram of a "villa", and any associated villas, in a simple "VillaView", in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially The ordinary meaning of "substantially halfway" is thus reasonably close to or nearly at the midpoint between the forward most point of the upper or outsole and the rearward most point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.'" The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, are generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction with, some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

While embodiments herein may be discussed in terms of a processor having a certain number of bit instructions/data, those skilled in the art will know others that may be suitable such as 16 bits, 32 bits, 64 bits, 128s or 256 bit processors or processing, which can usually alternatively be used. Where a specified logical sense is used, the opposite logical sense is also intended to be encompassed.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™, or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., web site owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

Definitions

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "digital environment" and/or a "digital medium environment" may refer to integrated communication environments where electronic or "digital" devices are the tools that communicate and manage the content and activities within them. The concept is based on digital electronics systems which are integrated and implemented for a global community. A major component of a digital environment generally includes a comprehensive presence within the Internet, including: websites, cloud servers, search engines, social media outlets, mobile apps, audio and video, and other web-based resources.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM®, MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

The term "video game" as referred to herein implies an electronic game that involves interaction with a user interface to generate visual feedback on a two- or three-dimensional video display device such as a TV screen, virtual reality headset or computer monitor. Since the 1980s, video games have become an increasingly important part of the entertainment industry, and whether they are also a form of art is a matter of dispute. The electronic systems used to play video games are called platforms. Video games are developed and released for one or several platforms and may not be available on others. Specialized platforms such as arcade games, which present the game in a large, typically coin-operated chassis, were common in the 1980s in video arcades, but declined in popularity as other, more affordable platforms became available. These include dedicated devices such as video game consoles, as well as general-purpose computers like a laptop, desktop or handheld computing devices. The input device used for games, the game controller, varies across platforms. Common controllers include gamepads, joysticks, mouse devices, keyboards, the touchscreens of mobile devices, or even a person's body, using a Kinect sensor. Players view the game on a display device such as a television or computer monitor or sometimes on virtual reality head-mounted display goggles. There are often game sound effects, music and voice actor lines which come from loudspeakers or headphones. Some games in the 2000s include haptic, vibration-creating effects, force feedback peripherals and virtual reality headsets.

The term "computer graphics" as referred to herein implies pictures and films created using computers. Usually, the term refers to computer-generated image data created with the help of specialized graphical hardware and software. It is a vast and recently developed area of computer science. The phrase was coined in 1960, by computer graphics researchers Verne Hudson and William Fetter of Boeing. It is often abbreviated as CG, though sometimes erroneously referred to as computer-generated imagery (CGI). Some topics in computer graphics include user interface design, sprite graphics, vector graphics, 3D modeling, shaders, GPU design, implicit surface visualization with ray tracing, and computer vision, among others. The overall methodology depends heavily on the underlying sciences of geometry, optics, and physics. Computer graphics is responsible for displaying art and image data effectively and meaningfully to the consumer. It is also used for processing image data received from the physical world. Computer graphics development has had a significant impact on many types of media and has revolutionized animation, movies, advertising, video games, and graphic design in general.

The term "3D reconstruction" as referred to herein implies the process of capturing the shape and appearance of real objects. This process can be accomplished either by active or passive methods. If the model is allowed to change its shape in time, this is referred to as non-rigid or spatio-temporal reconstruction.

The term "user interface (UI)" as referred to herein implies the industrial design field of human-computer interaction, is the space where interactions between humans and machines occur. The goal of this interaction is to allow effective operation and control of the machine from the human end, whilst the machine simultaneously feeds back information that aids the operators' decision-making process. Examples of this broad concept of user interfaces include the interactive aspects of computer operating systems, hand tools, heavy machinery operator controls, and process controls. The design considerations applicable when creating user interfaces are related to or involve such disciplines as ergonomics and psychology. Generally, the goal of user interface design is to produce a user interface which makes it easy, efficient, and enjoyable (user-friendly) to operate a machine in the way which produces the desired result. This generally means that the operator needs to provide minimal input to achieve the desired output, and also that the machine minimizes undesired outputs to the human. User interfaces are composed of one or more layers including a human-machine interface (HMI) interfaces machines with physical input hardware, such a keyboards, mice, game pads, and output hardware, such as computer monitors, speakers, and printers. A device that implements a HMI is called a human interface device (HID). Other terms for human-machine interfaces are man-machine interface (MMI) and when the machine in question is a computer human-computer interface. Additional UI layers may interact with one or more human sense, including: tactile UI (touch), visual UI (sight), auditory UI (sound), olfactory UI (smell), equilibrial UI (balance), and gustatory UI (taste).

The term "user interface design (UI) or user interface engineering" as referred to herein implies The term "cloud computing" as referred to herein implies the design of user interfaces for machines and software, such as computers, home appliances, mobile devices, and other electronic devices, with the focus on maximizing usability and the user experience. The goal of user interface design is to make the user's interaction as simple and efficient as possible, in terms of accomplishing user goals (user-centered design). Good user interface design facilitates finishing the task at hand without drawing unnecessary attention to itself. Graphic design and typography are utilized to support its usability, influencing how the user performs certain interactions and improving the aesthetic appeal of the design; design aesthetics may enhance or detract from the ability of users to use the functions of the interface. The design process must balance technical functionality and visual elements (e.g., mental model) to create a system that is not only operational but also usable and adaptable to changing user needs. Interface design is involved in a wide range of projects from computer systems, to cars, to commercial planes; all of these projects involve much of the same basic human interactions yet also require some unique skills and knowledge. As a result, designers tend to specialize in certain types of projects and have skills centered on their expertise, whether it is a software design, user research, web design, or industrial design.

The term "cloud computing" as referred to herein implies the on-demand availability of computer system resources, especially data storage and computing power, without direct active management by the user. The term is generally used to describe data centers available to many users over the Internet. Large clouds, predominant today, often have functions distributed over multiple locations from central servers. If the connection to the user is relatively close, it may be designated an edge server. Clouds may be limited to a single organization (enterprise clouds), be available to many organizations (public cloud), or a combination of both (hybrid cloud). Cloud computing relies on sharing of resources to achieve coherence and economies of scale. Advocates of public and hybrid clouds note that cloud computing allows companies to avoid or minimize up-front IT infrastructure costs. Proponents also claim that cloud computing allows enterprises to get their applications up and running faster, with improved manageability and less maintenance, and that it enables IT teams to more rapidly adjust resources to meet fluctuating and unpredictable demand. Cloud providers typically use a "pay-as-you-go" model, which can lead to unexpected operating expenses if administrators are not familiarized with cloud-pricing models. The availability of high-capacity networks, low-cost computers and storage devices as well as the widespread adoption of hardware virtualization, service-oriented architecture and autonomic and utility computing has led to growth in cloud computing. By 2019, Linux was the most used type of operating systems used, including in Microsoft's offerings and is thus described as dominant.

The term "Minecraft" as referred to herein implies a sandbox video game created by Swedish game developer Markus Persson and released by Mojang in 2011. The game allows players to build with a variety of different blocks in a 3D procedurally generated world, requiring creativity from players. Other activities in the game include exploration, resource gathering, crafting, and combat. Multiple game modes that change gameplay are available, including—but not limited to—a survival mode, in which players must acquire resources to build the world and maintain health, and a creative mode, where players have unlimited resources to build with. The Java Edition of the game allows players to modify the game with mods to create new gameplay mechanics, items, textures and assets.

The term "social media" as referred to herein implies interactive computer-mediated technologies that facilitate the creation and sharing of information, ideas, career interests and other forms of expression via virtual communities and networks. The variety of stand-alone and built-in social media services currently available introduces challenges of definition; however, there are some common features: Social media are interactive Web 2.0 Internet-based applications. User-generated content, such as text posts or comments, digital photos or videos, and data generated through all online interactions, is the lifeblood of social media. Users create service-specific profiles for the website or app that are designed and maintained by the social media organization. Social media facilitate the development of online social networks by connecting a user's profile with those of other individuals or groups. Users usually access social media services via web-based technologies on desktops and laptops, or download services that offer social media functionality to their mobile devices (e.g., smartphones and tablets). As users engage with these electronic services, they create highly interactive platforms through which individuals, communities, and organizations can share, co-create, discuss, participate and modify user-generated content or premade content posted online. Networks formed through social media change the way groups of people interact and communicate or stand with the votes. They "introduce substantial and pervasive changes to communication between organizations, communities, and individuals." These changes are the focus of the emerging fields of technoself studies. Social media differ from paper-based media (e.g., magazines and newspapers) and traditional electronic media such as TV broadcasting, Radio broadcasting in many ways, including quality, reach, frequency, interactivity, usability, immediacy, and performance. Social media outlets operate in a dialogic transmission system (many sources to many receivers). This is in contrast to traditional media which operates under a mono-logic transmission model (one source to many receivers), such as a newspaper which is delivered to many subscribers, or a radio station which broadcasts the same programs to an entire city. Some of the most popular social media websites, with over 100 million registered users, include Facebook (and its associated Facebook Messenger), YouTube, WeChat, Instagram, QQ, QZone, Weibo, Twitter, Tumblr, Telegram, Reddit, Baidu Tieba, LinkedIn, LINE, Snapchat, Pinterest, Viber, MeWe, and VK. Observers have noted a range of positive and negative impacts of social media use. Social media can help to improve an individual's sense of connectedness with real or online communities and can be an effective communication (or marketing) tool for corporations, entrepreneurs, non-profit organizations, advocacy groups, political parties, and governments.

The term "Facebook, Inc." as referred to herein implies an American online social media and social networking service company based in Menlo Park, Calif. The founders initially limited the website's membership to Harvard students and subsequently Columbia, Stanford, and Yale students. Membership was eventually expanded to the remaining Ivy League schools, MIT, and higher education institutions in the Boston area, then various other universities, and lastly high school students. Since 2006, anyone who claims to be at least 13 years old has been allowed to become a registered user of Facebook, though this may vary depending on local laws. The name comes from the face book directories often given to American university students. Facebook makes most of its revenue from advertisements that appear onscreen and in users' News Feeds. The Facebook service can be accessed from devices with Internet connectivity, such as personal computers, tablets and smartphones. After registering, users can create a customized profile revealing information about themselves. They can post text, photos and multimedia which is shared with any other users that have agreed to be their "friend". Users can also use various embedded apps, join common-interest groups, and receive notifications of their friends' activities. Facebook offers other products and services. It acquired Instagram, WhatsApp, Oculus, and GrokStyle and independently developed Facebook Messenger, Facebook Watch, and Facebook Portal.

The term "Instagram" as referred to herein implies a photo and video-sharing social networking service owned by Facebook, Inc. It was created by Kevin Systrom and Mike Krieger, and launched in October 2010 exclusively on iOS. A version for Android devices was released a year and half later, in April 2012, followed by a feature-limited website interface in November 2012, and apps for Windows 10 Mobile and Windows 10 in April 2016 and October 2016 respectively. The app allows users to upload photos and videos to the service, which can be edited with various filters, and organized with tags and location information. An account's posts can be shared publicly or with pre-approved followers. Users can browse other users' content by tags and locations, and view trending content. Users can "like" photos, and follow other users to add their content to a feed.

The term "Snapchat" as referred to herein implies a multimedia messaging app used globally. One of the principal features of Snapchat is that pictures and messages are usually only available for a short time before they become inaccessible to their recipients. The app has evolved from originally focusing on person-to-person photo sharing to presently featuring users' "Stories" of 24 hours of chronological content, along with "Discover", letting brands show ad-supported short-form content.

The term "avatar" as referred to herein implies the graphical representation of the user or the user's alter ego or character. An icon or figure representing a particular person in a video game, Internet forum, etc. It may take either a three-dimensional form, as in games or virtual worlds, or a two-dimensional form as an icon in Internet forums and other online communities. Avatar images have also been referred to as "picons" (personal icons) in the past, though the usage of this term is uncommon now. It can also refer to a text construct found on early systems such as MUDs. The term "avatar" can also refer to the personality connected with the screen name, or handle, of an Internet user.

The term "physical space" as referred to herein implies where people live and work. Physical space does not exist in a conventional sense in virtual, e.g., computer-based, worlds, although simulation of physical space may be possible in virtual worlds, as are other types of boundaries and/or spaces. In the context of depicting social relationships in a virtual space-based world, usage of "relational space" may be possible in such a virtual world, which can be occupied by people and places. Such "relational maps" may use relational terrain to assist in the identification of location in relational space, and how we relate to people and places there.

The term "physical location" as referred to herein implies a point or an area on the Earth's surface or elsewhere in physical space. The term location generally implies a higher degree of certainty than place, the latter often indicating an entity with an ambiguous boundary, relying more on human or social attributes of place identity and sense of place than on geometry.

The term "physical maps" as referred to herein implies a symbolic depiction emphasizing physical relationships between elements in physical space, such as objects, regions, or themes. Many maps are static, fixed to paper or some other durable medium, while others are dynamic or interactive. Although most commonly used to depict geography, maps may represent any space, real or fictional, without regard to context or scale, such as in brain mapping, DNA mapping, or computer network topology mapping. The space being mapped may be two dimensional, such as the surface of the earth, three dimensional, such as the interior of the earth, or even more abstract spaces of any dimension, such as arise in modeling phenomena having many independent variables.

The term "physical terrain" as referred to herein implies involves the vertical and horizontal dimensions of land surface. The term bathymetry is used to describe underwater relief, while hypsometry studies terrain relative to sea level. The Latin word terra (the root of terrain) means "earth." In physical geography, terrain is the lay of the land. This is usually expressed in terms of the elevation, slope, and orientation of terrain features. Terrain affects surface water flow and distribution. Over a large area, it can affect weather and climate patterns. In the usual understanding, one can walk or otherwise travel upon land in physical terrain, one can float upon the sea and even go under the surface of the water.

The term "relational view" as referred to herein implies a focused or filtered view of relational space, allowing the viewer to concentrate on a subset of the world relevant to the user, for better clarity, and allows for more efficient use of resources (including display space and data transmission). (This is analogous to using a map with a route finding application which focuses on the streets we must travel to our destination rather than every house in the city.)

The term "VillaView" as referred to herein implies the display of terrain of a single villa along with any associated villas.

The term "inbound view" is from the perspective of associated villas looking into the reference villa, e.g., equivalent to the VillaView.

The term "WorldView" as referred to herein implies looking out a window of a villa to see all of the other villas relevant to user interests.

The term "outbound view" implies looking out of a given villa window in a world of villas toward villas of interest to a user. In terms familiar to usual understanding, the user can look out his window and see all of his neighbors.

The term "virtual world" implies a computer-based simulated environment which may be populated by many users who can create a personal avatar, and simultaneously and independently explore the virtual world, participate in its activities and communicate with others. These avatars can be textual, two or three-dimensional graphical representations, or live video avatars with auditory and touch sensations. In general, virtual worlds allow for multiple users but single player computer games, such as Skyrim, can also be considered a type of virtual world. The user accesses a computer-simulated world which presents perceptual stimuli to the user, who in turn can manipulate elements of the modeled world and thus experience a degree of presence. Such modeled worlds and their rules may draw from reality or fantasy worlds. Example rules are gravity, topography, locomotion, real-time actions, and communication. Communication between users can range from text, graphical icons, visual gesture, sound, and rarely, forms using touch, voice command, and balance senses. Massively multiplayer online games depict a wide range of worlds, including those based on science fiction, the real world, super heroes, sports, horror, and historical milieus. The most common form of such games is fantasy worlds, whereas those based on the real world are relatively rare. Most massively multiplayer online games have real-time actions and communication. Players create a character that travels between buildings, towns, and worlds to carry out business or leisure activities. Communication is usually textual, but real-time voice communication is also possible. The form of communication used can substantially affect the experience of players in the game. Virtual worlds are not limited to games but, depending on the degree of immediacy presented, can encompass computer conferencing and text-based chatrooms. Sometimes, emoticons or 'smilies' are available to show feeling or facial expression. Emoticons often have a keyboard shortcut.

The term "villa" as referred to herein implies a user's home/real estate in virtual/social worlds. Villas are personal homes (in most cases) but are expansive enough to support larger entities such as schools, companies and government offices. A villa has one or more central terrain masses (tiles), and may have surrounding satellite tiles, which are commonly used for social functions including associated villas (owned by other users).

The term "primary villa" as referred to herein implies the principal villa of a user.

The term "secondary villa" as referred to herein implies another villa that may be placed near the tile of the primary villa, e.g., to express its relation, described as a "visible relation", since the villa may now be seen as an associated villa on the VillaView of the primary villa. A secondary villa can also express a "silent relation" with a primary villa that is not visible from the VillaView of the primary villa. This silent relation can be seen from the WorldView of the primary villa owner, but is not visible to others.

The term "fixed mosaic terrain" as referred to herein implies a map that may be viewed as a picture made from multiple smaller terrain areas (tiles) which are fixed in position and spatial relationships by mortar holding them in place.

The term "fluid mosaic terrain" as referred to herein implies terrain tiles like fixed mosaic terrain, but are fluid since figurative "mortar" used between adjacent tiles is fluid and freely movable, allowing for tiles to move, change size shape, orientation, dimensions, etc. Fluid mosaic maps may be optimally suited for virtual worlds since users, e.g., people, often desire to enter and leave virtual areas and/or interpersonal relationships as per their whim, where such fluidity may create lasting vacant or dormant spaces in a fixed map. Fluid mosaic maps may expand and contract in size, and may fluidly change to reflect the changing relationships of the users—effectively being user-created maps.

The term "tiles" as referred to herein implies multiple smaller terrain areas that are fixed in position and spatial relationships by mortar holding them in place (in fixed mosaic terrain). In fluid mosaic terrain, these tiles are separated by variable amounts of fluid mortar, and are therefore able to change position as well as size and shape.

The term "social worlds and/or social maps" as referred to herein implies virtual worlds and/or maps that are especially well handled by fluid mosaic terrain, rather than traditional fixed terrain.

The term "social operating system and/or social operating framework" as referred to herein implies terrain and relational space is integrated with applications designed to support social interaction.

The term "facebook effect" as referred to herein implies a phenomenon in which people prefer mediocre and amateur content prepared by those who are socially related to them to professionally prepared, higher quality content prepared by strangers. For example, this effect drives billions of contact hours with Facebook while classic literature is barely read relative to Facebook usage.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Introduction

In building upon known concepts regarding social networking, digital media, navigation, virtual world creation and related topics, the development and/or creation of a user-navigable virtual map comprised of numerous user owned tiles that exist in a relational space reflecting user inter-personal relationships represents a desirable evolution and integration of that currently available, seeking to address user social needs in an entertaining and educational way. Virtual maps may be generated and displayed, e.g., being composed of uniform geometric shapes referred to as tiles. However, tiles are often composed of smaller positional elements which have uniform shapes and sizes, e.g. hexes, squares or cubes {cubes implies a 3D potential}. However, since tiles are usually composed of multiple positional elements, tiles can have highly variable size and shape, and be quite irregular and nonuniform, since they are created by users to meet their own needs Tiles describe the individual elements in a mosaic map, and each tile may be owned by a user. However, a user tile in the global map (which we generally refer to as a "villa") can actually be composed of multiple individual tiles (and potentially fluid mosaic tiles). The global map of the world is also a fluid mosaic, and the local map of the user's villa may also be a fluid mosaic. If a user's villa comprised a single contiguous tile, it would not actually be fluid, but some user's will desire the flexibility of a fluid mosaic within their own villas for a variety of reasons. A user villa may be composed of one or more central tiles, and (optional) one or more satellite tiles. The villa with all of these user defined tiles is the user's online home, and may have relations with multiple other villas that define its place in the virtual (relational) map. Those skilled in the art will recognize that "villa", as defined earlier, and referred to herein, implies a user's home/real estate in virtual/social worlds. Relational maps are thus displayed based on social relationships between villas, e.g., as associated with their respective freely-movable tiles, rather than by an arbitrary physical and/or fixed location as would be displayed on a physical map, such a virtual model being termed herein as "relational terrain". Therefore, in a virtual world and/or context, a user tile, e.g., where a tile may reflect a villa, may be present and/or accessible in many virtual places simultaneously, reflecting all desired social relationships of that particular virtual world participant and/or user. Accordingly, an interested user can maximize the value of his real estate by placing the villa near all of the user's interests. Moreover, users may design and create their own custom villas (e.g., virtual and/or online homes), and by placing their villas next to other villas, effectively creating and maintaining relational maps associated therewith. Individual user focused relational maps remain relevant to user needs as they reflect (e.g., and may be constantly updated in real-time based on user entrance and participation in the virtual world) user-created content and user relationships.

User-Owned Properties—Villas

To summarize, user-owned properties (e.g., villas) exist in relational space as established by a virtual and/or online world, where individual villas relate to each other not through their respective physical locations but rather through their relative relations (e.g., as established by relational links). Each villa may have social relations with numerous other villas of interest (e.g., of interest to the user-owner of that particular villa, who may define his, her, their, or its interests). Such a definition of interest may be functionally similar to placing that villa near points of interest of its user-owner. Through this method, a villa may be perceived (e.g., visually and/or virtually) to exist in more than one physical location at the same time, e.g., depending on the perspective and/or view point of who is viewing and/or searching for that particular villa. Accordingly, such relational maps may show a villa with its associated and/or related villas. Like conventional maps, relational maps show users where they are in relation to where they intend to travel (e.g., related villas). A villa may be composed of one or more terrain masses (e.g., tiles) which are loosely associated without fixed position, referred to as fluid mosaic terrain. Relations are philosophically directional, although it is true that they can run in both directions. When two people are "mutual friends", each person "relates" to the other with two separate directional relations. But in our virtual worlds we must acknowledge that relations are not always mutual, not always equal, and not always bidirectional. Herein the term "relate" will be used to describe how a villa relates in the outgoing direction to another villa. A villa (in relational space) near another villa to express my interest in and relation to that villa. On the other hand, if the user is looking at a villa view, the user's villa tiles as well as those villas that are (inbound) relating to the user's villa are shown, These are referred to as "associated" villas. One way to illustrate this would be to consider the extreme case, e.g., a singing or movie star. The star may have millions of fans who adore the star and listen to their music. If we were to look at the star's villa, thousands of villas with inbound relations to the star may be observed. These are referred to as "associated" villas, because they are "associated" with the star's villa. Nobody would expect the star to relate individually to thousands of fans, who are, after all, strangers. But they are, nonetheless, "associated" with the star because they chose to place their villas adjacent to the (public) tile(s) in the star's villa where such association is allowed. On the other hand, the star may have personal friends, as well as important business and family relationships. They can express these with the outbound "relations" by placing their villa near friends, business partners, etc. The star might say they are "relating" to these other villas, and the other villas (from their perspective) would say that the star is "associated" with them. Thus, the term "association" to refer to incoming relations (perspective in the system is always relative to a specific villa). Outbound relationships of a villa (the villas that the user chooses to place themselves near) are referred to as "relations" or sometimes "relational links".

To clarify the notion of tiles with respect to mosaic terrain, and how this relates to relational space, a map of the world may be viewed as being a mosaic of numerous individual tiles. However, villas here refer to the individual tiles in the world map. How these villas relate to each other, e.g., their social "relations", defines where they are in "relational space". A user refers to a relational map to define how the user gets from the current location, e.g., the villa the user is currently owning/visiting, to where the user wants to go, by using relations. In this sense, relations can be seen as similar to the physical world expression "how I get from point A to point B?" In relational space, the points are not the focus of interest, but rather "How I get from Villa A to Villa B?", and this link is the relation defined between the two. Fortunately, through the magic of virtual space, this link can place them "next" to each other in a relational map. Now that relations between villas are defined, the picture may be complicated by saying that a villa can be composed of one or more tiles, e.g., the villa, itself, is a fluid mosaic map. However, for the purpose of "global" relational maps, each of the villas can be considered a "point" or "tile" within the global mosaic, and, for the moment, the fact that each villa is itself composed of one or more tiles may be ignored. It is easier to think of "global" (relational) mosaic maps composed of villas functioning as tiles, and then, as a separate proposition, understand that each individual villa is composed of one or more tiles in its "local" map. A physical space analogy would be a global map of numerous countries, where each country is a tile within the global mosaic. But when each country is considered, and in this case, the analog is the villa, each country is actually composed of multiple provinces. Thus, France may be represented on a map of Europe without actively thinking or knowing about the dozen or more provinces (tiles) that make up the country. The easily changeable nature of fluid mosaic terrain and relational links may be well suited to virtually representing easily-changeable social relationships, e.g., as dependent on the moods and/or preferences of the user-owners of given villas in real-time. In some embodiments, villas may be implemented with purely fixed terrain, and thus not necessarily rely on multiple floating terrain masses.

Fixed Terrain and Fluid Terrain Maps

Regarding such a circumstance, a traditional fixed terrain map represents the fixed terrain from the real world in which people live. Therefore, people are familiar with various compromises required by multiple potentially conflicting interests provided that a traditional brick-and-mortar home has a fixed location. Accordingly, people may choose to be near their work, but doing so may otherwise inadvertently place them farther from their school, or desirable recreational areas. Overall, any location we choose as home will likely be near some points of interest, but also farther away from others, as physically being present in two or more locations simultaneously is impossible in a traditional fixed terrain world.

Virtually-implemented solutions disclosed herein begin by focusing on known functionality of maps, e.g., to provide present location information relative to intended destination information. In using a traditional fixed map in the real world, it may be necessary to plot numerous paths from a start location to various places and people intended to visit, e.g., to account for ever-changing traffic and/or weather conditions, as well as the fluctuating nature of inter-personal relationships. Invariably, being in closer physical proximity to certain locations results in being further away from others. In real estate terms, highly valuable locations are simultaneously close to many of the attractions people desire to be near, such as tourist attractions, beautiful parks, prime office locations and so on and so forth, e.g., as reflected in the relatively high real estate costs in principal markets such as New York City and San Francisco.

To provide context as to exactly how a virtual world would evolve from a traditional, e.g., "the real" world, a conventional (fixed terrain) map may be viewed as a mosaic, referred to herein generally as a picture formed from multiple individual tiles. Fixed terrain tiles cannot change their size, shape or position, thus terrain formed from the juxta-positioning of fixed terrain tiles will produce fixed mosaic terrain. Persons may thus rely upon such a fixed terrain map for direction from an origin to a destination location. A fixed terrain map can be printed on paper because like the fixed terrain it represents, the physical relationships do not change. A given building may be torn down to build a new structure, but the spatial relationships are the same.

In contrast to the general description of fixed terrain tiles provided above, fluid mosaic maps, able to be implemented in virtual (relational) worlds, also use tiles of different size, shape and position, but in a fluid, freely-movable and reconfigurable map. Thus, tiles may change their size, shape and position. This flexibility/fluidity yields fluid mosaic terrain.

Real-world analogies of each of the fixed and fluid mosaic terrain may be provided as follows: fixed mosaic terrain tiles may be thought of as being locked together by solid mortar (cement) that prevents their movement or change in size and shape; in contrast thereto, in the fluid mosaic model, tiles are separated by variable amounts of "fluid" (e.g., virtual fluid) mortar that allows for such tiles to float to various different locations as well as change in size and shape.

In such a virtual social world constructed from fluid mosaic terrain, individual tiles and/or villas associated therewith may be freely geographically reconfigurable to maximize social interaction. In the virtual world, as with ordinary real estate, we want to be close to the people and attractions that interest us. In a traditional real world (fixed terrain) context, such preferences result in compromise between establishing geographic proximity to certain locations while being further away from others.

The Virtual World—VillaView and WorldView

To address such real-world physical constraints, this virtual world platform has been proposed to create an ideal world scenario not otherwise physically bounded by traditional notions of matter, space, and time. In such an ideal virtual world, persons (and their "villas") may be "close" to all of the places and people of interest, without having to compromise between one or the other. Such a solution may be achievable by implementing fluid mosaic terrain in a virtual world that permits for the simultaneous virtual presence of a villa near multiple other villas, e.g., representative of multiple places and people of interest.

Thus, in the virtual world context, instead of physical space, a new form of space is proposed and used—relational space, which describes virtual location in relation to articulated interests. In such a virtual relational space, user-owners of villas may seem to be in more than one physical place simultaneously, as it is possible to have more than one inter-personal relationship with one or more persons and/or entities at the same time, e.g., having separate friend circles related to college and professional school, respectively, or sharing hobbies with a romantic partner—the hobbies supplementing the romantic relationship, rather than replacing or otherwise reassessing it, etc. Moreover, in the virtual world disclosed herein, it is possible to place a home, e.g., a villa, near our work, near our school, near our recreation, near our friends, all at the same time, by virtually readjusting depictions of physical distance to eliminate unwanted obstacles. Further, such a virtual world includes multiple view formats, permitting user-owners of villas and/or other participants to view the virtual world inwardly toward their respective villas, e.g., via VillaView, or of the virtual world altogether outwardly from their respective villas, e.g., via WorldView. All points of interest are easily viewable and accessible for optimal user-owner and/or participant convenience.

In the virtual world as described herein, relational space is depicted in a corresponding relational map with relational terrain. Similar to an ordinary map, the relational map may provide information as to where user-owners and/or participants are in relation to people and things of interest. The WorldView is a relational map, showing our interests in relation to a villa, or principal villa, (the WorldView also being referred to as "an outbound view" since the WorldView is representative of looking out a window of a villa).

In contrast to the WorldView, the VillaView is directed inward and shows the villa itself, but also any associated villas that are interested in the villa—essentially showing active relationships there-between. VillaView is considered in inbound view, since it is from the perspective of others who are looking in at the user-owner and/or participant's villa.

Viewing the world through the perspective of an individual villa provides a focused view of its relationships. Such a perspective may be somewhat limited, but in a beneficial way, to relations currently considered relevant, e.g., by the user-owner of the villa. Such a configuration may be considered to be analogous to a special filter on a conventional map of a large city that blurs out unnecessary details and focuses on the actual current location of the viewer and this information may be used to provide navigable directions to reach a friend on the other side of town. Mapping applications do precisely this by drawing a route and providing specific directions, essentially ignoring places and paths that are irrelevant to the task at hand, e.g., providing navigation from a current location to an intended destination. Here, in the virtual world, relational maps use relational terrain to show a given villa and its relevant relations in relational space.

Development of Interactive Virtual Social Worlds

Such sophisticated and interactive virtual social worlds have been largely made possible due to technological advances made over the past 40 years. In the early years of computing, there may have been significant limitations in technology along with a lack of suitable network systems to allow hundreds and thousands of simultaneous users. As the Internet developed, there have been advances regarding the rapid development and deployment of intensely social worlds. Nevertheless, the progress in interactive games may have been less than that first imagined with computer graphics driven innovation being directed in other entertainment sectors, such as first person shooters.

Arguably motivations and inspirations for development regarding realizing social imagination have come from a non-traditional, e.g., non-video game oriented, source—Facebook. Although difficult to be coined a social "world" given that Facebook has no terrain in the classical sense, it is nevertheless an intensely social enterprise fundamentally based on the simple idea of presenting pictures, texts and allowing users to write messages back and forth to each other.

Thus, currently available platforms fail to provide a breakthrough on how to present a virtual world of actually having spatial terrain and user owned real estate.

Historically, a traditional real-life map, e.g., of Europe or of the United States, may be largely unnecessary and/or overly restrictive in a purely virtual world context, which may be assembled and/or created to cater specifically to the whims of, for example, the user population. Originally, a single computer server would be largely unable to store such expansive information as necessary to maintain an entire virtual world, and the task of stitching together plots, from the perspective of world designers and administrators, appears to be an impossible task.

In time, a clue to the solution for creating a purely virtual world may be derived from two seemingly disparate scientific disciplines: (1) evolution (with natural selection); and, (2) computer development (e.g., Linux). Both of these systems achieved immense complexity, but entirely through decentralized, experimental and seemingly uncoordinated development. Both have achieved impressive error-free and greatly reduced error results over time, as both systems have ways to test and reject unsuccessful innovations and incorporate and preserve incremental improvements.

The above examples provide context for successful models for developing systems of enormous complexity with a decentralized trial and error approach. However, challenges in developing and maintaining a large-scale virtual world remain prevalent, as sometimes observable in interactive games regarding their implementation and with user owned terrain, e.g., if users can freely come and go in an ongoing game (where doing so may be analogous to any large scale virtual world).

As discussed earlier, adherence to a 1:1 scale model of the real world will necessarily reproduce all of the drawbacks associated therewith, e.g., forcing a choice between various locations as to where to live and when. Abandoning traditional fixed terrain altogether solves this terrain problem, allowing terrain to be viewed as a fluid mosaic of many individual user owned tiles (any one of which may be created and developed independently). Any of these fluid tiles may be loosely arranged, allowing for the addition and removal from the virtual world without causing catastrophic structural defects, voids and dormant areas.

Sometimes, having particulars suited for 3D applications are desired, while in other circumstances it is not. For example, a user that is interested in computer gaming may prefer navigating a "world" map solely in 3D space. With respect to the global "world" map, which reflects relationships between villas, villas exist in relational space. In this circumstance, villas generally have numerous apparent "physical" locations based on their relations. This fact makes it impossible to represent the global maps in terms of 2D or 3D because these dimensions are relevant to physical space, not relational space. Instead, relational maps, e.g., WorldView, reflect the world from the perspective of a specific villa. Generally, the WorldView is presented as a radial map with the most important relations (villas) being displayed closest to the center. Of course, the "WorldView" does not show the entire world, but merely the portions of the world that are relevant to the villa owner. The villa owner does not want (or need) to see the things that are not of interest, much like a person using a map wants to find out how to get from a current location to a desired location, and is not focused on most things irrelevant to that question.

A more interesting situation relates to presentation of the VillaView (local maps), which display the tiles of the villa as well as villas associated with each tile. There are many excellent choices about the nature of terrain comprising the tiles that often are dictated by the application. Many of the examples depict villa tiles composed of symbolic hexes, rather than more complex building elements (walls, doors, etc.) For most applications, brevity is preferred. A simple symbolic 2D villa can be highly functional for users and expressive for its owner, loading and running quickly, without distracting complex displays and structural features. In other cases, the function of the villa dictates a visual presentation closer to web pages as may be depicted in villas where "terrain" involves web pages with associated villas clustered around the pages. Sometimes a villa owner wants to provide complex structures, including 3D structures, e.g., similar to Minecraft. There may be avatars for users moving about the villa and interacting in real time, e.g., such as models run from World of Warcraft to World of Tanks. Perhaps computer driven animations and other interactive (programmable) functionality are part of the villa content. As designers of the relational world, the enforcement of expectations or restrictions on the villas should not be implemented. In other words, what happens in the villas stays in the villas. Because each villa is a functional unit on its own, it does not rely on how other villas function, now or in the future. This provides tremendous potential and flexibility at the villa level, without being concerned about affecting or "breaking" other villas. Some villas might even preload specialized gaming software for their presentation, perhaps requiring hundreds of megabytes of code and data for their function. According to embodiments of the present invention, the method does not enforce any meaningful restriction on the function of villas, but the use should keep in mind the Facebook effect described earlier. Users are interested in content created by people they know, and Facebook succeeds spectacularly, not by the sophistication of its displays and programmable features, but allowing users to easily and quickly access such content from people that interest them.

Placement of Individual Tiles in the Virtual World

In the fluid mosaic terrain scenario of the virtual world as described above, individual tiles composing the virtual world itself are loosely arranged and able to float to ideal locations, thus allowing for complete flexibility regarding world creation. Such complete flexibility in tile placement and relocation may not always alleviate persistent underlying issues of where to place individual tiles in view of prior commitments, e.g., work, recreational activities, home, etc. Even with floating terrain as implemented in a virtual world, which addresses the problem of users coming and going, it may still be possible to encounter limitations related to physical location. Translating the three-dimensional real world into a two-dimensional virtual world may retain all of the real world's problems—just in two dimensions.

Such limitations may be addressed by a virtual map with freely movable distance depictions, e.g., referred to herein as a "magical" map. In the course of describing how relational space is developed, the construct of a magical map is used, which allows a user to move his interests near his home. These are really just an aid to ease the user into thinking about the function of maps and how they can simplify his life by placing him close to all of his relations. Ultimately, maps of the world are described using the term "relational map", thereby incorporating this functionality, such as a map from the perspective of a specific user/villa, which is essentially a virtual map that works relative to the perspective of its user. Such a map would be perfect just for the user, e.g., the user's house and the user's respective interests. And a different user would use a different map for his own needs. Hence, the term "magical" in view of the idealized configurability reflective of individual user preferences. The magical map may work like "magic", yet remain consistent with the underlying means of handling terrain. In general these maps are referred to as relational maps, representing relational space.

In the context of social relationships being represented by or in a virtual world, the magical map (relational) displays relational space, showing the owner or visitor of one villa how to reach destinations of interest, e.g., work, friends, recreation, schools, etc.

Because individual user properties in this virtual world defined by a magical map are not locked in a real physical fixed position, such properties, e.g., villas, have freedom in size, shape, and content. In relational space, villa owner-users can set up whatever inter-personal and/or inter-entity relationships they want, with no concern at all about the physical location of their villa in relation to their interests. Through the magic of relational space, any given user-owner's villa may be relationally right next to any one or more of their interests, simultaneously. Such freedom permits for the user-owner to create "beautiful" surroundings pursuant to his, her, their, or its individual interests, e.g., a nature-lover may create a general world map of a stunning natural park, complete with dramatic mountains, steep ravines, rivers, and/or the like; or, a city lover may recreate a tremendous metropolis on par with the real world's greatest cities, etc. Accordingly, well designed virtual properties, e.g., villas, may be praised and encouraged by other users, and emerge to prominence as others share their appreciation. Likewise, deficient and/or poorly designed properties may languish in obscurity where many will either eventually improve or disappear altogether.

The "Facebook Effect"

Relevant to identifying appealing outlets for social interaction, a phenomenon has occurred over time in which people generally prefer mediocre and/or objectively inferior content prepared by those who are socially related to them, e.g., identifiable and accessible, on some level, rather than professionally prepared, objectively higher quality content prepared by strangers, e.g., as evidenced by billions of contact hours on Facebook while classic literature is rarely consumed in comparison. By providing an accessible, real-world replicating virtual world platform that removes many of the physical and/or dimensional obstacles observed in the real world, people are now able to address their social interaction needs and relational relevance as, for example, also a way of increasing user perception of content quality.

Potential Variants and/or Applications

The versatility of the virtual world as described herein may be adapted for an innumerable range of end-uses and/or applications including any one or more of the following: creating a new social media platform navigable by participants in a virtual multi-dimensional space; companies with a strong cloud business, e.g., Microsoft®, Google®, Facebook®, Oracle®, Amazon®, which may leverage cloud-based resources to build a social media and/or virtual real estate business; iconic hardware companies, e.g., Apple®, who have a reputation for high quality innovation and may leverage these resources to build a social media and/or virtual real estate business; operating system companies, e.g., Microsoft®, Google®, may leverage relational space to enhance and promote the social aspects of its platform and build a social media and/or virtual real estate business; companies with a strong email business, e.g., Google®, Microsoft®, Yahoo®, Zoho®, AOL®, may leverage its/their email user base to promote relational space to expand into social media and/or virtual real estate business; online retailers, e.g., Amazon®, Alibaba, Baidu, may leverage relational space to enhance their respective commercial business and networks and expand into social media and/or virtual real estate business; development tools companies, e.g., Microsoft®, Apple®, may use relational space to showcase its/their tools and customizable modules and expand into social media and/or virtual real estate business; social intelligence companies, e.g., Google®, Baidu, may use relational space to gather additional information about user interests and expand into social media and/or virtual real estate business, browser developers, e.g., Google®, Microsoft®, Apple®, may use relational space to promote their browser which has a module supporting villa clients and expand into social media and/or virtual real estate business; companies with meaningful media assets, e.g., Disney®, Google®, YouTube®, may use relational space to promote and leverage their existing assets to expand into social media and/or virtual real estate business; and, applications companies, e.g., Amazon®, Google®, Apple®, may use relational space to promote their existing business and expand into social media and/or virtual real estate business.

System Structure

FIG. 1 illustrates an exemplary schematic diagram of a "villa", and any associated villas, in a simple "VillaView", in accordance with an embodiment of the present invention. Referring to the present embodiment, a simple example of a relational social world 100 starts with an "Alpha" villa 108, e.g., a user designed virtual and/or online home. The "Alpha" villa 108 may have one or more central tiles (terrain masses), and each tile may have one or more associated villas. Terrain, as used in the virtual context of the relational social world 100, is loosely defined, and may include and/or have land/sea/buildings, but can also be symbolic or any space-occupying visual feature such as web page, graphics, etc. By way of example, the relational social world 100 may be representational as an intermediary visual schematic organized into a scheme of two-dimensional hexes 102, where such a configuration is provided as an example only. Those skilled in the art will appreciate that other schematics and/or geometric representations may be used by the relational social world, e.g., triangles, squares, circles, and so on and so forth.

The "Alpha" villa 108 shown in relational social world 100 is shown as a VillaView, e.g., from the perspective of looking inwardly toward the villa, and is thus composed of one or more tiles, e.g., shown as groupings of hexes 102 in relational social world 100. Note that herein, the word associate/association is used as a specific term of art for a relation between two villas. A tile may have variable size and shape, and may have structures or functions accessible within it. For simplicity, this tile upon which villa 108 sits or is otherwise associated with has been drawn without any additional structure or function, and includes seven hexes organized in a substantially circular region 110 in the configuration shown in relational social world 100. Numerous other sizes and shapes of a tile are possible.

Adjacent to "Alpha" villa 108 on and/or associated with the tile denoted by the shaded hexes 102 may be one or more associated villas, e.g., a single associated "Beta" villa 104, e.g., depicted with a single hex (Note that a villa is composed of one or more tiles, each tile composed of one or more positional elements such as hexes/squares/etc. In the classical understanding, the hexes making up a tile could themselves be considered "tiles" in a "mosaic", but for clarity, we refer to them as hexes or positional elements, not using the more common definition of "tile" since that term has specific meaning in our definition of villas). Note that for convenience and screen efficiency, associated villa 104 is displayed with a single hex, e.g., that may be colored yellow in one or more embodiments, even though the actual villa may be of a different size or shape. Also, villas may be displayed with a symbol or a photo to make them recognizable. Should a user of relational social world 100 choose to enter and/or associate with associated "Beta" villa 104 by selecting it, the screen view shown in FIG. 1 may shift to a full display of associated villa 104, which would also display Beta's associated villas, etc. In the configuration shown in FIG. 1, associated "Beta" villa 104 is shown juxtaposed to "Alpha" villa 108, at common border 106, although other configurations may be envisioned without departing from the scope and spirit of the disclosed embodiments.

As referred to in relational social world 100 and elsewhere herein, a villa is a self-contained, fully functional unit. Although a villa may have numerous social and/or virtual relations with other villas, each individual villa does not necessarily rely on other villas for its own display and functionality, which, in turn, may produce profound implications regarding the independent operability and identity of each villa as pursuant and defined by solely its corresponding user-owner.

There are circumstances where a villa actually relies on information provided to it by its associated villas, e.g., automatic self-updating. More specifically, there may be instances in which one villa wishes to communicate/share data with another villa. There is absolutely no reason to preclude this. This functionality is described in more detail in the section on "Portals" (essentially specialized data aware "relational links"), in which a user going from one specific villa to another carries specialized data about that transaction that can alter his experience in the destination villa. Perhaps a more precise way of expressing the original idea for self-contained, fully functionality is to say that a villa can fully functional without specific knowledge of the nature or functions of associated or linked villas. Considering a specific example, a hex within a personal villa may have a link to the Facebook villa. In this case, the hex may specify that it wants to link to the owner's personal Facebook page. The hex linking to the Facebook villa could be displayed (as part of the current villa) without any specific knowledge of what happens when the user uses that link to visit the Facebook villa. To further expand on this idea, let's imagine we are looking at the very same villa, 10 years from now, which still has the hex linking to Facebook, and this hex looks the same as it did previously. Only now, Facebook has decided to compete directly with Amazon, offering direct sale of merchandise, and using its social connections, it has decided to compete directly with LinkedIn and Salesforce. Ten years later, when the Facebook link is selected within the villa, the experience may be very different when the user arrives on the Facebook site. But that does not change how the originating villa displays and functions before the jump is made. This independence and self-containment is an important feature and strength of the villas, because the villa that is created today cannot know all of the possible features and functions of villas in ten years. And creating lots of new functionality in future villas does not "break" the function of the current villa. Obviously the proposition of using/passing data in a link between two villas adds a lot of functionality, and must be planned/consented on both ends. This concept is covered in much more detail in the section on Portals.

Thus, embodiments disclosed herein permit for the development of the structure and function of a villa today, without concern about specifics of other villas. As structure and functionality are developed in the future, new villas can incorporate new functionality without affecting a given villa. By way of example and not limitation, new technology deployment need not invalidate or break existing villas or their social relations. Functional independence flows from the integrity of individual villas residing and/or associated with tiles in the virtual world mosaic model. Tiles, represented in the relational social world 100 and elsewhere as hexes, are separate fully functional units even though they may have virtual relations with other tiles.

The virtual world model provides for flexibility not otherwise possible in a 3D map resembling real world terrain and such fluidity permits for further definition and refinement of the world over time, rather than requiring all defining characteristics of the world from a single initiation start-point, etc., as such properties need not necessarily be initially fixed. Moreover, in the virtual world, as users, e.g., user-owners of villas, enter into and leave the virtual world, they may define relationships, on their own, maintaining relevant relational maps. Social relationships are intrinsically very fluid, and a fluid terrain is required to accurately represent fluid relationships. In this case, the task of creating and maintaining the relational maps of the world rests with the users who define (and change) their own relations.

Since a villa is a fully functional unit by itself, it can be stored entirely on a single computer server, and may further link to numerous other villas that may be stored on the same or other servers. These virtual relations between the numerous villas, stored on separate servers, may create a huge functional map distributed seamlessly among the numerous servers, allowing the map to change size and shape dynamically, and be infinitely scalable. Thus, problems associated with a monolithic (referring to a single, uniform, and interconnected) world growing too large to fit on a single server are minimized.

Individual villa structure, design, form, shape and/or other defining characteristics may be set by its user-owner, and social relationships with other villas. Views particular to a given user-owner may be restricted from the perspective of his, her, their, or its villa alone to allow efficient virtual interaction with other users present (e.g., transmission costs may rise with N*N where N is # of users, so controlling N may be important regarding ongoing operability.). This freedom in definition and functionality is in contrast to a conventional map, which shows not only a real-life villa, but other villas, streets, terrain, empty or dormant spaces and even cities and countries standing between us and places and people the user-owner may care about.

In relational social world 100 and others substantially similar to it as described elsewhere, villas exist in virtual relational space, not physical space. Accordingly, villas do not have physical location, and are not locked in by adjacent villas. Villas can freely change size and shape, allowing maximal expression by their owners.

A simple villa structure may seem to limit complexity, but using multiple subordinate villas, each of which may have multiple subordinate villas, maps of great complexity may emanate from a single villa. We refer to this as "villas of villas of villas . . . ", which can yield hundreds and even thousands of villas within several levels of subordinate villas.

A group of associated villas share a single interest (in a specific tile or another villa), and are therefore more likely (than average or otherwise) to share other interests. Villas can be ordered based on shared interest overlap with the observer, making the associated group more useful to those involved for better and more efficient social networking. And, villas may freely associate with others regardless of their virtual location via complete freedom in configuration, thus maximizing desirable social interaction pursuant to individual user-owner interests.

Generally, people may be selective and discriminating in their social associations, instinctively associating themselves with those of shared interest or background. Reflecting those real-life preferences in freely reconfigurable virtual worlds space helps users avoid noxious neighbors and vacant spaces that are otherwise prevalent in conventional maps.

Social relationships are fluid, and relational space can thus also change easily to reflect these changes in social relationships. For example (but without limitation thereto), relational space fills voids left by departing users. Spatial representation of associated villas in concentric circles around a tile provides rich visual information about the villas and their relative importance to the user, with the central villas (and those displayed with larger or distinctive displays) being closer to the center of interest of the user-owner than more peripheral villas. Spatial displays of relations are more natural and familiar than scrolling text or lists. However, those skilled in the art will recognize that these display types may be used with methods according to the invention.

Overall, relational location of a given villa in the relational social world dictates its relative real estate value. Some villas may create value through creating content, others are aggregators and curators of content created elsewhere. Villas can be similar to popular websites but offer more robust social interaction.

Structural elements and functional modules for displaying and managing villas need not be defined or fixed by a single method. Future development of new elements and modules providing additional villa features may be implemented without negative impact on existing villas and relationships. This reiterates the idea of the functional isolation of "our" villa from other villas, including future villas and future functionality.

Villa user-owners may have complete control over the structure, size and shape of their villas, as described above, but may also have complete control over associated villas, e.g., who they are, where they are within the villa, etc. Control over associated villas gives the owner control over their villa community (neighborhood). Associated villas are part of the villa map, but carefully managed by the villa owner to create and maintain a preferred social milieu. Villas may each have their own social character, and some are more attractive and valuable than others—effectively a function of how the villa neighborhood is managed.

Vast individualization capabilities allow the villa to provide a single online home and identity for the user-owner and his relations, integrating his online presence with numerous websites including Facebook, Twitter, SnapChat, etc. His villa is his home, he can customize his visual identity to his tastes, and easily change it as needed. Nevertheless, the villa is not owned or subject to the whims of such social media outlets such as Facebook, Twitter, etc. It is conceivable that some of these links could be integrated into a villa if allowed by their platform (e.g. a set of Facebook friends could be used to populate a Facebook tile in the villa, and if any of those friends had their own villas, they could include direct links to the villas rather than the Facebook site.)

Villas may create worlds of mixed character by using subordinate (linked) villas. A top level villa could have symbolic function and terrain, a subordinate villa could have fantasy world terrain, another could be a traditional dungeon style game in which users move around with their own avatars, another subordinate villa could have an array of webpages, another might have native applications, another might be commercial tiles and shops, another could be active media platforms. And these different styles of villa may be added or changed at any time in the future, e.g., the user-owner does not need to know in advance how he will ultimately use his real estate, or how it might evolve to serve his business, and even create new business lines. The self-contained functional villa can nevertheless link to other villas which provide vastly different looks and function. And if those associated villas change their look and functionality in the future, the villa of the user does not change. And here, to accommodate vastly different functions, the current villa may be split into multiple smaller villas with different function, different looks, different programming (dungeon game vs. fantasy world vs. webpages vs. shops, etc.). In some sense, this reiterates the "object oriented" model of programming, where smaller objects of limited/defined functionality are used and then linked together to provide complex overall function.

The owner of a villa may look out the window of his villa at his private links. If a villa relates visibly to another villa, his villa will be seen as associated on the VillaView for that villa, but if he chooses a silent or secret relation, he can see it on his WorldView but it is not visible to others. In some embodiments, a silent friendship to another villa will be visible to that villa if they all are mutual friends. This allows two villas to declare a friendship visible to each other but not to the public at large.

Figure 2:
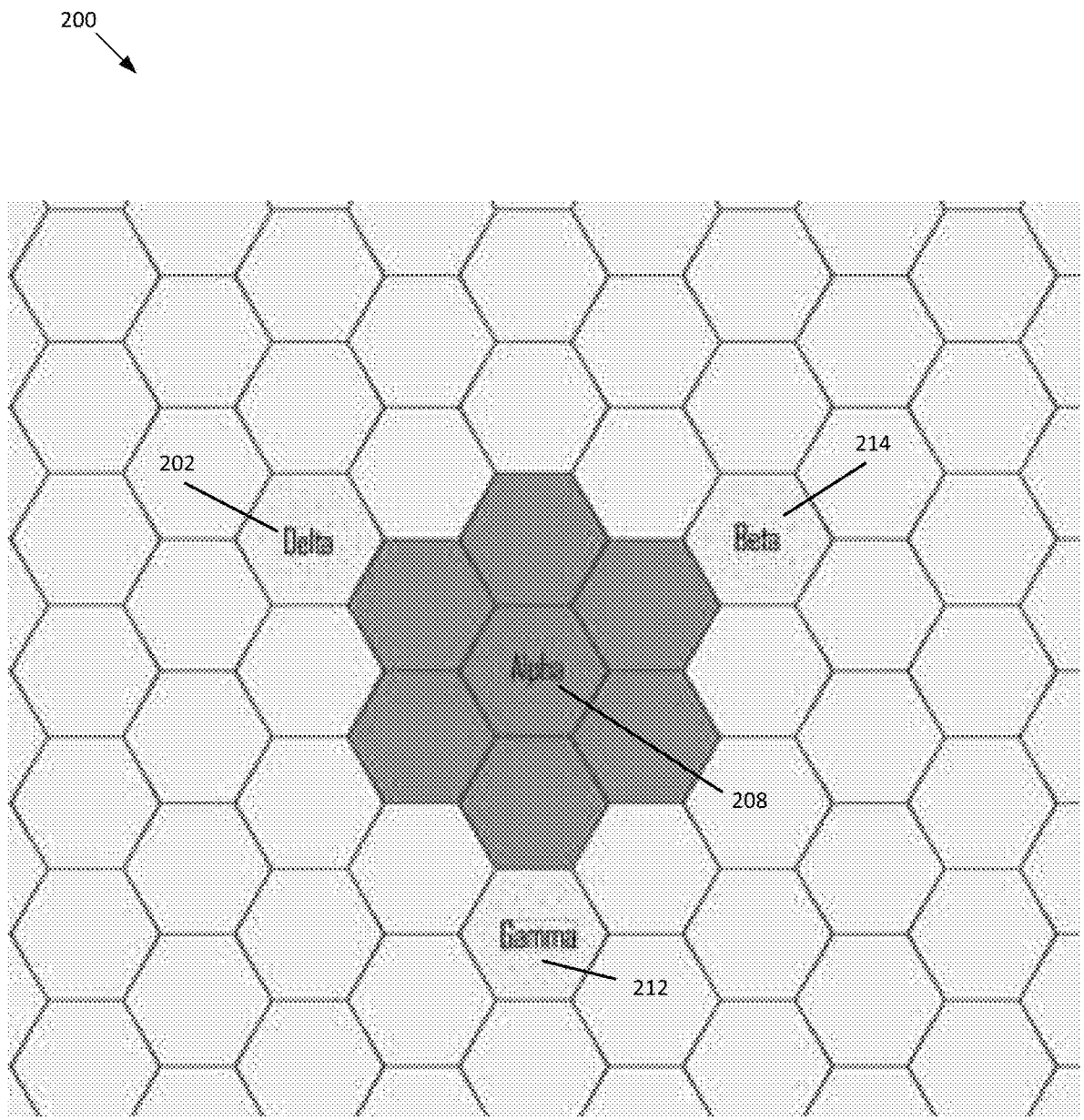
FIG. 2 illustrates an exemplary schematic diagram of a VillaView of an "Alpha" villa with three associated villas clustered around it, in accordance with an embodiment of the present invention.

FIG. 2 illustrates an exemplary schematic diagram of a VillaView of an "Alpha" villa with three associated villas clustered around it, in accordance with an embodiment of the present invention. Referring to the present embodiment, a more complex case is shown relative to relational social world 200 compared to the one 100 shown earlier in FIG. 1 and includes the same "Alpha" villa, now termed "Alpha" villa 208 in relational social world 200, with three associated villas: "Delta" villa 202; "Gamma" villa 212; and, "Beta" villa 214. Anyone viewing this VillaView of "Alpha" villa 208 can see the villa itself as well as any displayed associated villas, e.g., Delta" villa 202; "Gamma" villa 212; and, "Beta" villa 214. Since these associated villas share an interest in "Alpha" villa 208, they are more likely to share other interests as well. In more complex cases other than that shown by relational social world 200 in FIG. 2, the user-owner of the "Alpha" villa 208 may decide that some villas may not be actively displayed on his, her, their, or its villa map, and owners of associated villas may also otherwise choose not to be visible for a variety of reasons.

By way of example and not limitation, a user-owner of "Beta" villa 214 may notice and/or observe "Gamma" villa 212 associating with the "Alpha" villa 208. Accordingly, the user-owner of "Beta" villa 214 may select "Gamma" villa 212 to visit it directly, which may (as a result) display a VillaView for the "Gamma" villa 212. After visiting the "Gamma" villa 214, the user-owner of "Beta" villa 214 may decide that he and the user-owner of the "Gamma" villa 214 have a lot in common and then choose to virtually associate with the "Gamma" villa 212 as well as the "Alpha" villa 208. Notably, in relational social world 200, any one or more of the depicted villas can virtually associate with numerous other villas concurrently, essentially allowing for user-owners of villas to be in multiple virtual locations simultaneously in relational space, alleviating traditional conflicts of time and space issues as commonly encountered in the real world.

Figure 3:
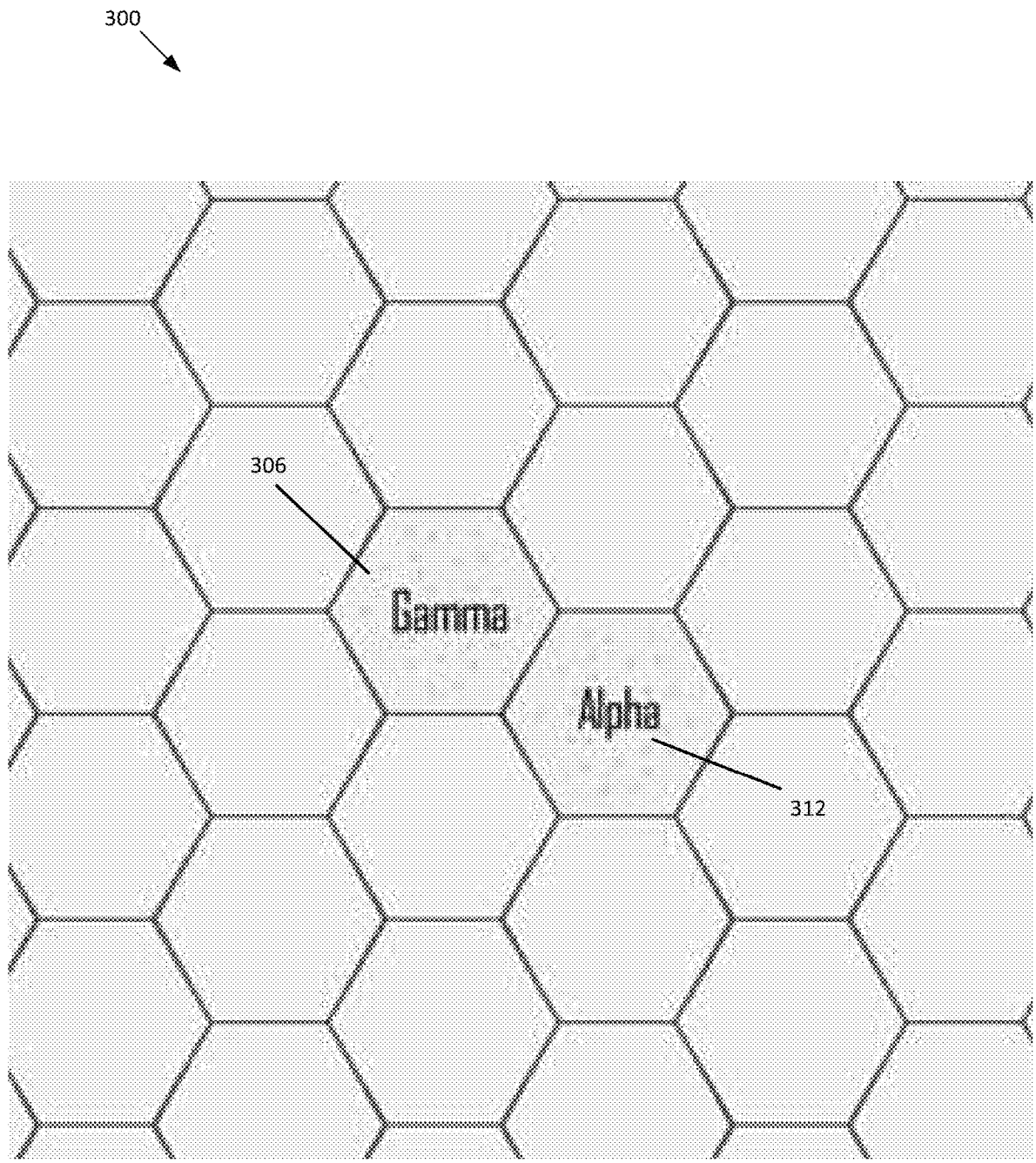
FIG. 3 illustrates an exemplary schematic diagram of a WorldView for the "Beta" villa shown in FIG. 2, showing the interests thereof, e.g., "Alpha" and "Gamma", in accordance with an embodiment of the present invention.

FIG. 3 illustrates an exemplary schematic diagram of a WorldView for the "Beta" villa shown in FIG. 2, showing the interests thereof, e.g., "Alpha" and "Gamma", in accordance with an embodiment of the present invention. Referring to the present embodiment, when the user-owner of the "Beta" villa 214 shown in FIG. 2 looks out of his villa window in his WorldView in relational social world 300 as shown in FIG. 3, he will be able to view both "Alpha" and "Gamma" villas 312, 306, respectively, since he is virtually associated with both of them. In one or more embodiments, the WorldView of the user-owner of the "Beta" can include his work, recreation, hobbies, school, church, government offices, shopping, etc. Therefore, his WorldView may show dozens (or more) villas, and his view of these villas can be filtered or otherwise modified for his convenience.

Figure 4:
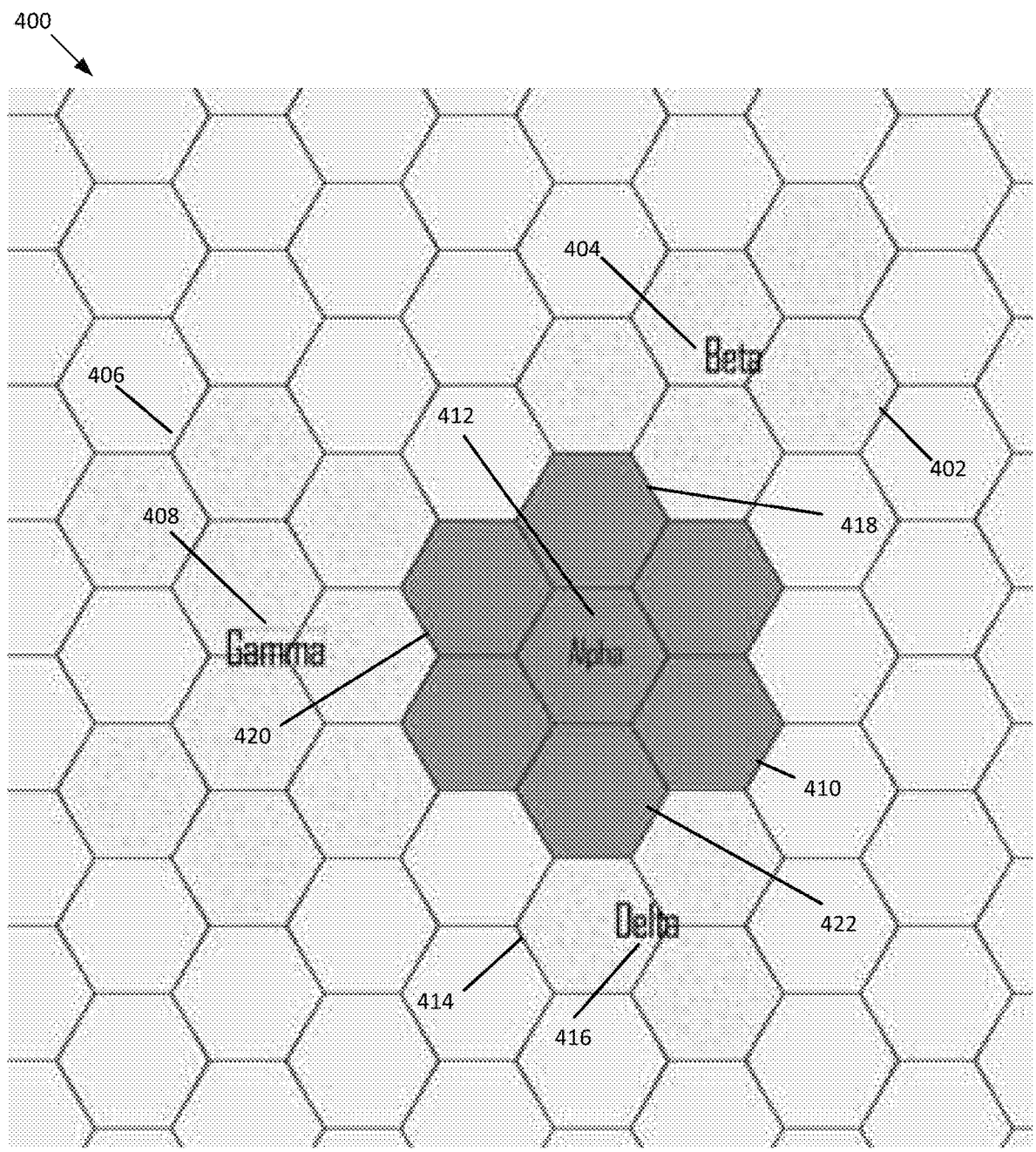
FIG. 4 illustrates an exemplary schematic diagram of a VillaView of the "Alpha" villa, will fully displayed associated villas, in accordance with an embodiment of the present invention.

FIG. 4 illustrates an exemplary schematic diagram of a VillaView of the "Alpha" villa, will fully displayed associated villas, in accordance with an embodiment of the present invention. Referring to the present embodiment, relational social world 400 indicates that a given VillaView that displays associated villas using a single hex is not the only way to display associated villas, rather, in one or more embodiments, it may be preferable to display associated villas in various other sizes and/or dimensions, as shown in FIG. 4, e.g., being composed of multiple hexes, etc. Nevertheless, configuring the relational social world 300 to display a single hex for each associated villa may be a desirable choice, to otherwise avoid crowding the screen with expansive views of what could be dozens of associated villas.

By way of example and not limitation, relational social world 400 includes an "Alpha" villa 412 in a first region 410, a "Gamma" villa 408 in a second region 406, a "Beta" villa 404 in a third region 402, and a "Delta" villa 416 in a fourth region 414. Those skilled in the art will appreciate that the general configuration shown of relational social world 400 is provided as an example and is thus non-limiting and that other suitable configurations and/or orientations of the various villas may exist. "Alpha" villa 412 may contact Gamma" villa 408 at one or more contact regions 420; likewise, "Alpha" villa 412 may contact "Beta" villa 404 at one or more contact regions 418; and, "Alpha" villa 412 may contact "Delta" villa 415 at one or more contact regions 422.

Figure 5:
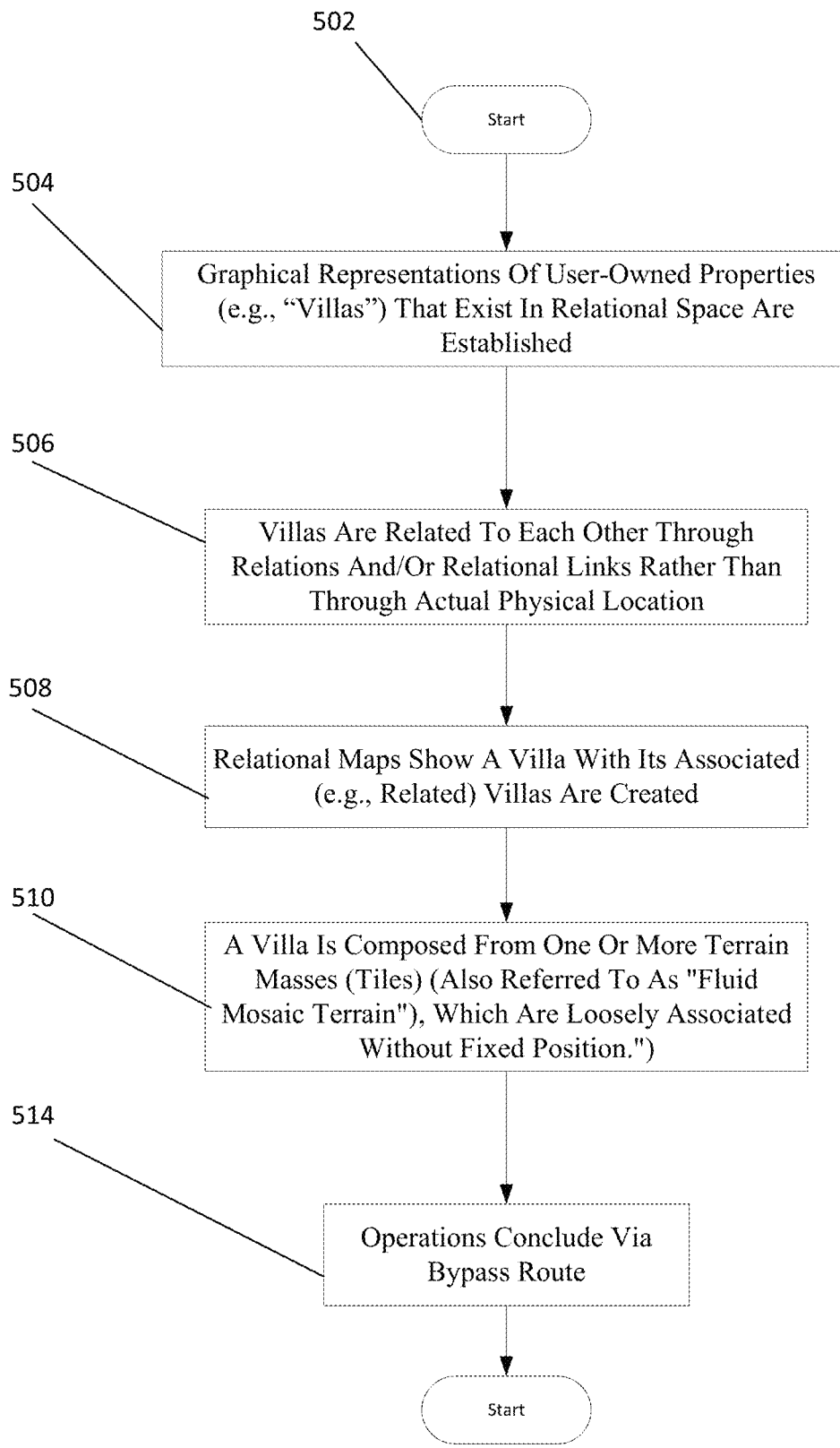
FIG. 5 illustrates a flowchart of an exemplary method of establishing social relationship based maps and/or graphical representations of user-owned properties that exist in a relational space, in accordance with an embodiment of the present invention.

FIG. 5 illustrates a flowchart of an exemplary method of establishing social relationship based maps and/or graphical representations of user-owned properties that exist in a relational space, in accordance with an embodiment of the present invention. Referring to the present embodiment, method 500 begins at start operation 502 where, thereafter, in a digital medium environment, graphical representations may be established of user-owned properties (e.g., "villas") that exist in relational space at operation 504. Villas may be related to each other through relations and/or relational links and not through actual physical location at operation 506. Relational maps are created that show a villa with its associated (e.g., related) villas at operation 508, where the method 500 may then conclude at end operation 512 via bypass route 514. Optionally, a villa of one or more tiles (terrain masses) is composed of loosely associated terrain masses without fixed position (also called fluid mosaic terrain). A villa may be composed from one or more terrain masses (tiles) (also referred to as "fluid mosaic terrain"), which are loosely associated without fixed position.510.

Figure 6:
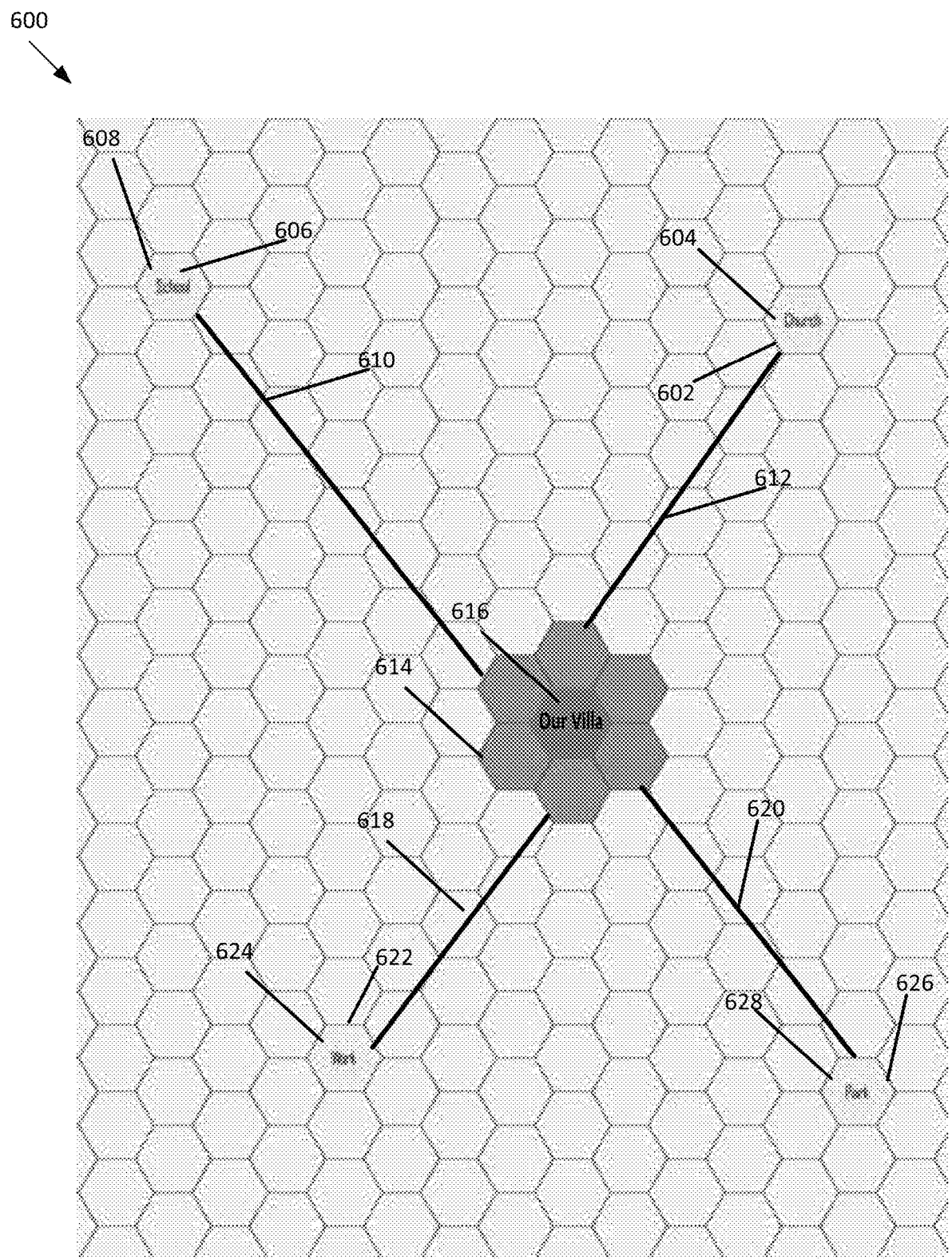
FIG. 6 illustrates an exemplary schematic diagram of a "magical" map of "our" villa, and surrounding interests, in accordance with an embodiment of the present invention.

FIG. 6 illustrates an exemplary schematic diagram of a "magical" map of "our" villa, and surrounding interests, in accordance with an embodiment of the present invention. Referring to the present embodiment, relational social world 600 is shown, e.g., as a "magical" map, for a "magical" virtual world, where user-owners of properties may virtually be adjacent to and/or in close proximity with multiple locations of interest simultaneously, thus addressing potential conflicts that may often arise in real-world situations, e.g., being close to work results in being further away from recreation, etc. the term "magic" is used to illustrate the power of imagination and relational space to create an ideal virtual world.

"Our" villa 616, positioned in region 614, is shown at the center of relational social world 600 with various attractions related thereto scattered about at arbitrary virtual locations, e.g., "School" villa 606 in region 608, "Work" villa 624 in region 622, "Park" villa 628 in region 626, and "Church" villa 604 in region 602. Those skilled in the art will appreciate that the mentioned attractions are provided by way of example only and that other attractions may exist particular to the tastes and/or preferences of the user-owner of "Our" villa 616 without departing from the scope and spirit of the disclosed embodiments. Moreover, any one or more of the attractions may be positioned at an approximate distance away from "Our" villa 616. For example (but not limitation thereto), "School" villa 606 may be positioned at a distance 610 from "Our" villa 616; "Work" villa 624 may be positioned at a distance 618 from "Our" villa 616; "Park" villa may be positioned at a distance 620 from "Our" villa 616; and, "Church" villa 612 may be positioned at a distance 612 from "Our" villa 616. Those skilled in the art will appreciate that the distances 610-620 are provided by way of example and are thus non-limiting and that other configurations and/or distance lengths may exist without departing from the scope and spirit of the disclosed embodiments.

Figure 7:
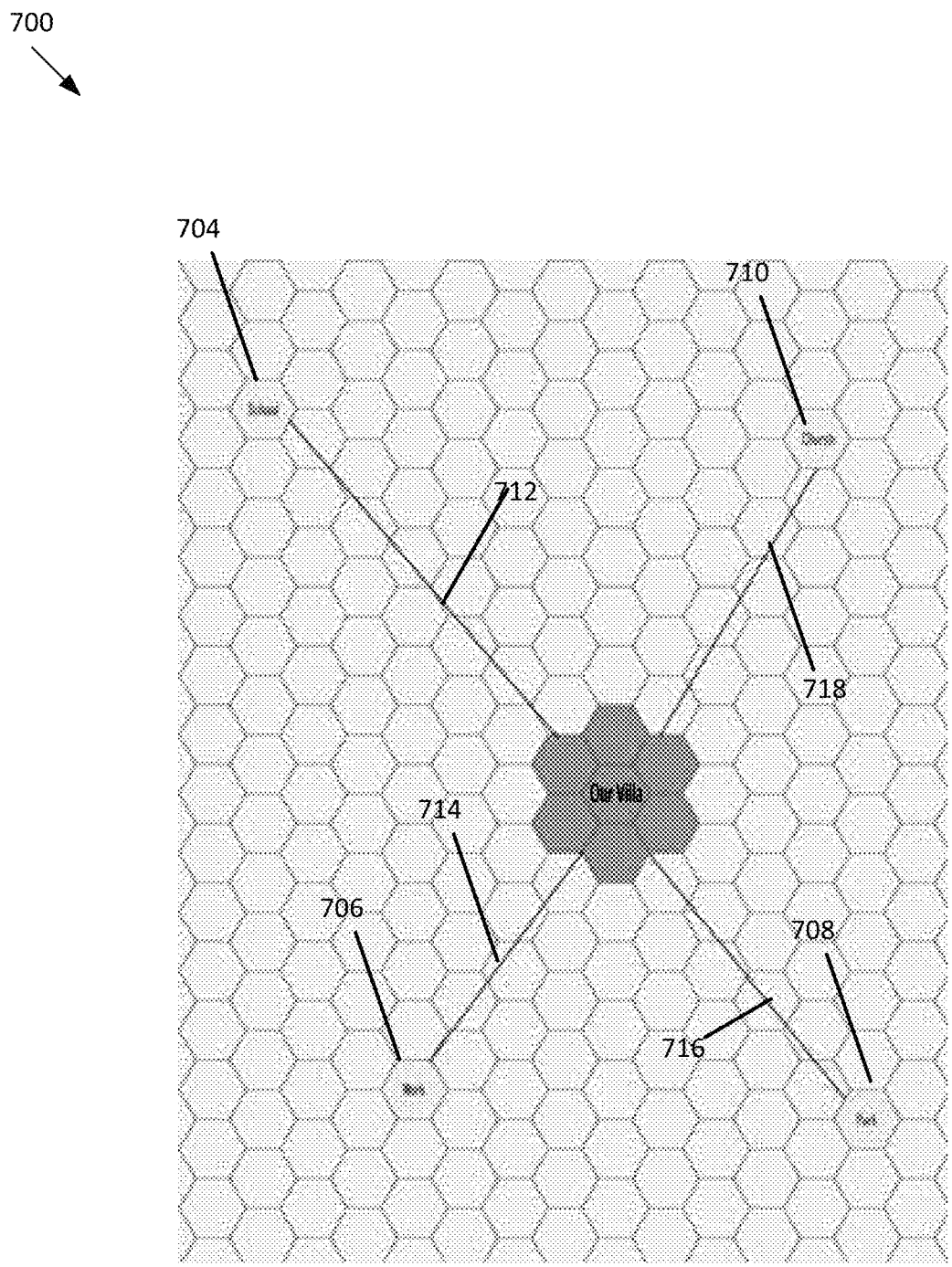
FIG. 7 illustrates an exemplary schematic diagram of pulling the interests shown in FIG. 6 toward "our" villa, in accordance with an embodiment of the present invention.

FIG. 7 illustrates an exemplary schematic diagram of pulling the interests shown in FIG. 6 toward "our" villa, in accordance with an embodiment of the present invention. Referring to the present embodiment, relational social world 700 provides for the relocation, e.g., via "dragging", of each of the attractions introduced in relational social world 600 shown in FIG. 6, e.g., shown in relational social world 700 as "School" villa 704, "Work" villa 706, "Park" villa 708, and "Church" villa 710, any one or more of which may be brought (virtually) closer to "Our" villa 702 via routes 712, 714, 716, and 718, respectively.

Figure 8:
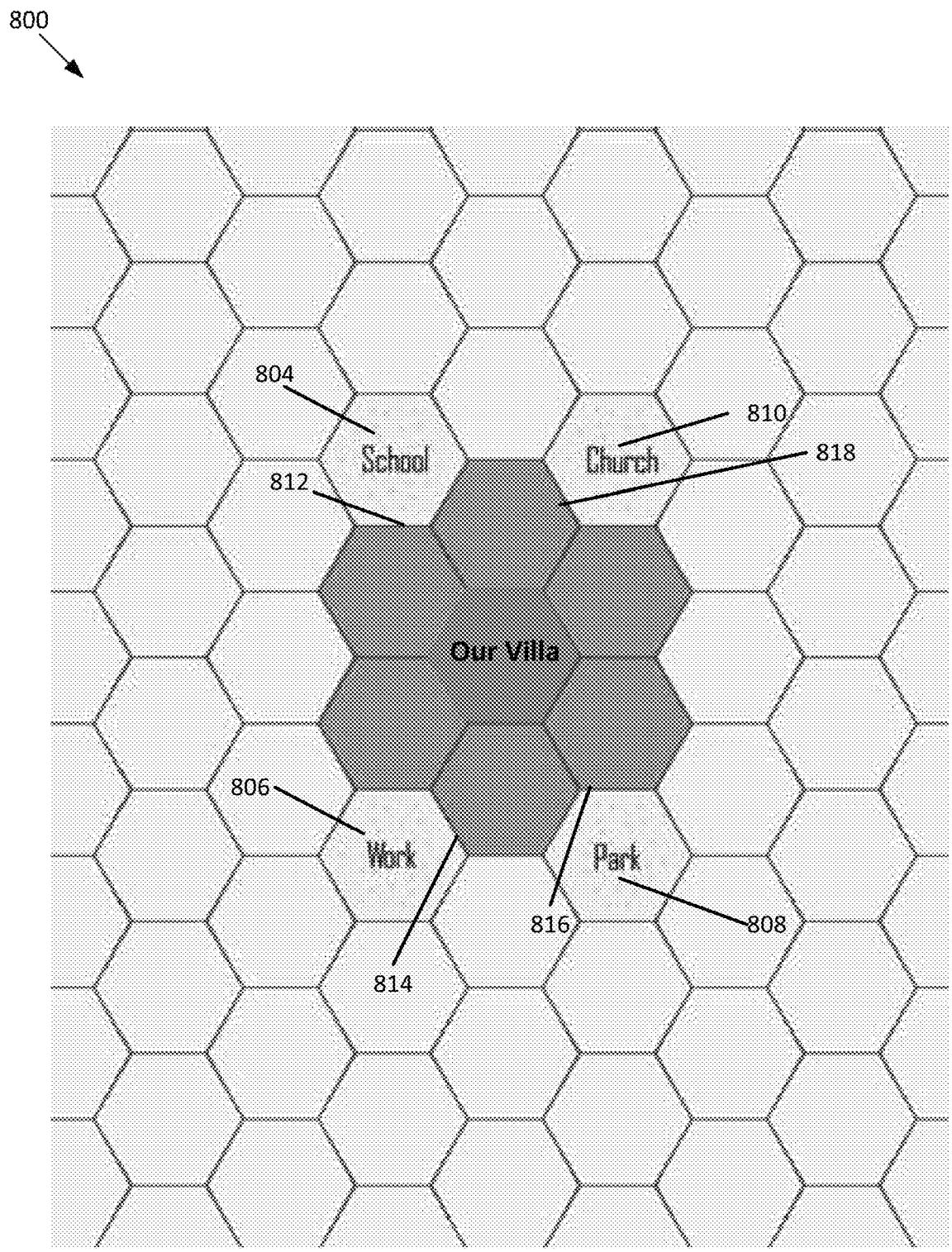
FIG. 8 illustrates an exemplary schematic diagram of the "magical" map of FIGS. 6 and 7 with the interests having been pulled next to "our" villa, in accordance with an embodiment of the present invention.

FIG. 8 illustrates an exemplary schematic diagram of the "magical" map of FIGS. 6 and 7 with the interests having been pulled next to "our" villa, in accordance with an embodiment of the present invention. Referring to the present embodiment, relational social world 800 shown with each of a "School" villa 804, "Work" villa 806, "park" villa 808, and "Church" villa 810 pulled closer to be adjacent to contact "Our" villa 802 at contact regions 812, 814, 816, and 824 as shown in FIG. 8.

Figure 9:
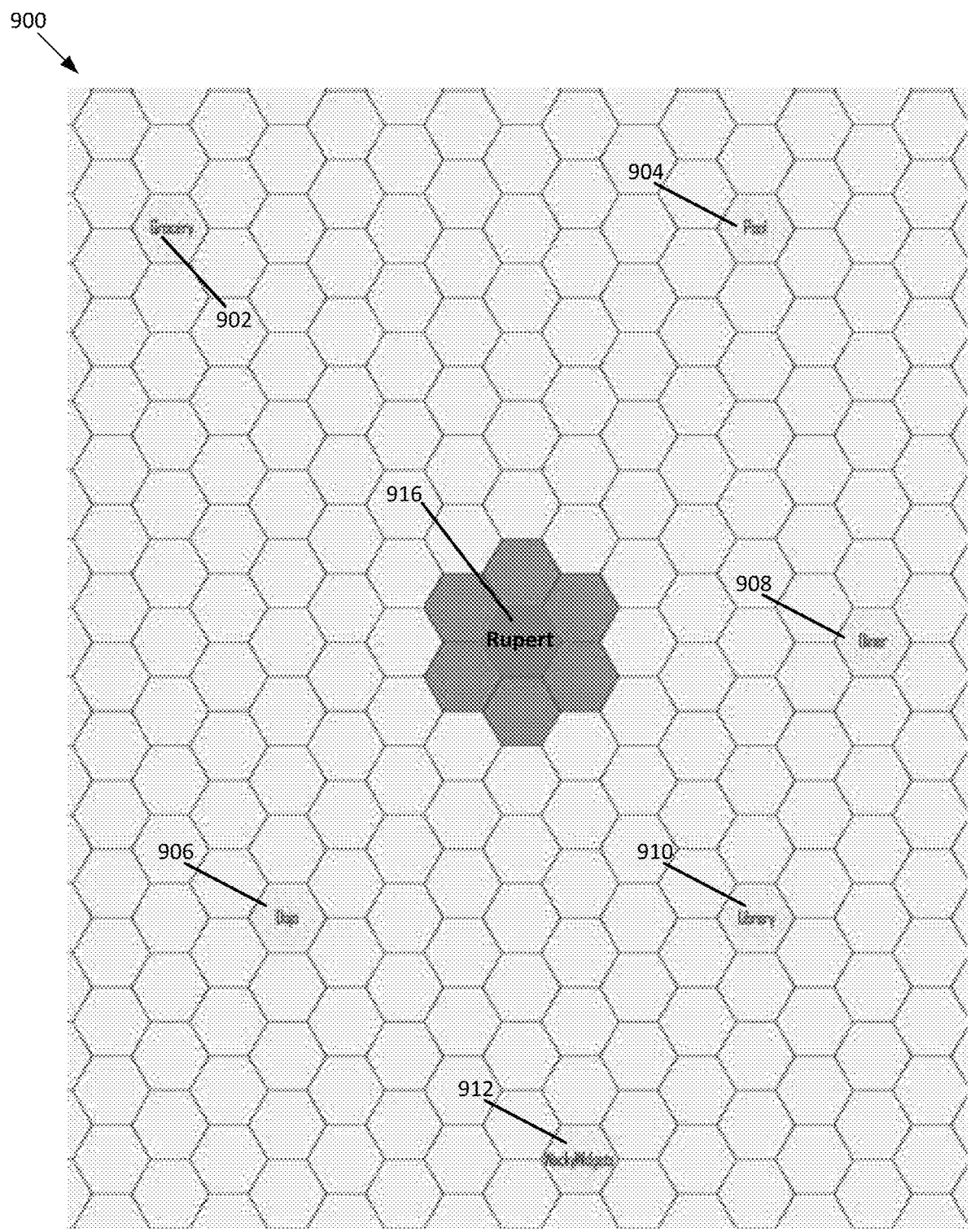
FIG. 9 illustrates an exemplary schematic diagram of a magical map for a colleague, Rupert, and his interests, in accordance with an embodiment of the present invention.

FIG. 9 illustrates an exemplary schematic diagram of a magical map for a colleague, Rupert, and his interests, in accordance with an embodiment of the present invention. Referring to the present embodiment, many of Rupert's interests may be different from that of "Our" villa as shown and discussed in the earlier FIGS., so he would likely not find such magical maps as discussed earlier to be very useful or appealing to him. Accordingly, Rupert may draw or otherwise start his own map, relative to his own home, e.g., "Rupert's" villa 916 in the relational social world 900, complete with attraction locations of "Grocery" villa 902, "Dojo" villa 906, "WackyWidgets" villa 912, "Library" villa 910, "Diner" villa 908, and "Pool" villa 904. To, for example (but not limitation thereto), enhance his accessibility to any one or more of the aforementioned attractions, Rupert may drag his interests close to his home.

Figure 10:
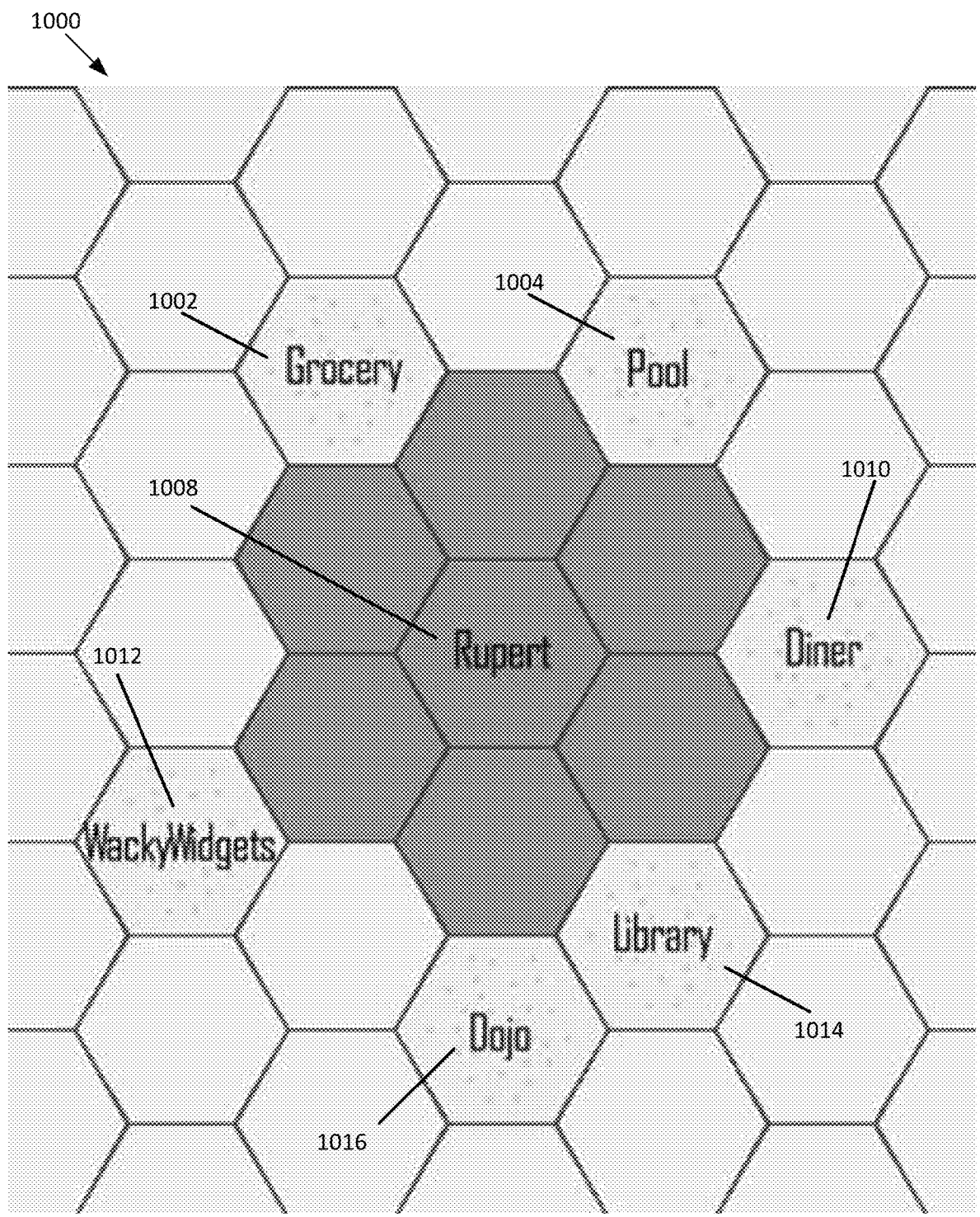
FIG. 10 illustrates an exemplary schematic diagram of Rupert's magical map shown in FIG. 9 with his interests pulled next to his villa, in accordance with an embodiment of the present invention.

FIG. 10 illustrates an exemplary schematic diagram of Rupert's magical map shown in FIG. 9 with his interests pulled next to his villa, in accordance with an embodiment of the present invention. Referring to the present embodiment, Rupert, as shown in relational social world 1000, has drawn all of his interests, e.g., referred to herein in relational social world 1000 as "Grocery" villa 1002, "WackyWidgets" villa 1012, "Dojo" villa 1016, "Library" villa 1014, "Diner" villa 1010, and "Pool" villa 1004, close to his villa, e.g., "Rupert's" villa 1008 for immediate and convenient access thereto. Accordingly, each user-owner of a villa in a relational social world may have his, her, their, or its own corresponding magical map, showing individual home villas in virtual relation to corresponding interests. Thus, such "magical" maps as described as having "relational" terrain, displaying where individual user-owners of villas are in relation to their respective interests.

Those skilled in the art will appreciate that the configurations of Rupert's attractions close to his villa as shown in relational social world 1000 is provided as an example only, and that other suitable configurations, including those with additional and/or higher dimensions and/or dimensionality, may be envisioned and/or implemented without departing from the scope and spirit of the disclosed embodiments.

Figure 11:
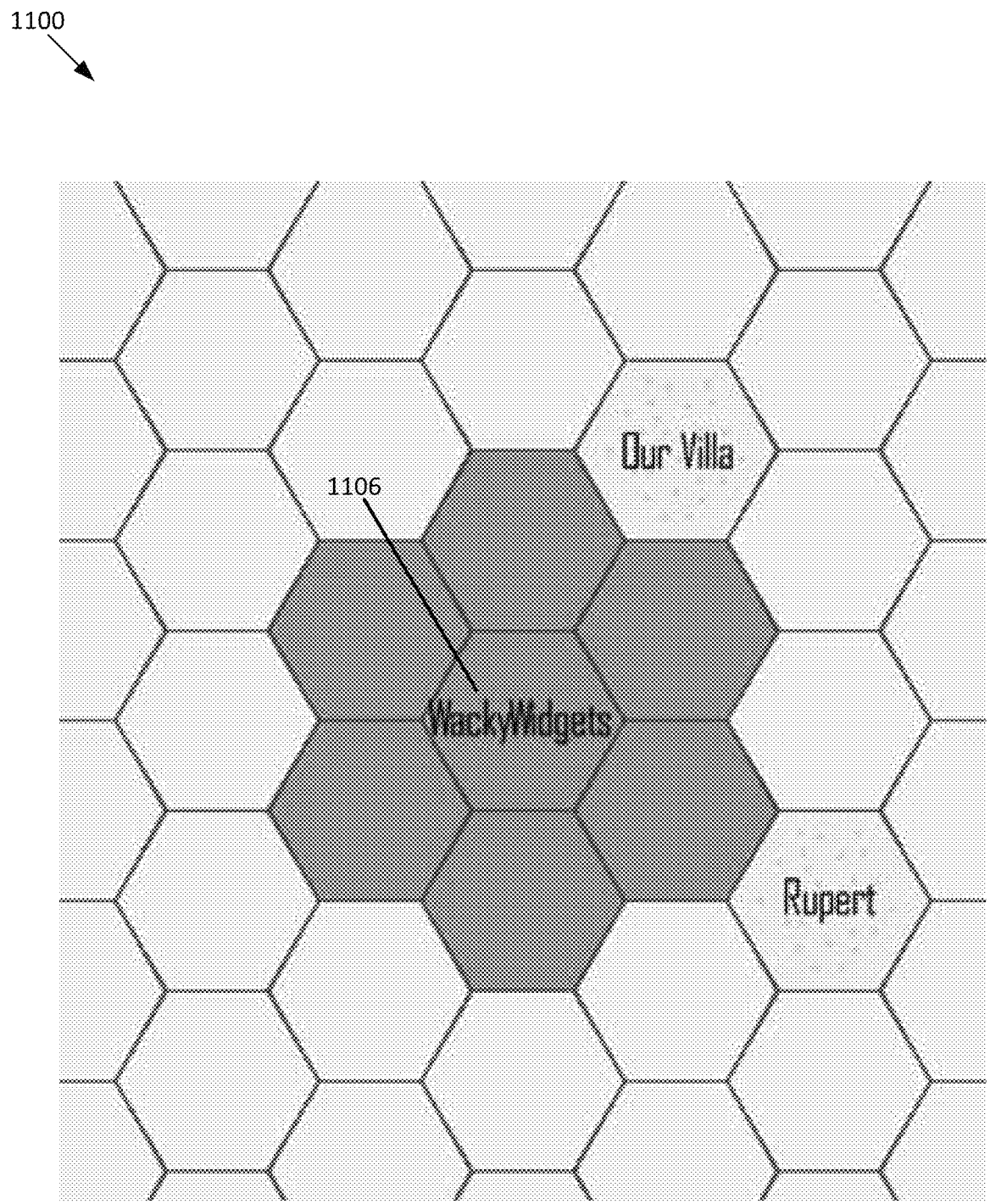
FIG. 11 illustrates an exemplary schematic diagram of another relational map showing a "WackyWidgets" workplace villa, a workplace, and colleagues around the workplace villa, in accordance with an embodiment of the present invention.

FIG. 11 illustrates an exemplary schematic diagram of another relational map showing a "WackyWidgets" workplace villa, a workplace, and colleagues around the workplace villa, in accordance with an embodiment of the present invention. Referring to the present embodiment, general reference is made to that shown earlier in the earlier FIGs. where user-owners of villas, e.g., "Our" villa and "Rupert's" villa, dragged respective workplaces closer to be in contact therewith. Therefore, in a VillaView of the workplace, e.g., "Wacky Widgets" villa 1106 in relational social world 1100, it may be possible to view villas of work colleagues who have also dragged "WackyWidgets" villa 1106 close to their respective villas.

Thus, in one or more embodiments, any one or more of the relational social worlds discussed in connection with the FIGs. may also have a place to show those who are interested in the user-owner of a given villa, e.g., friends, customers, colleagues, companies, etc. As a result, each relational map may different relative to a given user-owner of a villa because it shows the world in relation to that particular user-owner of the map.

By way of example and not limitation, even in circumstances where user-owners of villas may choose to create vast virtual cities around them, they may not necessarily need to always have correspondingly huge maps by focusing only on what is important to them. Attractions that are not of interest are essentially on the map; thus, there is no reason to display them until they interest the user-owner of the villa, creating an efficiently displayed "magical" map. In other words, a user might wish to have many (even hundreds) of associated villas, but depending on his current need, might wish to order or filter the display of these associated villas for the user's current needs and convenience.

Such infinite reconfiguration capabilities of the relational social worlds provide for complete flexibility of user-owners of villas, permitting them to reside (virtually) in desirable close proximity to all of their interests simultaneously, and filter/modify his view of those interests based on his immediate needs Fixed maps show fixed terrain; relational maps flow to reflect user needs.

Figure 12:
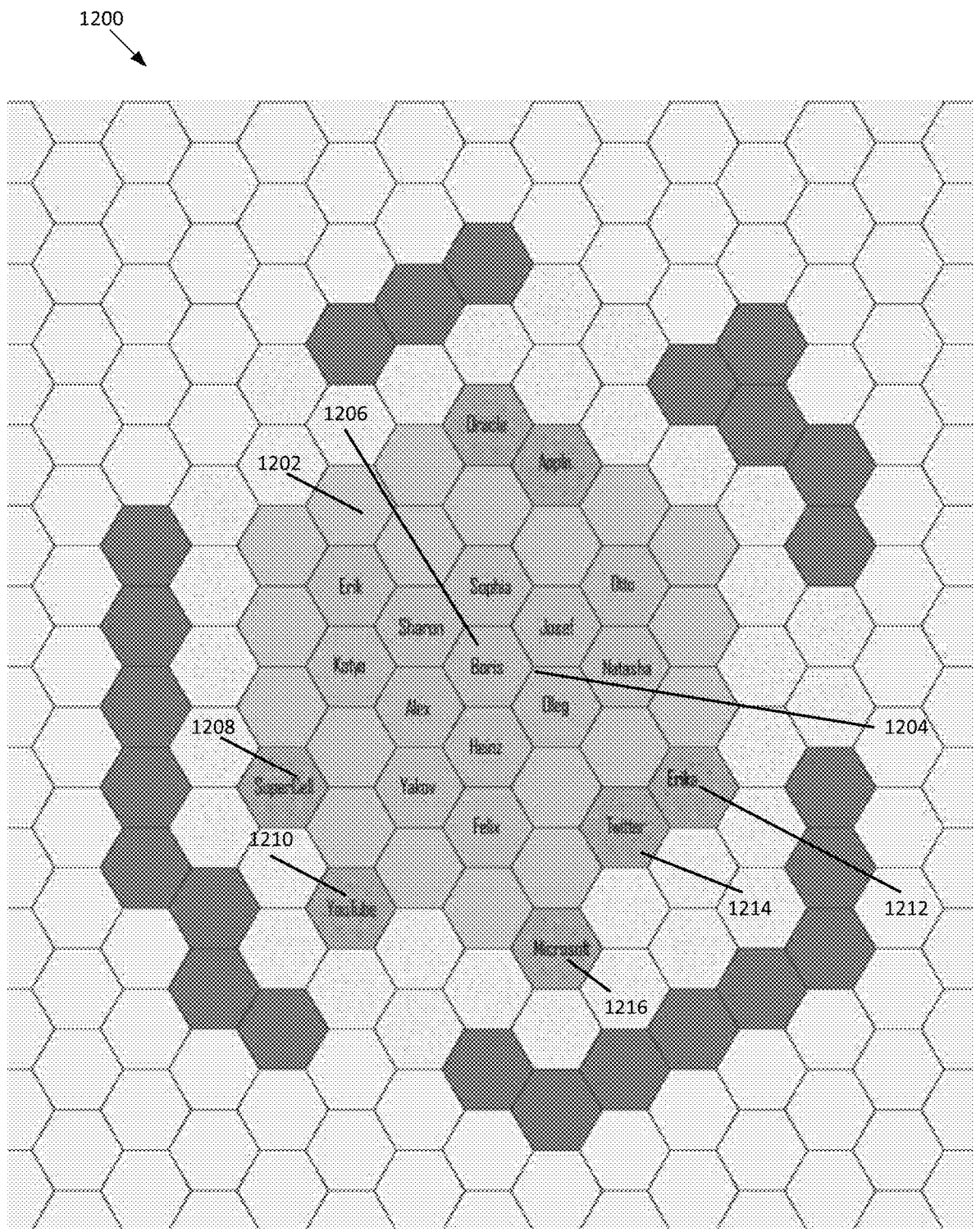
FIG. 12 illustrates an exemplary schematic diagram of a WorldView looking out a "window" of "our" villa at "our" interests, in accordance with an embodiment of the present invention.

FIG. 12 illustrates an exemplary schematic diagram of a WorldView looking out a "window" of "our" villa at "our" interests, in accordance with an embodiment of the present invention. Referring to the present embodiment, a given user-owner's villa has been dragged simultaneously near all of his, her, their, or its interests, looking out a virtual "window" of that villa, e.g., via a WorldView, shows various points of attraction and permits for the optional viewing of those who are also interested in the user-owner, e.g., friends, colleagues, classmates, customers.

Relational social world 1200 shown as a WorldView indicates a number of social connections around a central user-owner, e.g., "Boris" villa 1206, located in center region 1204. Obscured areas 1202 may flank center region 1204 and be revealed according to privacy preferences of the user-owner of the "Boris" villa 1206 and/or upon corresponding indications of a willingness to be viewable and/or displayed by the user-owners of villas associated with obscured areas 1202. Various points of interest may include "SuperCell" villa 1208, "YouTube" villa 1210, "Microsoft" villa 1216, "Twitter" villa 1214, and "Erika" villa 1212. Those skilled in the art will appreciate that the configuration shown for relational social world 1200 is provided as an example only and that other suitable configurations may exist without departing from the scope and spirit of the disclosed embodiments.

Figure 13:
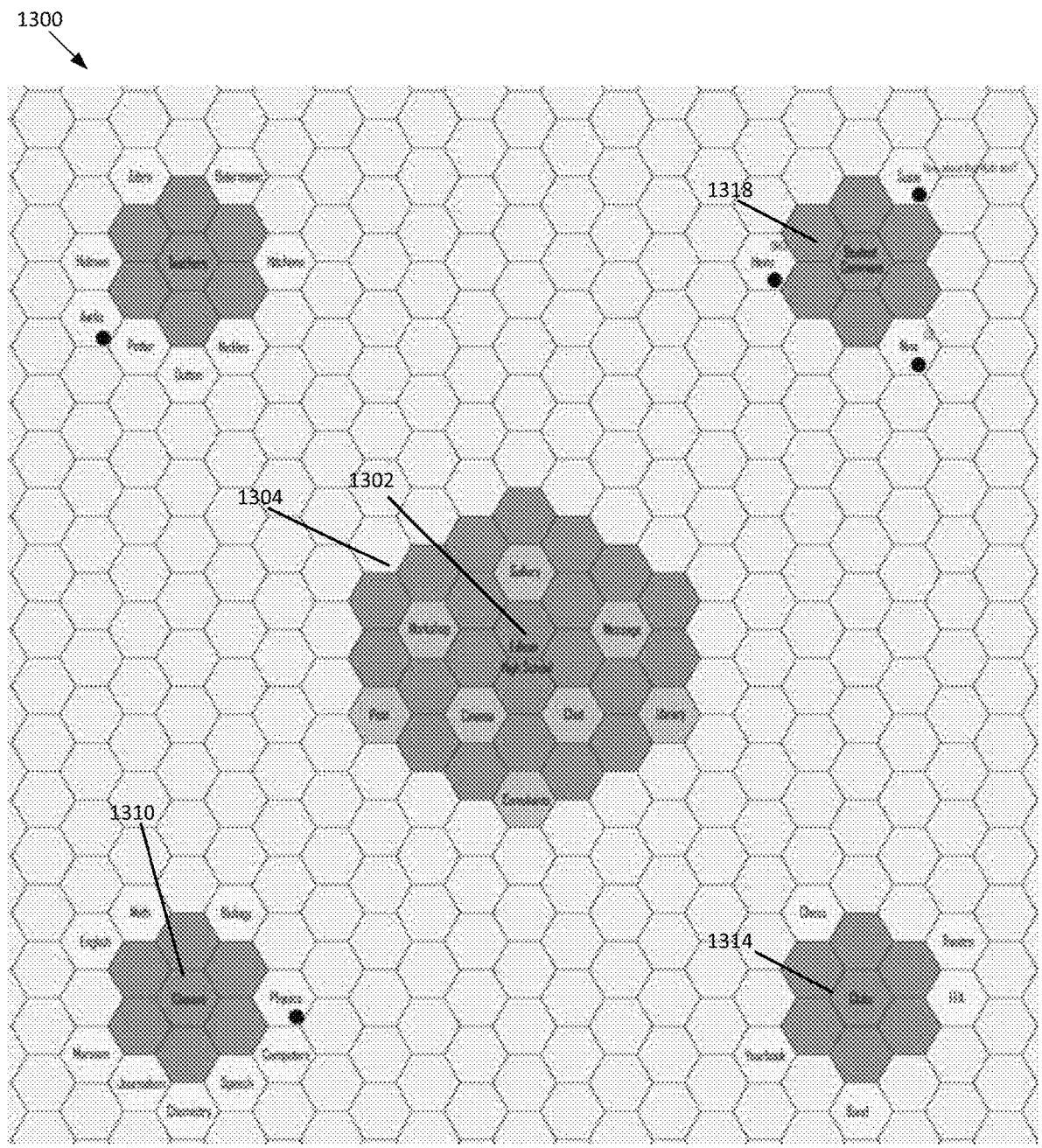
FIG. 13 illustrates an exemplary schematic diagram of a VillaView for an example educational institution, e.g., "Edison High School", in accordance with an embodiment of the present invention

FIG. 13 illustrates an exemplary schematic diagram of a VillaView for an example educational institution, e.g., "Edison High School", in accordance with an embodiment of the present invention. Referring to the present embodiment, a VillaView of relational social world 1300 for Edison High School illustrates several useful aspects of the relational map. By way of example and not limitation, a tile, as shown here in FIG. 13 and potentially elsewhere, is a terrain mass containing one or more contiguous positional elements (e.g., hexes, but may be represented by other shapes), and may have a mixture of structural/visual elements (roads, buildings, walls, etc.) along with functional elements. For clarity, examples may be restricted to functional elements even though visually interesting elements (e.g. as made possible via definition in Blockcraft/Minecraft®) may also be used.

A villa may be defined to have one or more central tiles ("Edison High School" villa 1302 is shown as an agglomeration of several hexes in central region 1304), and may also have satellite tiles (here, four satellite tiles composed of several hexes each provide specialized functionality related to "Edison High School" villa 1302). Such satellite tiles may provide a place for additional associated tiles and villas associated therewith as well as social functions.

Within central region 1304 are a number of colored hexes interspersed throughout the hexes upon which "Edison High School" villa 1302 resides, where such colored hexes are actually functional components. Each of these components may expand into another villa of their own which is subordinate to the current villa. Also, they can link to: websites or webpages (Facebook, Twitter, NY Times, Amazon, Google, email, etc.); cloud based or local applications including games, office software, etc.; customized software modules (written in C#, Python, JavaScript, etc.) to provide special functionality.

Of the example components, "Cinema" may be an area for viewing videos, "Gallery" may contain a photo library related to the school, "Post" may allow email communications with school faculty and staff, "Chat" may be a live chat area including typed text as well as audio/video capabilities, "Library" may be an online reading area, "Message" may be a running text and photo message board similar to Facebook, "Complaints" may be a customer service/suggestion box system. Most functionality may be provided through standard modules from the relational space framework and selected off the shelf by users configuring their villas. This provides a robust "social operating system" which users customize for their specific needs.

Each grouping of hexes to form regionalized areas, or tiles, may be individually configured to support particular access and function and to support one or more villas virtually residing thereon. By way of example and not limitation, in the upper right of relational social world 1300 is "Student Commons" tile 1318, designed for social and chat functionality. This tile may be configured by its user-owner to display only active associated online villas; here, there are three student villas which are online, e.g., "Heinz", "Nina", and "Susie". User-owners of those villas are shown chatting inline about their latest math test. This tile may also be configured with restricted access, e.g., such that the user-the owner has decided that only students from the school are allowed to associate with this tile, e.g., for student safety. Note that each student villa may be denoted by a black dot in the lower right, indicating the corresponding user-owner students are presently online. Community centers may also have message boards (like Facebook®), live chat rooms, etc., although, as shown in relational social world 1300, the user-owner of "Edison High School" villa 1302 has decided to place these only in central region 1304. As shown, "Student Commons" tile 1318 resides on a generally circular grouping of seven hexes organized into one contiguous tile.

Three other satellite tiles are "interest centers", with multiple associated villas controlled by respective villa user-owners and corresponding staff, providing additional functionality. At the upper left of relational social world 1300 is the faculty center, with multiple associated faculty villas. This center is configured by owner to allow associated villas to be displayed even when the owners are offline, but a single faculty member (Avelis) has a black dot indicating he is currently online (and potentially available for chat or other live interaction). Selecting one of the faculty villas would bring up the VillaView for that faculty member, which might have a large amount of additional functionality, including linking to numerous other villas. Notice that the villa owner has decided that only faculty villas will be allowed to associate with "Teachers" tile 1306. Villa owners are given extensive content control over their villas and their tiles, allowing creation of real estate value by careful curation, preventing unwanted visitors from cluttering their villa or spoiling its neighborhood.

In the lower left is a center for classes, e.g., "Classes" tile 1310, at the high school, each subject area having a villa of its own (most likely with villas for each of the individual classes offered). Physics villa is presently online, indicated by the black dot.

In the lower right is an interest center for student clubs, e.g., "Clubs" tile 1314, with multiple associated villas. Each of the club villas would likely have its own satellite villa where students can directly associate. To preserve efficiency of space at this level, the owner has prevented others from associating with the Clubs tile.

Using multiple levels with a "villas of villas" approach, even relatively large enterprises may be conveniently depicted and traversed using relational maps. Although it is possible to handle a villa with a single (larger) tile defined by an agglomeration of individual hexes, splitting functions into smaller tiles can also be beneficial, and allows for separation of associated villas and the tiles upon which they respectively reside in their areas of specific interest. Using a lower number of tiles for each villa also optimizes display space, useful for many users working on a phone or tablet rather than a large screen.

Figure 14:
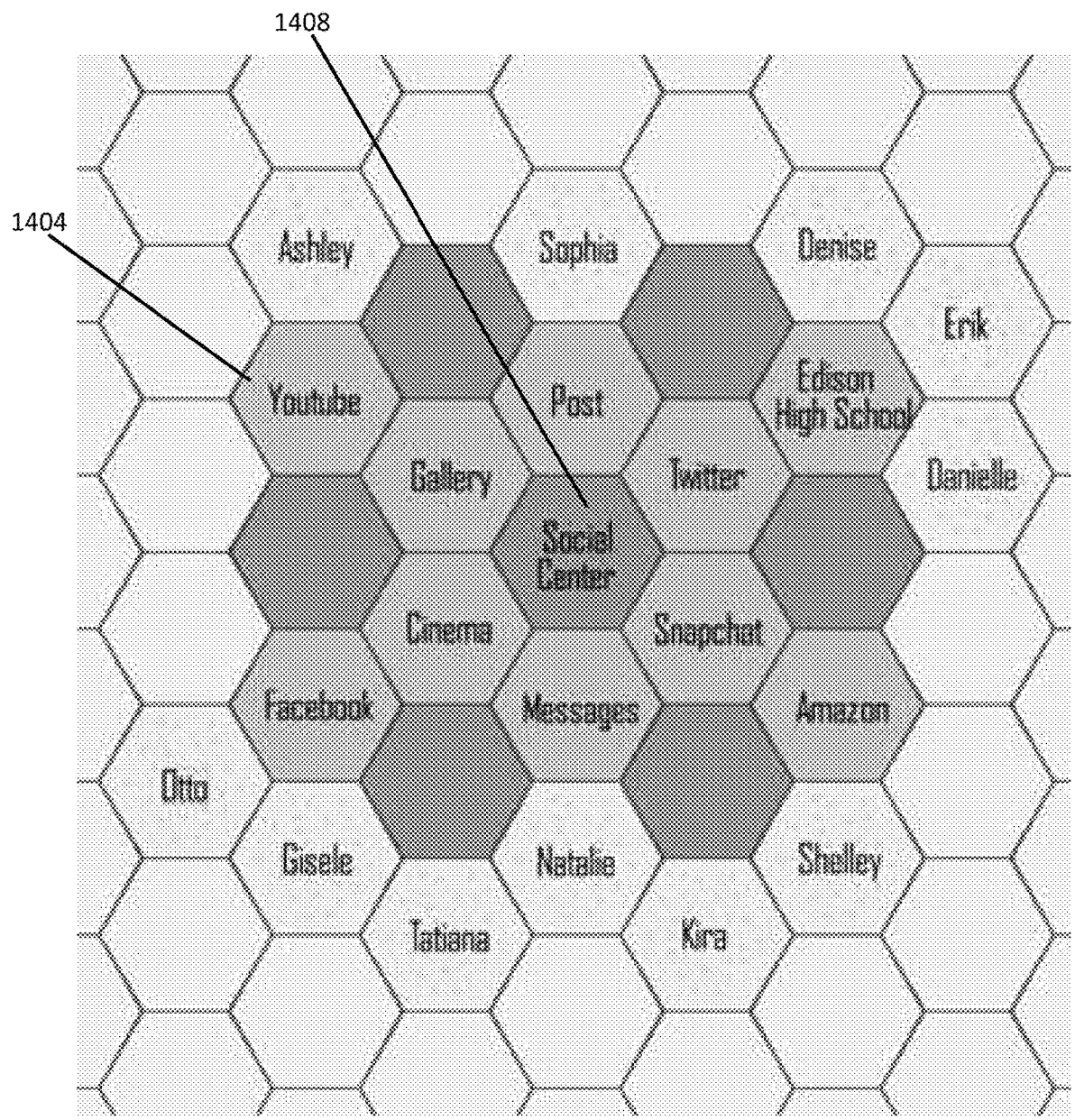
FIG. 14 illustrates an exemplary schematic diagram of a VillaView for "Susie", a student at Edison High School, as shown in FIG. 13, in accordance with an embodiment of the present invention.

FIG. 14 illustrates an exemplary schematic diagram of a VillaView for "Susie," a student at Edison High School, as shown in FIG. 13, in accordance with an embodiment of the present invention. Referring to the present embodiment, while many persons enjoy designing their own complex and expressive villas, others may be intimidated by the process or desire a relatively simple villa. Relational social world 1400 shows a VillaView for Susie's villa, Susie being a freshman at Edison High School where her villa is one of the associated villas in the high school villa.

By way of example and not limitation, Susie may not be very familiar with computers, so she selected a very simple "off the shelf" template that includes a "Social Center" component 1408 with six commonly used social components clustered around its center. But she wanted more than this standard set, so she also added a link to "YouTube" villa 1404, a link to her Facebook® page, Amazon and a link to Edison High School and so on and so forth.

"Social Center" 1408, as defined by Susie, resides on a tile with a perimeter defined by the darker hexes, where other persons who know and seek to be associated with Susie have chosen to place their villas next to hers.

As Susie becomes more familiar with computers and expands her interests, she may enlarge her central tile, or even add satellite tile with villas residing thereon for other functionality. As her tiles change shape or size, the associated tiles may simply redistribute around the new contours, using the flexible nature of fluid mosaic terrain.

Figure 15:
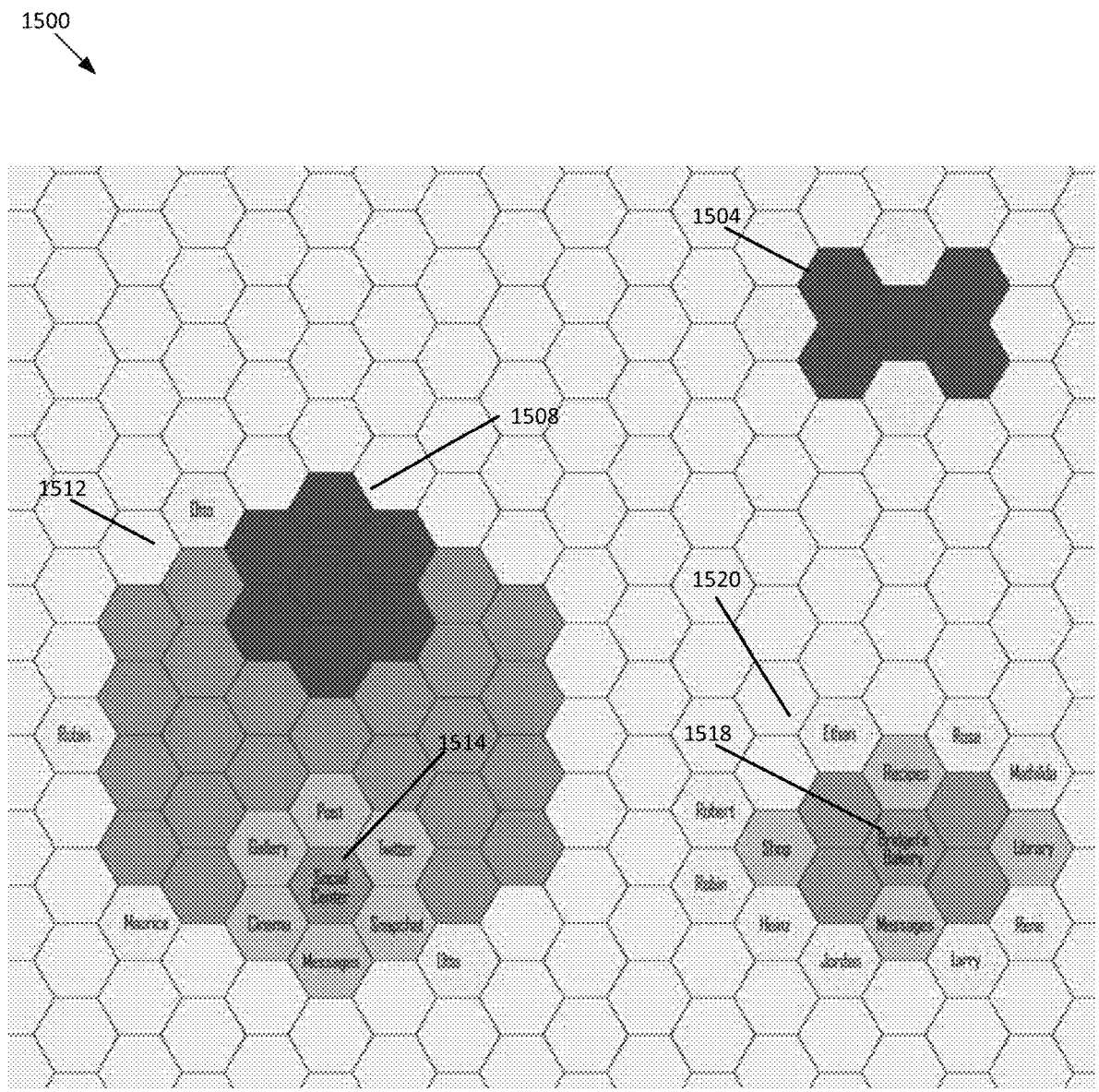
FIG. 15 illustrates an exemplary schematic diagram of a VillaView for "Bridget", Susie's mother from that shown in FIG. 13, with several satellite tiles, in accordance with an embodiment of the present invention.

FIG. 15 illustrates an exemplary schematic diagram of a VillaView for "Bridget", Susie's mother from that shown in FIG. 13, with several satellite tiles, in accordance with an embodiment of the present invention. Referring to the present embodiment shown in relational social world 1500, Susie's mother Bridget has a more complex villa, e.g., "Bridget's Bakery" tile 1518, flanked by a central tile 1512 to the left and two satellite tiles, 1508 and 1504. The central tile 1512 may have the same type of "Social Center" component 1514 that Susie is using, but there is also a dark blue area, e.g., tile 1508, in the upper area of the central tile 1512. This indicates a private area, with restricted access controlled by user-owner of the villa that resides upon tile 1508. Without user-owner authorized access, other users cannot see any of its functions or features, or know who is present.

In the upper right corner of the villa map, there is satellite tile 1504 which may be, in one or more embodiments, entirely dark blue. This indicates a private area, but because entire satellite tile 1504 is private, this means that satellite tile 1504 will not be displayed to users who do not have access to the tile 1504. Any villas associated with satellite tile 1504 will also not be visible except to those who have access to this private satellite tile 1504.

Those skilled in the art will appreciate that the configurations and placements of the various tiles and villas residing there-upon are provided by way of example only and are thus not limiting and that other suitable configurations may exist without departing from the scope and spirit of the disclosed embodiments. Notably, coloration to define private tiles may be selected other than that described here.

In the lower right corner is a tile 1520 for Bridget's home based business. Hypothetically, a few years ago, Bridget started baking for friends, and added some catering. Her business rapidly grew, and she supports it using various components, including the "Shop" component to the left of this Tile, where users can see and order from her bakery. Toward the right side is the "Library" component which includes numerous articles and other media related to pastries and cakes, as a service to her customers and probably also stimulating their interest. A recipe component is present as well. Note that a "Messages" component, similar to Facebook functionality, is present in the bakery, and also present in Bridget's central Tile. By way of example and not limitation, these components point to different content areas—one is for her business, the other is her personal space. Herein component is used instead of the term "villa." Herein the term "villa" has been used to refer to a user owned and managed property. The expression "functional hex" has also been used herein to refer to user owned and managed property. Those skilled in the art will recognize that a component may have any shape (suitable for the current villa display) or might even not have a traditional display at all, e.g., it could be a selectable item on a drop down or expandable menu/list, etc. Similarly, a component might have several hexes/positional elements, like the "Social Center" used in Bridget and Susie's villas, to provide cinema, messages, SnapChat, etc. Although components may be visible parts of a villa, their main value is to provide "off the shelf" functionality to users.)

Figure 16:
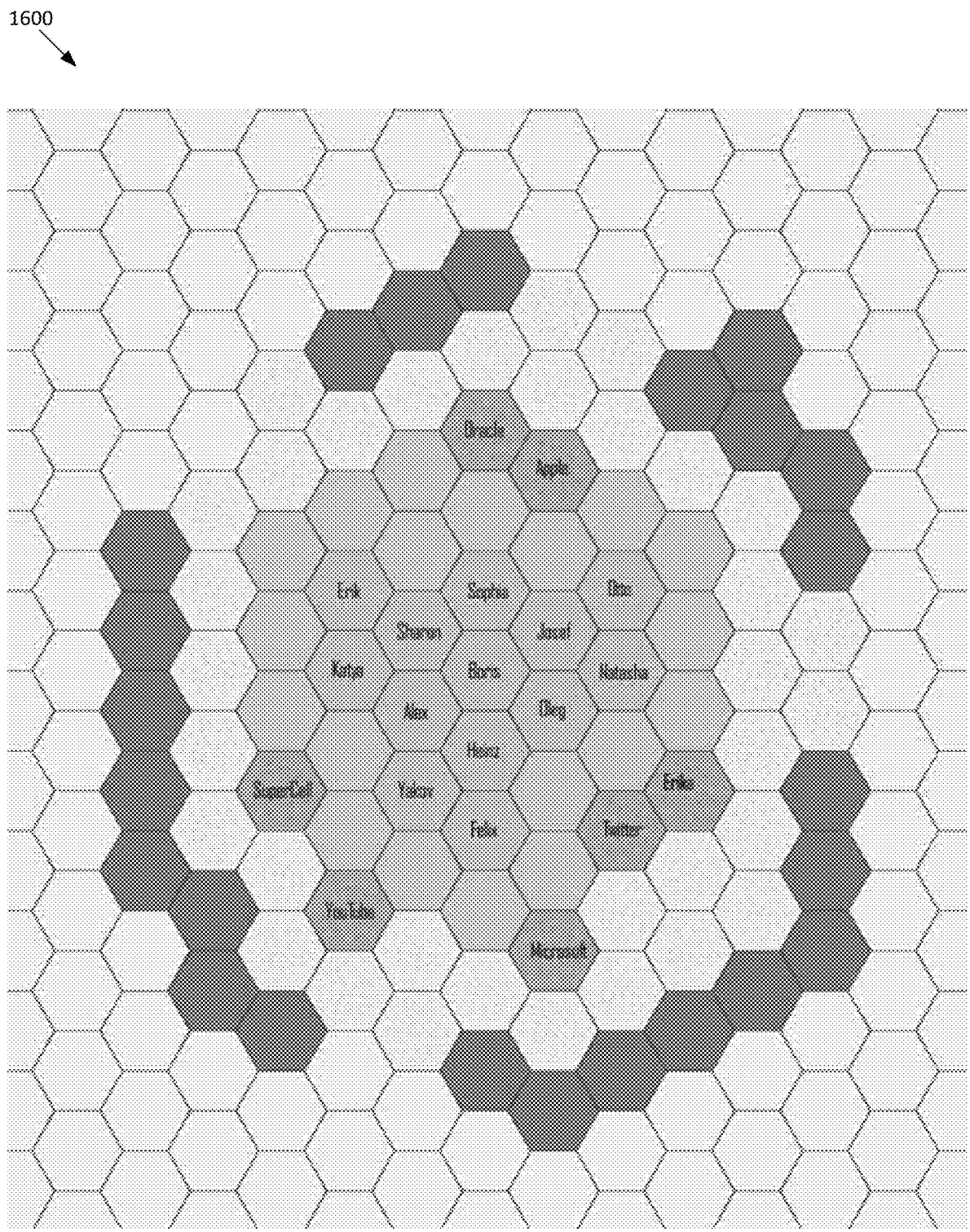
FIG. 16 illustrates an exemplary schematic diagram of a WorldView, looking out a villa window at "our" interests, in accordance with an embodiment of the present invention.

FIG. 16 illustrates an exemplary schematic diagram of a WorldView, looking out a villa window at "our" interests, in accordance with an embodiment of the present invention. Referring to the present embodiment, relational social world 1600 may be substantially similar to relational social world 1200 shown in FIG. 12 and discussed earlier, both relational social worlds 1600 and 1200 providing a WorldView that imagines the user-owner to be sitting in his, her, their, or its respective villa, looking out the window at all of the villas of interest. By way of example and not limitation, this includes all of the villas we have directly related to us by positioning the user-owner's villa next to theirs.

By way of example and not limitation, a variety of other villas can be optionally included in the WorldView, including villas that have chosen to relate to a given user-owner's villa by placing their villa next to his, her, their or its villa. In addition, WorldView can show villas that visited by the user-owner (even if chosen not to relate to them directly), and can also show villas whose owners have chosen to visit the user-owner's villa (even if they have not directly related).

In one or more embodiments, WorldView can also show any villa that has declared us as a friend, and any villa that we have befriended. It is easy to imagine how there might be hundreds of villas listed with such a comprehensive view, but WorldView allows filtered and ordered presentation of these villas to make them more relevant to our needs. "FriendView" shows only those villas with whom we have inbound or outbound friendships, and of course mutual friends are shown in preferential position near the center. "InterestView" shows only those villas that have a direct relation (we have positioned our villa near these villas). "VisitorView" shows villas of owners who have visited our villa recently, and "Travel View" shows villas that we have visited recently.

Figure 17:
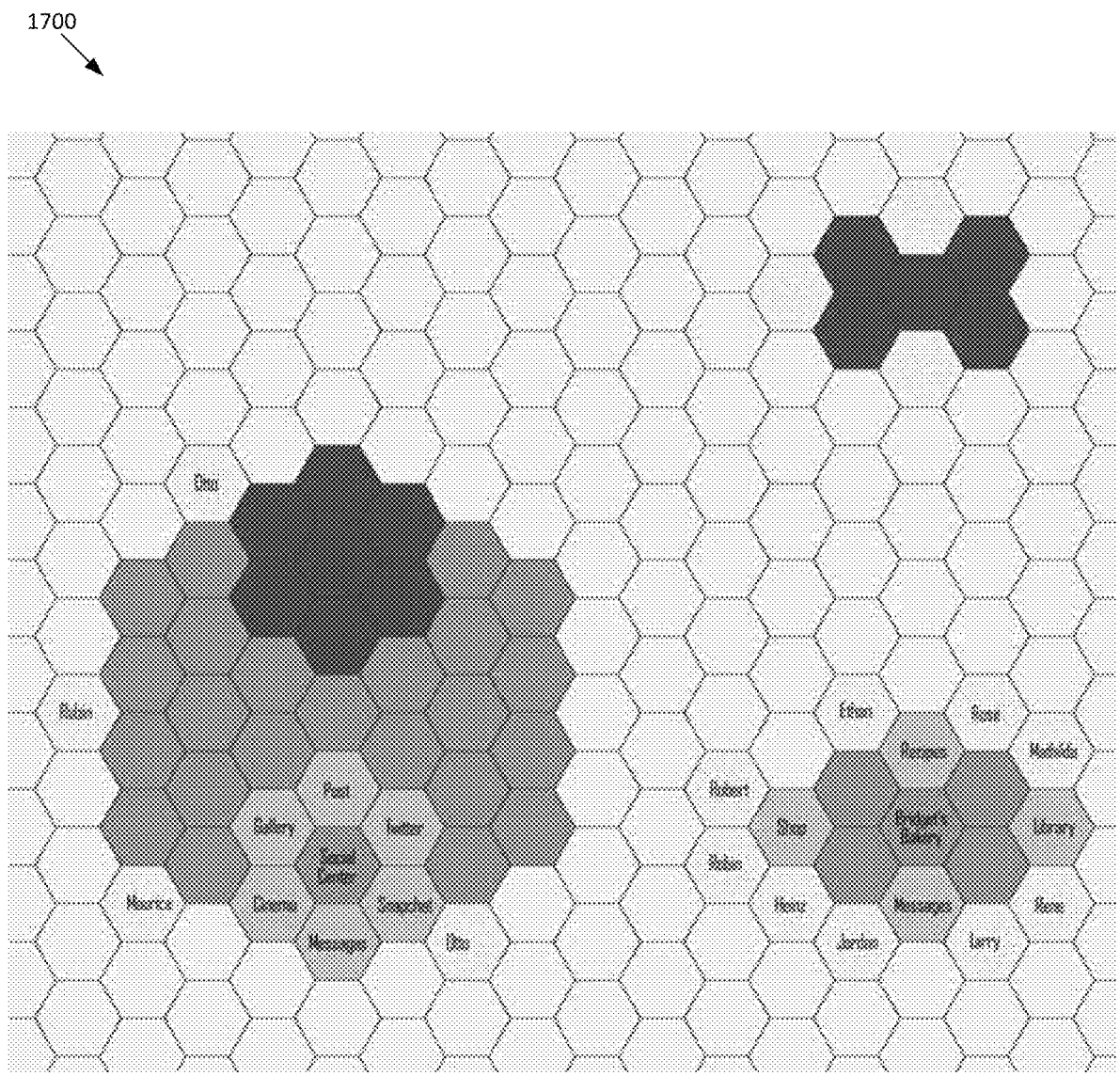
FIG. 17 illustrates an exemplary schematic diagram of a VillaView for Bridget, as shown in FIG. 15, with private areas and/or private tiles, in accordance with an embodiment of the present invention.

FIG. 17 illustrates an exemplary schematic diagram of a VillaView for Bridget, as shown in FIG. 15, with private areas and/or private tiles, in accordance with an embodiment of the present invention. Referring to the present embodiment, VillaView, in contrast to the WorldView shown and described in FIG. 16 earlier, shows our villa in relational social world 1700 as the world sees us, outside looking in (example above). It shows all of the terrain and features of the user-owner's one or more tiles, and all of the associated villas. Thus, the VillaView may be useful for users visiting the user-owner's villa and using its features.

Figure 18A:
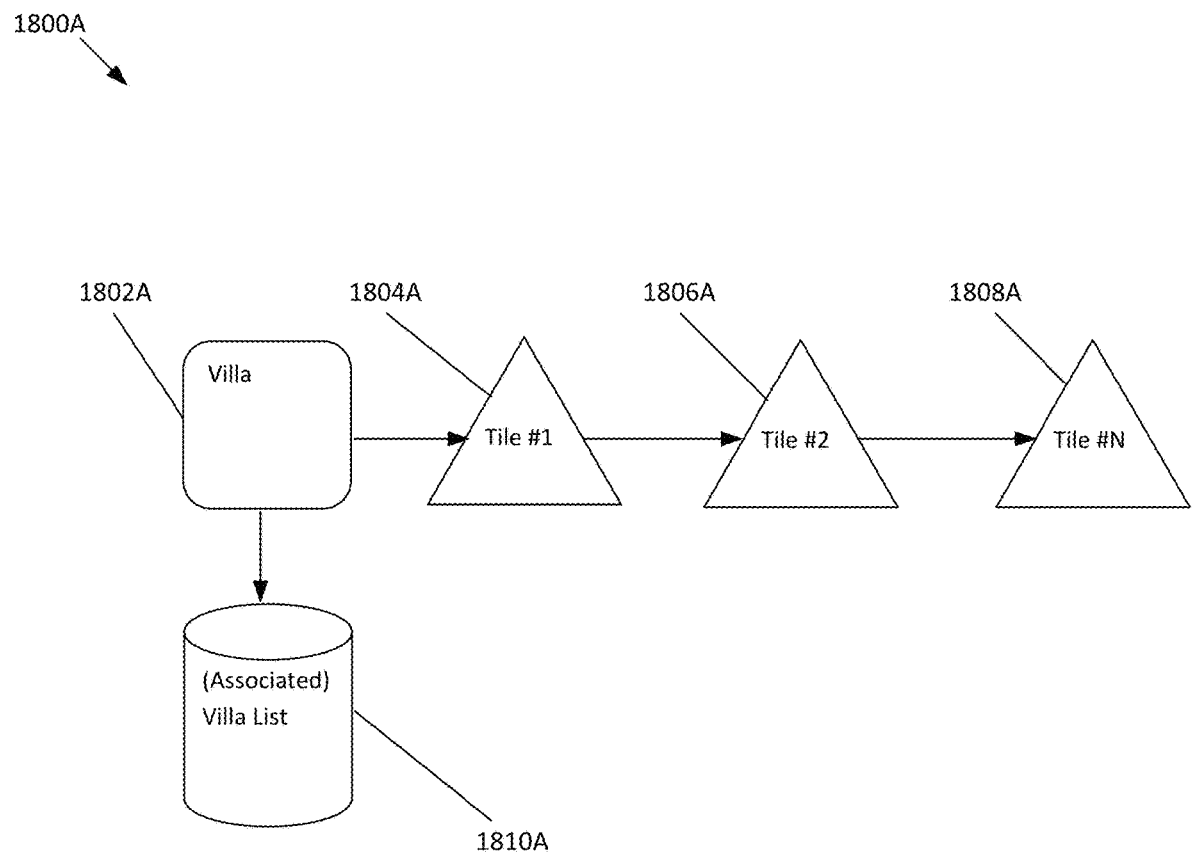
FIG. 18A illustrates an exemplary schematic diagram of a villa structure, in accordance with an embodiment of the present invention.

FIG. 18A illustrates an exemplary schematic diagram of a villa structure, in accordance with an embodiment of the present invention. Referring to the present embodiment, villa structure diagram 1800A shows villa 1802A as a user-owned virtual property composed of one or more central tiles 1804A, 1806A, (e.g., virtual terrain masses) and may have one or more satellite tiles 1808A, etc., and also has a list of associated villas 1810A allowing for access of the user-owner to those associated villas.

Figure 18B:
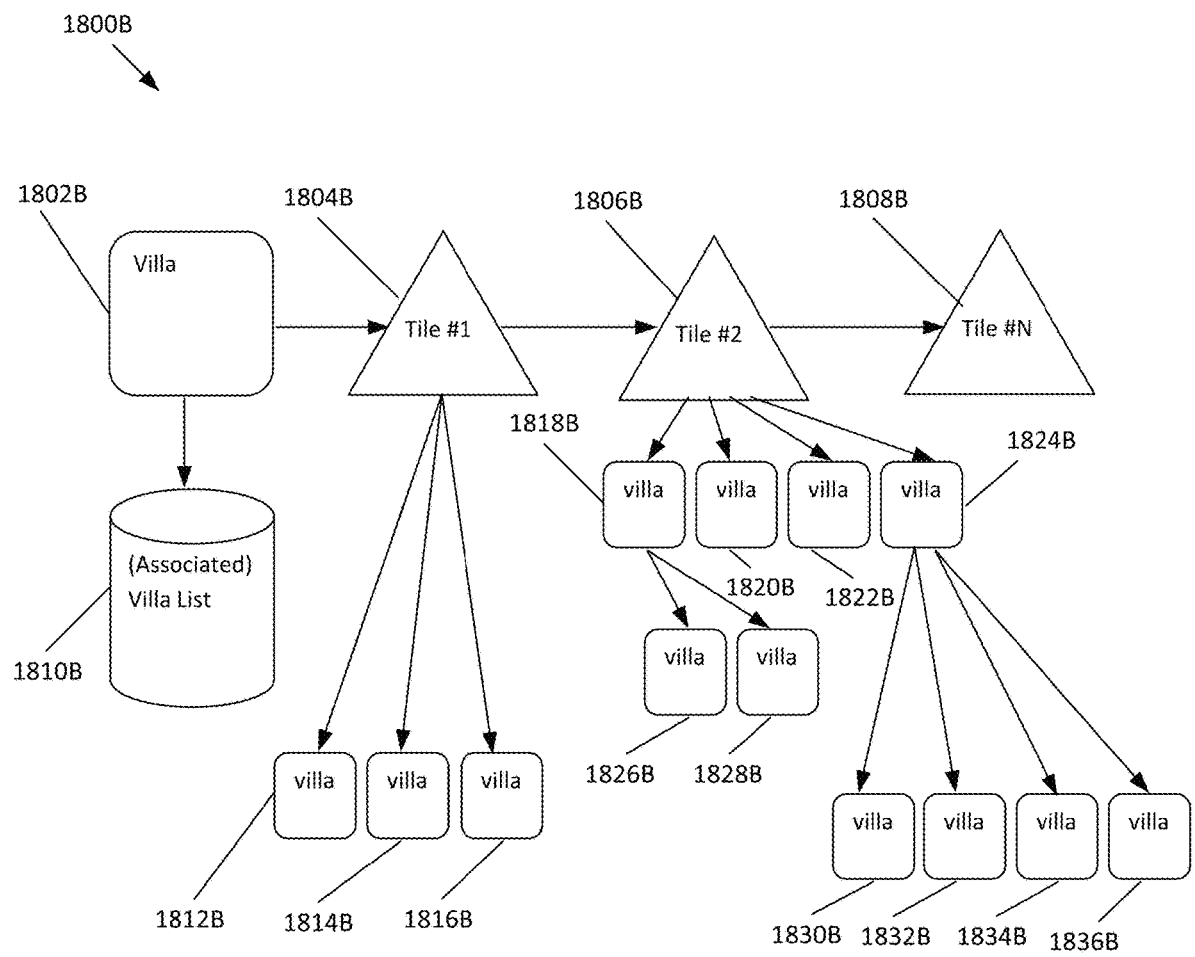
FIG. 18B illustrates an exemplary schematic diagram of a villa structure with multiple subordinate villas, in accordance with an embodiment of the present invention.

FIG. 18B illustrates an exemplary schematic diagram of a villa structure with multiple subordinate villas, in accordance with an embodiment of the present invention. Referring to the present embodiment, villa structure diagram 1800B is shown with villa 1802B having one or more tiles 1804B, 1806B . . . 1808B, associated with a list of villas 1810B. As indicated by tiles 1804B . . . etc., each tile may be expanded into multiple subordinate villas e.g., subordinate villas 1812B, 1814A, and 1816A from tile 1804B, subordinate villas 1818B, 1820B, 1822B, and 1824B from tile 1806B, and so on and so forth, and subordinate villas can link to multiple subordinate villas as above. Subordinate villas 1826B and 1828 link to villa 1818B. Subordinate villas 1830B, 1832B, 1834B, 1836B link to villa 1824B. Thus, when we view a virtual world of a user-owner's villa, such virtual world may actually indirectly reference hundreds of villas.

By way of example and not limitation, a villa may have no terrain in the usual sense and may have any content, including a direct link to a website, a webpage, a custom application, a browser based module, rather than a given villa's social and/or virtual relation to other villas is of importance. Such social relationships ultimately create a virtual map of an online world, regardless of the content of the villas, now and in the future. Thus, villa and/or tile virtual infrastructure as so disclosed may support and/or otherwise accommodate future technologies yet to be conceived in relational space.

Figure 19A:
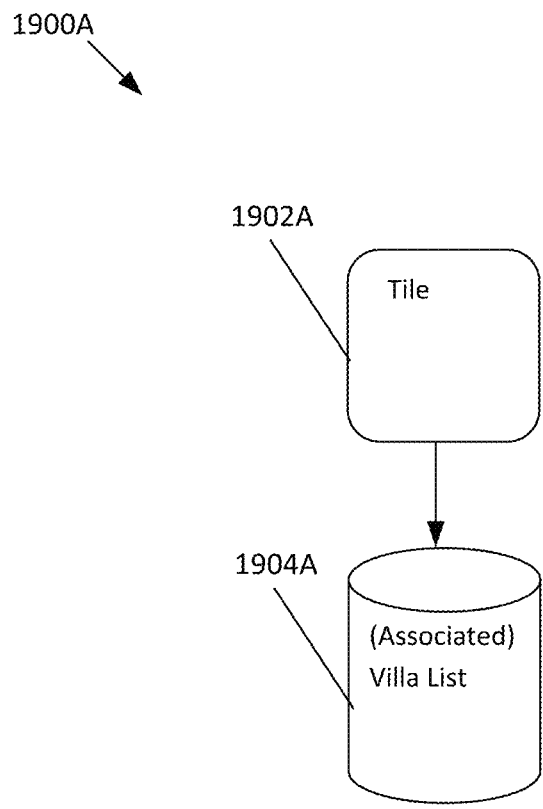
FIG. 19A illustrates an exemplary schematic diagram of a tile structure, in accordance with an embodiment of the present invention.

FIG. 19A illustrates an exemplary schematic diagram of a tile structure, in accordance with an embodiment of the present invention. Referring to the present embodiment, tile structure diagram 1900A is shown with tile 1902A and villa list 1904A associated with the tile. Associated villas as clustered adjacent to a tile, but may actually be grouped in an area inside the tile, or perhaps accessible from a list or drop down menu. By way of example and not limitation, tile 1902A may have terrain features such as land, water, mountains but may also have built structures, e.g., including complex structures created in Blockcraft and/or Minecraft®). Such structures may be visually interesting and allow expression of their owner, but may also help to separate the tile 1902A into different functional areas. Rather than traditional terrain, tile 1902A may have webpages or other symbolic and/or textual content; they may be programmable modules operating from a web browser or even standalone games or applications.

Villas residing on tiles in the virtual worlds presented in the FIGs. may be configured to provide a robust set of functionality, including live social interaction e.g., chat rooms, message boards, personal interaction including avatars, websites, applications, games, and other villas that may be controlled by the user-owner of a given villa, etc.

Figure 19B:
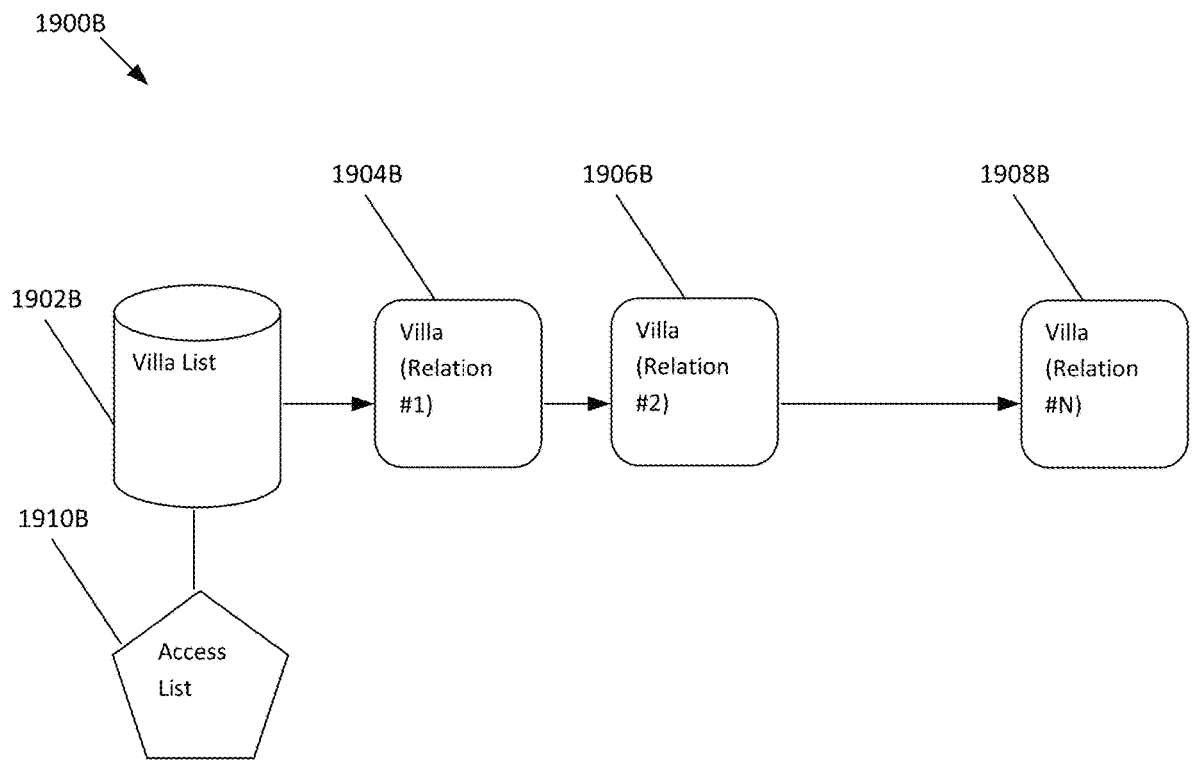
FIG. 19B illustrates an exemplary schematic diagram of a villa list structure, in accordance with an embodiment of the present invention.

FIG. 19B illustrates an exemplary schematic diagram of a villa list structure, in accordance with an embodiment of the present invention. Referring to the present embodiment, villa list structure diagram 1900B is shown with villa list 1902B that has an access list 1910B regarding which villas may associate with a given villa. The order and positioning of associated villas, e.g., villa relation #1 1904B, villa relation #2 1906B . . . villa relation #N 1908B, etc., may be under exclusive control of the villa owner, and provides the ability to manipulate associated villas, their respective content and interaction. Villa user-owners can also choose larger or customized displays for associated villas to make them more distinctive (these are controlled through the Access List). Virtually, a villa's tiles and associated villas represent a neighborhood or private club, with the owner setting the rules to create a desirable social environment for benefit of its members.

Figure 20:
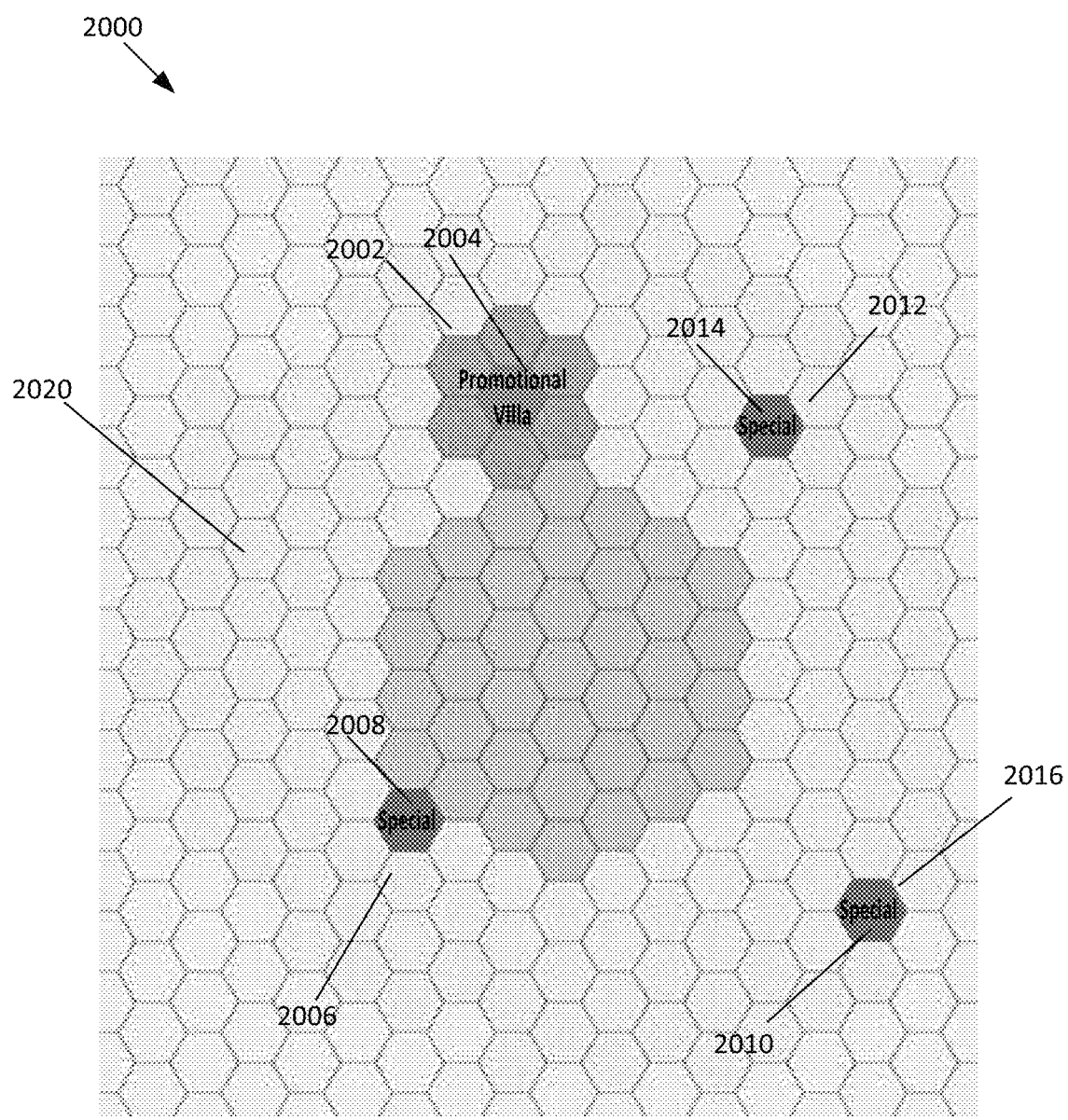
FIG. 20 illustrates an exemplary schematic diagram of a central tile surrounded by associated promotional villas, in accordance with an embodiment of the present invention.

FIG. 20 illustrates an exemplary schematic diagram of a central tile surrounded by associated promotional villas, in accordance with an embodiment of the present invention. Referring to the present embodiment, a villa 2000 is shown with a "Promotional Villa" 2004 residing on a darker-colored, e.g., orange, tile composed of several hexes contained within region 2002. Other villas 2008, 2010, 2014 each labeled "Special" likewise reside on colored tiles in regions 2006, 2012, and 2016, respectively, all of which are clustered around the central tile composed of light-colored, e.g., yellow, hexes 2020.

Such a general configuration of "Promotional Villa" 2004 demonstrates how the villa user-owner, by controlling position and display of associated villas, can leverage his real estate to the advantage of himself and his associated villas. The darker-colored villa "Promotional Villa" 2004 has been granted a central position and larger size and distinctive color to make it more prominent to people visiting the villa. Conceivably the user-owner of "Promotional Villa" 2004 has provided compensation to the villa owner, if necessary or appropriate, for this central position, larger size and distinctive color. Likewise, compensation may have been provided for any one or more of "Special" villas 2008, 2010, 2014. In physical space, real estate has (relatively fixed) value based on physical location (which places it in fixed proximity to surrounding real estate). In relational space, the villa owner has complete control over the contents of his villa, including who (which villas) may associate with his villa's tiles. The (compensated) right to associate in a specific villa will generally be a rental with conditions rather than permanent placement. Many times association will be allowed without any charge. One reason is that a rental villa owner has complete control over what happens in his villa. In a dramatic case, one could imagine a villa buying space in another villa, only to later transform his villa from a school into a shop selling marijuana or other noxious merchandise/services. Of course, it is possible (in principle) to have other legal mechanisms to enforce rules/building codes/etc. in relational space, but as these have not yet developed, we find it easier to view these placements as conditional rentals until other schemes become prevalent.

Figure 21:
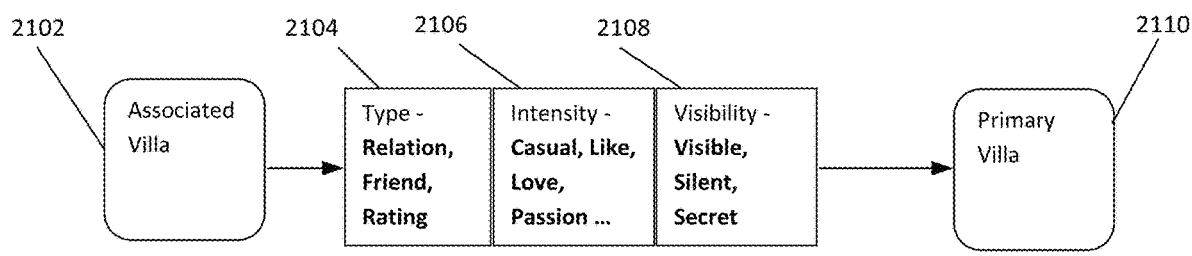
FIG. 21 illustrates an exemplary schematic diagram of attributes of a relationship from an associated villa (at the left) to a primary villa (at the right), in accordance with an embodiment of the present invention.

FIG. 21 illustrates an exemplary schematic diagram of attributes of a relationship from an associated villa (at the left) to a primary villa (at the right), in accordance with an embodiment of the present invention. Referring to the present embodiment, attributes of relationship gradient 2100 visually depicts various aspects of relationship between an associated villa 2102 and a primary villa 2110. Those skilled in the art will appreciate that intermediate sentiment states 2104-2108 are by way of example only and that many other intermediate relation sentiments may exist between associated villa 2102 and primary villa 2110 spanning all contexts of relationships from casual to intense and personal. The design of relational worlds is intended to be as expressive as our relationships. Relationships are not a simple binary choice, but often more nuanced and graded. Some proposed grading of relationships (running from least to most intense) are provided herein. By way of example but not limitation, positive emotional states in increasing severity may include the following: casual, like, love, passionate, and obsessed. Likewise, negative emotional states in increasing severity may include the following: dislike, contempt, disgust, scorn, and revile.

Interpersonal interactions, referred to generally herein as "relations", may be an expression of interest, e.g., demonstrated in a relational social world as placing "Our" villa next to a villa of interest, or another more personal expression of friendship. Friendships may be given preferential order in a set of associated villas.

Relations may also be directional, in that they may extend from one villa (1) to another villa (2), to express the interest of the villa 1 owner in villa 2. As previously described, this may be handled virtually by placing villa 1 next to villa 2 to express interest from 1→2, and this can result in villa 1 being seen as an associated villa on the VillaView for villa 2. On occasion, the interest may be mutual, in which case a second relation extends from villa 2 back to villa 1. This describes the handling of visible relations, and a villa owner can decide whether visible relations are allowed with any of its tiles.

Although maintaining publicly visible relations between villas may be desirable to user-owners in certain circumstances where doing so may be mutually beneficial, other circumstances call for silent and/or secret relations. A silent relation may allow the user-owner to express his interest in a villa without having his villa show up on the VillaView of the primary villa. However, that primary villa will show up on his WorldView, which is accessible only to the villa owner. Silent relations are not directly visible to others, although can be considered when ordering villas based on shared relations. A silent and/or secret relation is not to be used when assessing shared relations between villas.

One reason to use a silent relation rather than a visible relation is that certain villas may not allow visible relations, e.g., for strategic or business reasons. Moreover, some villas might have millions of potential relations, but prefer not to have so many associated villas filling their villa map due to, for example (but not limitation thereto) congestion and usability issues. In these cases, millions of villas can express their relation to the primary villa using silent or secret relations, and the villa of their interest will show up on their own WorldView.

Relationship gradient 2100 may also at least partially relate to the relative ranking of relationships between villas. User-owners may be encouraged to exert care during operation and/or usage of any one or more of the relational social worlds as described earlier as related to the recording and/or grading of relationships to order them on relational map views, e.g., "WorldView" and other means of looking out the window of our home at our nearby relations.

Many villas may have dozens of relations with other villas in various relational intensities as described, thus those relational intensities may be visually and/or otherwise virtually emphasized in the relational social world as being more important than others as indicated by a preferential position. Such linked and/or related villas may be virtually displayed as being on tiles that are adjacent to one-another, e.g., sharing a common edge, forming large shapes and/or tiles, etc. In some embodiments, those villas shown as residing on the center of a tile mass may be perceived by the user-owner and/or other participants of the relational social world as being of greater and/or higher importance than those in the periphery.

Another significant and/or philosophically profound reason for grading relationships may be to successfully identify and locate new relations. By definition, a group of associated villas may share an interest in the current villa. Since they share this one interest, there is a better than average chance that they share other interests as well. The more we know about the interest profiles of each of these villas, the more useful it is to order that group of villas based on overlap with our own interest profile.

Not all villas will allow their respective associated villas to be ordered and viewed in this manner, but for those that do, a viewing user's interest profile may be submitted to the villa server, and receive an ordered list of villas based on overlap with their own interests.

Another means of ordering villas may be based on existing relationships with the user. If a villa is directly associated with the user-owner's villa (or villa has friended user-owner), it may be preferentially displayed, e.g., as shown by some type of indication such as brighter than normal coloration and/or blinking, etc. Similarly, if the user-owner is directly associated with the villa (or the user-owner has friended or otherwise associate with the villa), it may be preferentially displayed, as may any mutual friends and/or associates, etc.

In addition to shared interests and mutual friendships, another potentially valuable way may be to order villas is based on cumulative rankings or judgments from other users. Along the same line, data about visit frequency or contact hours in a villa could be used to estimate its overall popularity with other users. In relational virtual world that may involve, include or support intensely social behavior, the observations and recommendations of other users are a valuable way to assess people and companies that are not otherwise directly known.

Finally, villa user-owner provided data e.g., that he may choose to make public, can be used to prioritize villa display, such as age, gender, education, profession, location, etc. Villas can also be individually ranked based on popularity, integrity, and other factors, yielding crowd sourced assessment of villas (outside of the interest/relational system described above).

Relations relative to one-another between various villas and/or the tiles upon which they virtually reside may form the core of the relational social world, so viewing/assessing and changing relations may be configured to be as easy as user-friendly as possible, e.g., by a right-click of a computer mouse and/or peripheral or hold click of any other villa, e.g., including associated villas. By way of example and not limitation, any one or more of the discussed relational social worlds may include a "Relate Menu" that may include the following items and/or functional capabilities: "Text", to send line(s) of text to villa (and see line(s) of text from villa); "Chat", enter chat mode (+/–audio/video capabilities); "Message", open villa's Facebook style message board Photo and/or Video; "Relation"; type, intensity, visibility of relation, also showing any reciprocal relation (i.e. "Do you think he loves me?"); and, "Sympatico", numerical assessment of relation overlap with villa, computed by comparing "Our" relations to villa's relations Visible user data—including age, gender, and location. Those skilled in the art will appreciate that such items and/or functional capabilities of the "Relate Menu" are provided by way of example only and are thus non-limiting and other suitable functional capabilities may exist without departing from the scope and spirit of the presently disclosed embodiments.

Ratings of villas may also be provided to the user-owner of "Our" villa and/or other participants of the social relational world, where such ratings may relate to any one or more of the following traits: integrity, popularity, buyer, seller (composite ratings on these attributes by other users). The user-owner may also be able to see/register his own ratings of the villa in regarding these various attributes, and/or also see other villa's ratings of the user-owner.

Figure 22:
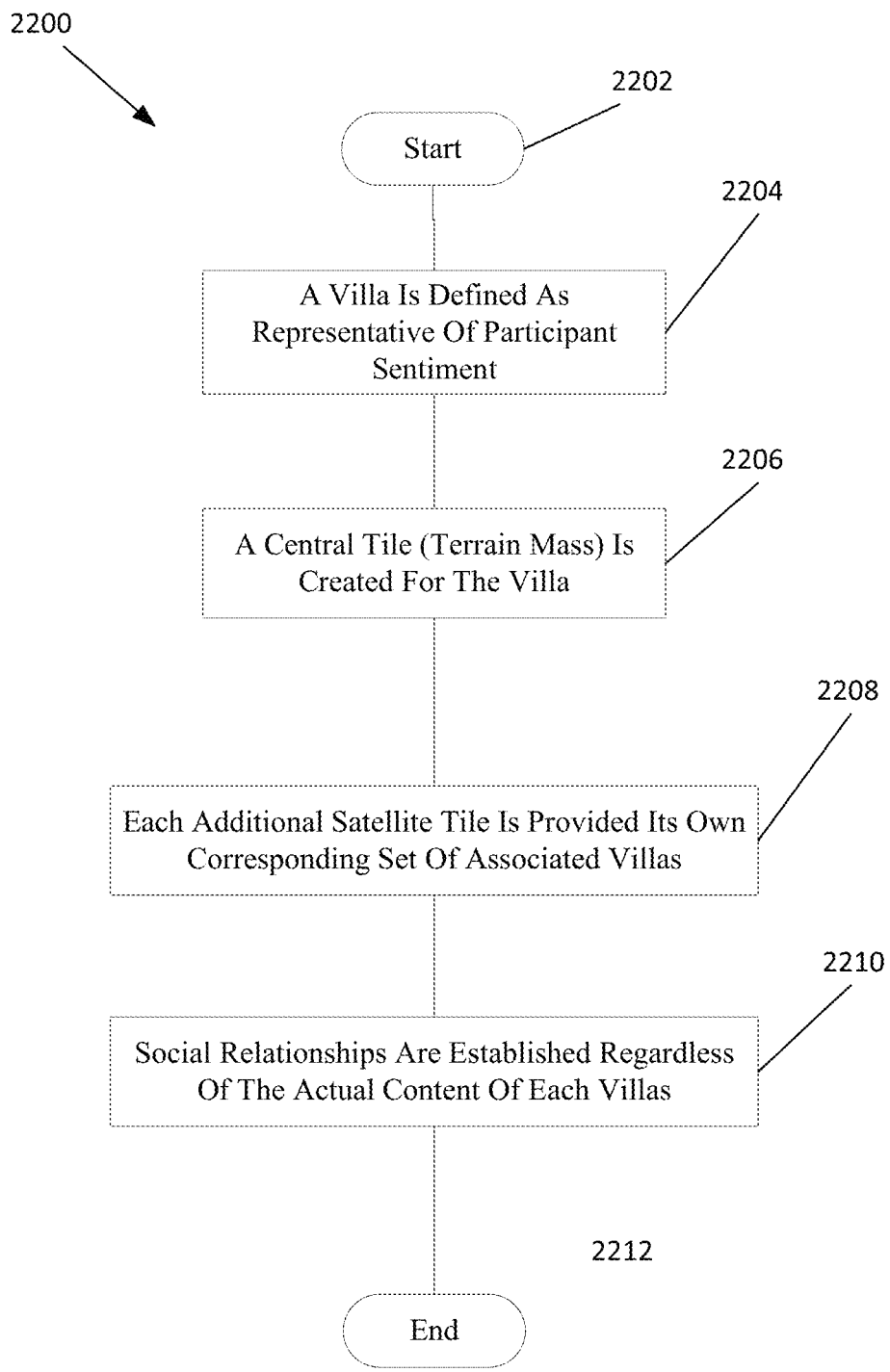
FIG. 22 illustrates a flowchart of an exemplary method of associating villas with a central tile (also referred to as a terrain mass), in accordance with an embodiment of the present invention.

FIG. 22 illustrates a flowchart of an exemplary method of associating villas with a central tile (also referred to as a terrain mass), in accordance with an embodiment of the present invention. Referring to the present embodiment, a method 2200 is shown that may begin at a start operation 2202. In a digital medium environment, a villa may be defined representative of participant sentiment at operation 2204. The villa may be visually and/or virtually depicted as residing on and/or be otherwise associated with a central tile, also referred to as a "terrain mass" at operation 2206.

Additional satellite tiles may be associated with the central tile(s), where each additional satellite tile may have its own corresponding set of associated villas at operation 2208. Social relationships may be established regardless of the actual content of each villas, both now and in the future at operation 2210 prior to culmination of the method 2200 at end operation 2212.

Figure 23A:
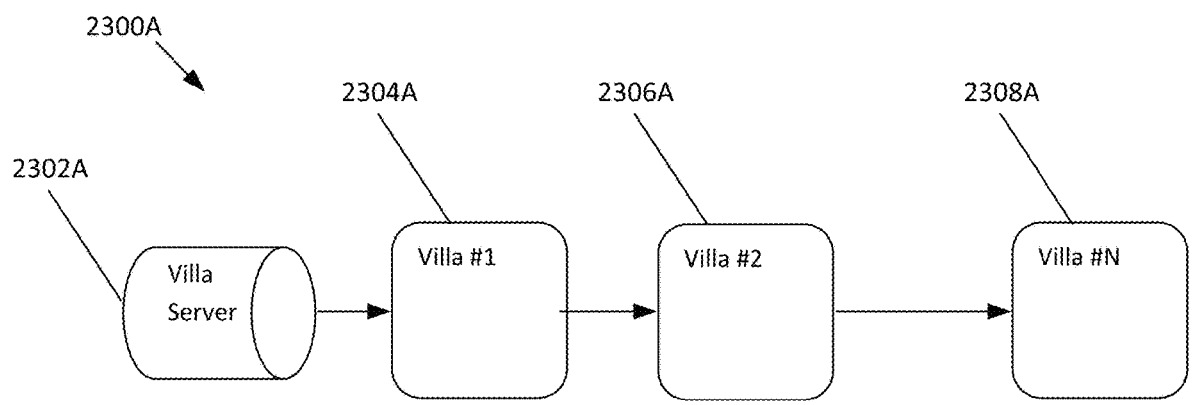
FIG. 23A illustrates an exemplary schematic diagram of a villa server structure, in accordance with an embodiment of the present invention.

FIG. 23A illustrates an exemplary schematic diagram of a villa server structure, in accordance with an embodiment of the present invention. Referring to the present embodiment, a villa server system 2300A may include a villa server 2302A storing any one or more of the following villas: villa #1 2304A, villa #2 2306A . . . villa #N 2308A as may be related to the operation and/or usage of any one or more of the relational social worlds as described herein. By way of example and not limitation, a villa may be stored and managed entirely on a single villa server. However, villas associated with "Our" villa of the user-owner that may contribute to the user-owner's villa map may be stored on other servers. When another villa server or client desires information about a villa, it may digitally subscribe to that villa with its corresponding villa server.

Figure 23B:
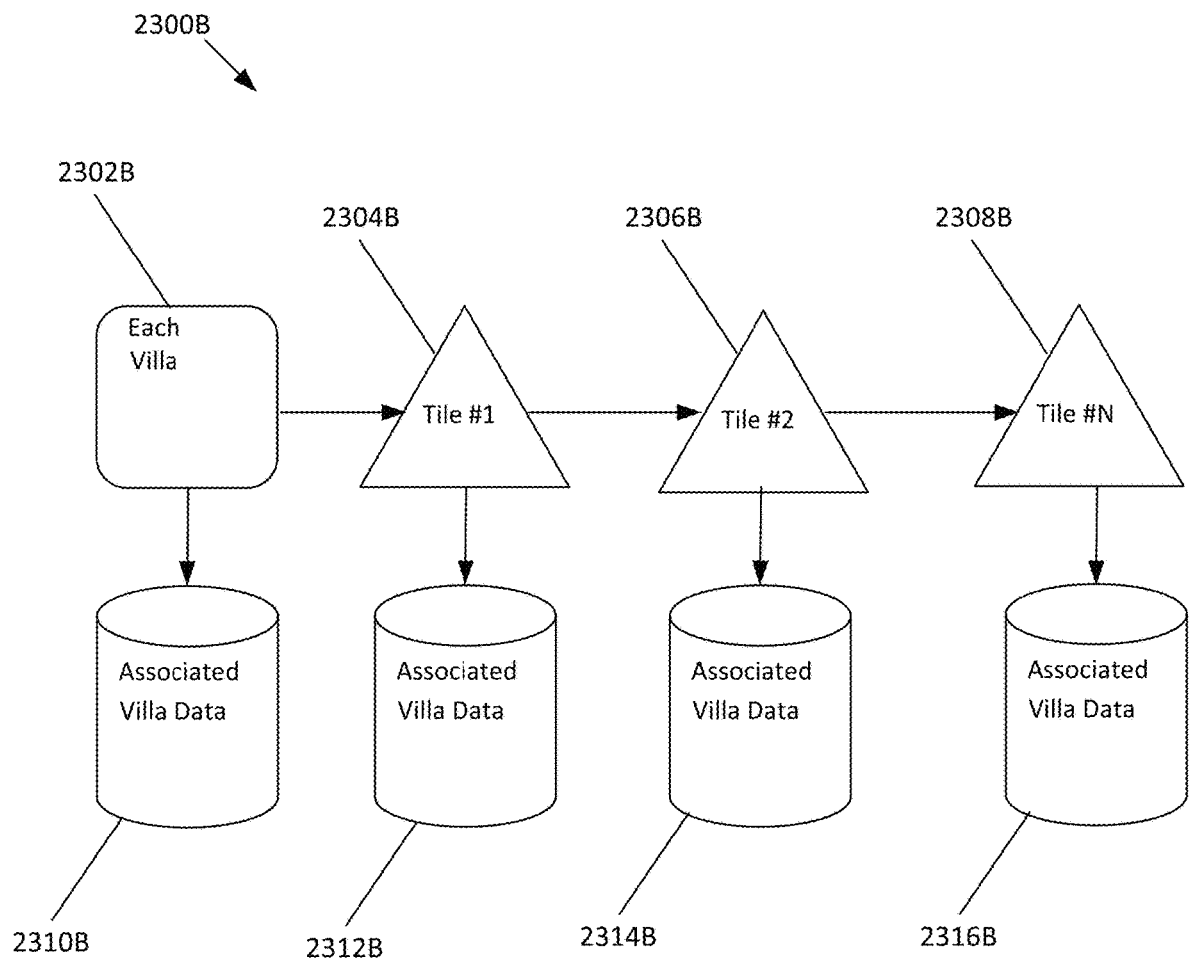
FIG. 23B illustrates an exemplary schematic diagram of a villa structure, in accordance with an embodiment of the present invention.

FIG. 23B illustrates an exemplary schematic diagram of a villa structure, in accordance with an embodiment of the present invention. Referring to the present embodiment, villa structure diagram 2300B includes a representation of each villa 2302B associated with villa data 2310B and one or more tiles, e.g.: tile #1 2304B, tile #2 2306B . . . tile #N 2308B, where each of the tiles may be correspondingly have associate villa data 2312B, 2314B . . . 2316B, etc. When a villa server or client needs data on a particular villa, a villa subscription request may be issued to a villa server, e.g., villa server 2302A as shown in FIG. 23A, indicating the level of data being subscribed. Subscription levels include: "Associate" villa data (e.g., needed to display associate villas); "Expanded" villa data (e.g., including enlarged villa icons, villa symbols, ID photo); "Real-time Status and Communications" (e.g., used for live chat, social interaction); "Full Villa Data" (e.g., required to display full villa map, typically used by villa client for visiting user); "Full Villa Edit" (e.g., required to display and edit full villa, typically used by villa owner and his representatives). By way of example and not limitation, when villa data is received after subscribing to it, the villa data may be stored locally, e.g., on the computing resource of the user-owner of "Our" villa and/or other relational virtual world participants, with a timestamp. On later subscription requests for the villa, the timestamp of local data may be sent to the requester, and if timestamp is up to date, acknowledgement may be sent rather than sending data.

When a villa server loads a villa with associated villas into memory, the villa server may submit subscription requests to the server(s) of all of the associated villas. As data related to these subscriptions are later received by the villa server, they may be transmitted automatically downstream to any other clients/servers that are subscribed to this villa. Since the villa server may have all of the data necessary to sort/filter associated villas, requests for sort/filter may be sent to directly the villa server, avoiding the need to routinely transmit these data to other servers. Also, the villa server may store and maintain the default displayed villa list for each tile, and sends these with subscription requests, in most cases not needing to perform a separate calculation for each subscription.

Display of any of the villas as described may have a practical limit regarding display of associated villas, as additional associated villas may consume proportionate additional screen space and more computing resources (e.g., regarding data transmission) for participants of the relational virtual world who are also loading a common map. Screen display issues may be addressed by establishing configurable parameters for which villas are displayed, and, for example (but not limitation thereto), setting a limit on the number of villas displayed. This allows the villa user to view a subset of available villas to meet his needs while allowing the total number of visible villas to be higher for everyone.

Another challenge inherent to fully interactive games or social networks must be addressed: data transmission costs and/or workloads may be proportional to "N"×"N" (where N is the number of actively communicating users). When each of "N" users does something, that must be communicated to the other "N" users (thus "N"×"N"). As "N" becomes large, the costs become untenable for system resources, so the desire for "massively multiplayer" games may need to be balanced against the practical limits of bandwidth and communication lag.

Keeping "N" small limits transmission and preserves response times. In fixed terrain games with many users, "N" can be reduced by limiting the range of visibility, so that a change from a user may be only visible to a limited N users. In relational space, visibility (N) may be limited by the number of visible associated villas.

With various enumerated exceptions such as, by way of example and not limitation, "Fully Displayed Villas", computer servers need not build a map of their associated villas internally, shifting this load at least in part to corresponding client stations. Nevertheless, in certain configurations of the relational social worlds, a villa may have multiple associated villas which are not tightly associated with any of the tiles of the villa of the user-owner, e.g., such unassociated villas may be referred to as "floating villas", and thus respectively reside on corresponding floating tiles.

Excluding Fully Displayed Villa (FDV) system architecture, a client connecting to a villa server may subscribe to the villa at a full villa level, and specify (where applicable) selection criteria for associated villas. The server may then correspondingly send information about the villa and a list of the associated villas for each villa Tile.

By way of example and not limitation, various graphical representations of the relational social worlds described herein may be at least partially implemented in a "Villa Client Structure", where interactivity therewith may be referred to as involving a "villa client". In such configurations, the villa client may be presented as the viewable "face" of relational space as relevant to the relational virtual worlds disclosed herein, and be presented to a user and/or participant. The villa client and/or villa client structure may display the villa and control user interaction with the villa, and also manage social functions including interaction with associated villas, and direct user interaction with more sophisticated functionality including programmable modules and applications. By way of example and not limitation, the villa client may be at least partially implemented in a web browser. In addition, villa clients will often incorporate functionality to support creation/design and editing of villas. A villa client will often be devoted to one type of terrain (e.g. symbolic, 3D, web pages, etc.) so that the client can be quick to load and efficient in presentation of that terrain type.

Web browsers are ubiquitous and provide familiar user interaction, as well as providing uniform software infrastructure for handling communications, user input and graphical output. Operating inside this environment provides this functionality to the client.

Web browsers traditionally deliver content related to browsing the Internet, including popular websites. Thus, villa functionality may be realized by incorporating website/webpage links into the villa. Enhanced user interaction may be made possible via convenient functional integration of any one or more of the relational virtual worlds with, e.g., Facebook or Amazon. Launching sites within the browser may also be highly efficient, better than running a separate villa client application and then launching a browser for Facebook, SnapChat, etc.

Computational and resource requirements of the villa client may be, in some embodiments, quite modest, allowing it to run as a module or add-on for popular browsers, even on smaller handsets and tablets. Even using interpreted code (e.g. JavaScript) may be sufficient to support considerable functionality at acceptable speed.

Using a commonly available language for villa client development may also make it more likely that popular functionality (e.g. chat rooms, message boards, etc.) that could be incorporated from existing code bases rather than developed from scratch.

Once any one or more of the various relational virtual world embodiments may reach sufficient market penetration, developers of popular web browsers may consider it worthwhile to incorporate such villa client architecture as described into their browsers using efficient native code.

Figure 24:
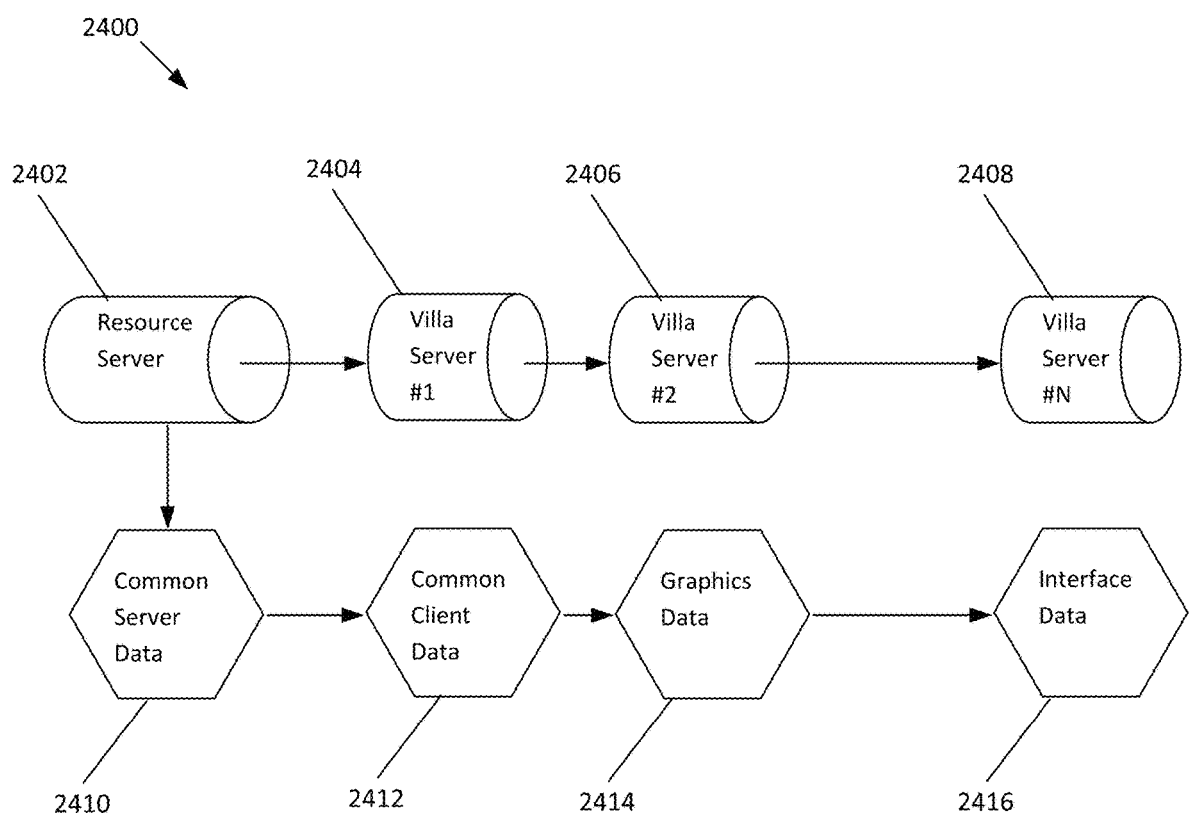
FIG. 24 illustrates an exemplary schematic diagram of a resource server structure, in accordance with an embodiment of the present invention.

FIG. 24 illustrates an exemplary schematic diagram of a resource server structure, in accordance with an embodiment of the present invention. Referring to the present embodiment, a resource server structure 2400 is shown including a resource server 2402 in digital communication with any one or more of villa server #1 2404, villa server #2, 2406 . . . villa server #N 2408. The resource server 2402 may digitally store or communicate with common server data 2410, which may be include and/or otherwise be in digital communication with common client data 2412, graphics data 2416, and/or interface data 2418.

Villa servers and clients may be devoted to handling the computational and/or data transmission-related needs of individual villas. But certain resources may be system wide, such as graphics and other data used by all villas, as well as villa IDs and their corresponding villa server addresses. Such data may be located on a resource server, to avoid duplication on numerous villa servers. On startup, villa servers and clients may connect to a resource server, e.g., resource server 2402, and subscribe to the data they need. If data changes during the subscription, the resource server may send updates to the subscribers. Villa servers may register their villa IDs with the resource server. Villa clients and servers may also subsequently send requests to resource server for the villa server address corresponding to specific villa IDs.

To more completely and/or comprehensively cater to the needs of the user-owner of "Our" villa, e.g., as accessible on individual participants of the relational virtual world, certain user-owners and/or participants may wish to restrict view of certain aspects of the world. Thus, the ability of a user to simultaneously place his villa in multiple locations (in multiple worlds) may be a significant advantage in relational space, where doing so provides the ability to see (and be seen) by all of the users that interest him.

However, while the user accepts the expansive relational space approach to expressing his interests through location, he may also behave discriminatorily, e.g., by not choosing other locations. Such expression of individual preferences and/or discrimination may be supported by the relational virtual worlds as disclosed herein, and also assist the user to limit his view of the world, and those who see and interact with him.

Unlike fixed terrain, the relational space model allows the user-owner to view the worlds in the way most useful and relevant to the user-owner's own perspective. Many different presentations are possible, controlled by parameters selected by the user, which allow the user to efficiently relate to the universe as he sees it. Examples include: "WorldView", "InterestView", "FriendsView", "Travel View" "VisitorView", "FocusViews", and various motifs.

Figure 25:
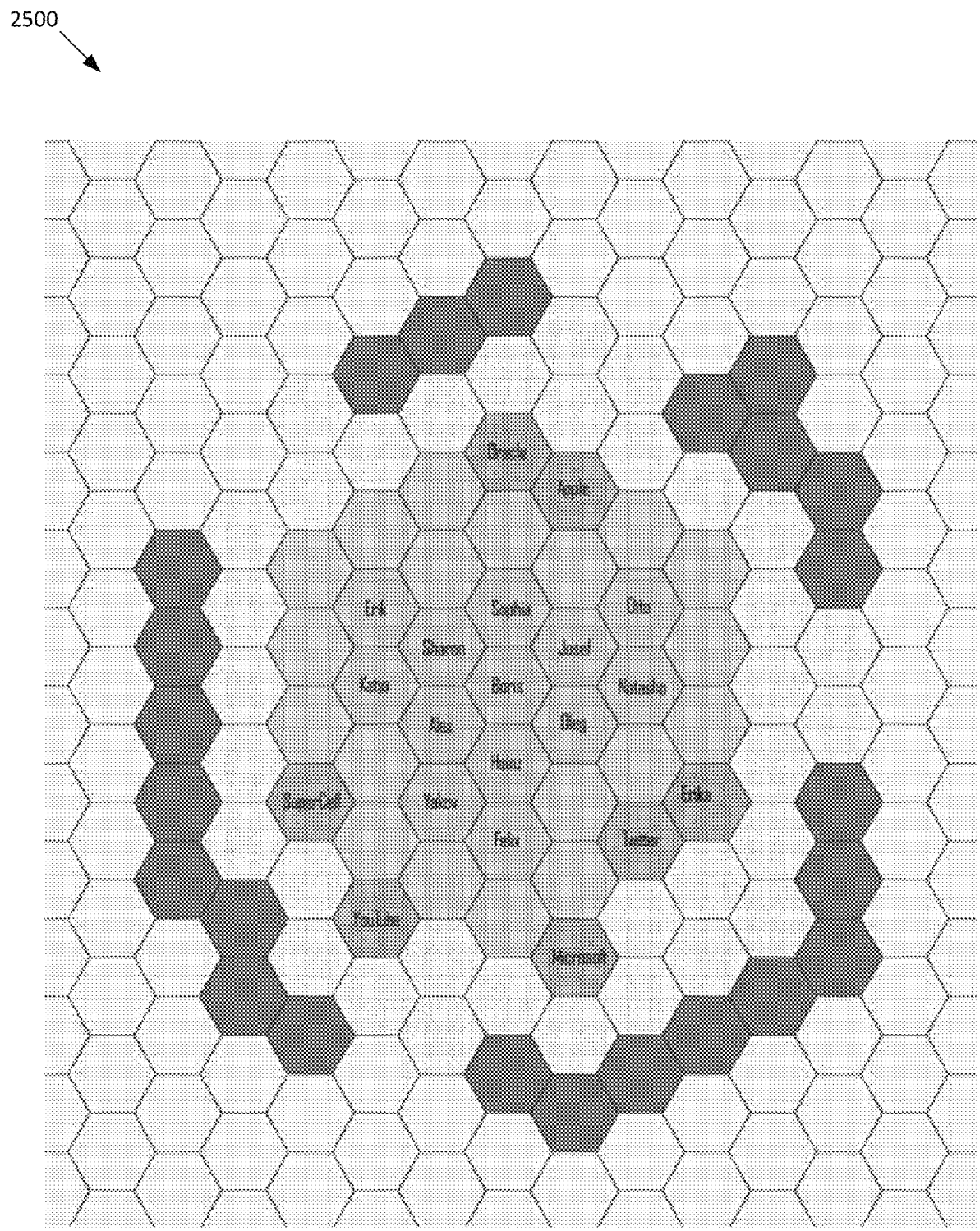
FIG. 25 illustrates an exemplary schematic diagram of a WorldView with friends, interests, visitors, associated points of interests, in accordance with an embodiment of the present invention.

FIG. 25 illustrates an exemplary schematic diagram of a WorldView 2500 with friends, interests, visitors, associated points of interests, in accordance with an embodiment of the present invention. Referring to the present embodiment, WorldView of relational social world 2500 is shown where all villas relevant to the user, including those he has visited may be shown from the perspective of looking out of a virtual "window" of his own villa. By way of example and not limitation, villas that he has visited may be colored orange in example above, those where he has placed his villa (e.g., visible or invisible) may be colored blue, and those which he has "friended" (e.g., including mutual friends) may be colored green, and those villas associated with that of the user-owner may be colored yellow, and those who have visited "Our" villa may be colored grey. The villas may be displayed in concentric circles with those closest to the center governed by priorities (e.g., parameters) set by the user. For example, frequently visited villas may be closer to the center, mutual friends may be closer than unilateral friendships, villas where the user is visible may likely be closer to the center than villas where he is invisible, etc. The user may toggle which of these categories he wants to in/exclude from his WorldView.

Additional views of the relational social worlds other than VillaView and WorldView as discussed may include any one or more of the following: "InterestView", e.g., where a user has placed his own villa, either visibly (more likely near the center) or invisibly (expressing an interest in the world without explicitly soliciting interaction with other villas there); "FriendsView", e.g., displaying villas which have friended the user's villa or which he has friended, typically with mutual friends placed closer to the center than unrequited friends; "TravelView", e.g., displays villas we that the user has visited; "VisitorView", e.g., displays villas who have visited "Our" villa of the user-owner, etc.; and, "FocusViews", e.g., which allow user-owners to create and view focus groups of villas related to specific subsets of interests of the user-owners. In many cases these focus groups would be purely for the benefit of the villa user-owner, but the owner would also have the option of curating and publishing his focus groups and making them available for visitors to his world (e.g., especially clustered around a satellite tile upon which his villa resides and/or is associated with, etc.). A visitor to a villa could copy a focus group as a starting point for creating his own focus group, and a villa owner who does a good job of creating and curating focus groups may be adding to the value of his villa in the eyes of his visitors. Such focus groups could include commentary and content from the villa owner adding value to the collection.

Those skilled in the art will appreciate that numerous other variations on the examples listed above may also be available, each potentially modified by user selected parameters to make them more useful and relevant.

Also, "motifs" may be implemented with any one or more of the relational social worlds as disclosed herein, e.g., where villas may be designed from different building materials to render different motifs. There may be "style" variations that would cause the very same structural elements to be rendered modern, baroque, Islamic, etc.

Moreover, virtual "terrain" as referred to in the context of relational virtual worlds may conjure images of land and sea, or even maps of fantasy worlds, but the general notion of relational space terrain may not be even that restrictive. The tiles and "terrain" thereof supporting any villa can be as the owner of the villa chooses to define it. Further, terrain available today may be quite different from other popular terrain in five or ten years as villas function independently, our villa created today may coexist with futuristic, e.g., currently unimaginable, villa created in the future. Terrain can be any space occupying content owned by the user, best suited for the user's purpose.

Figure 26A:
FIG. 26A illustrates an exemplary schematic diagram of a sports website villa with tiles for multiple teams, in accordance with an embodiment of the present invention.

FIG. 26A illustrates an exemplary schematic diagram of a sports website villa with tiles for multiple teams, in accordance with an embodiment of the present invention. Referring to the present embodiment, a sports villa 2600A is shown, e.g., a villa with special purpose "terrain", from a sports website presenting its content in relational space, which, as generally defined herein and referred to, neither expects nor desires existing content to be converted entirely to a new platform, but rather anticipates existing content to be presented in a different way, taking advantage of the user interactive enhancements of relational space. In some respects, this may be similar to the consideration given to presenting websites on numerous different platforms with different screen shape, resolution, etc.

The power and flexibility of relational space flows from the simplicity and generality of its design. Certain aspects of a villa are known. For example, a villa is functionally self-contained, a villa is composed of one or more tiles (terrain masses), and a villa may associate with ("be near") multiple other villas (or their tiles). From these known aspects, it may be inferred that a villa client will handle the function of the villa tiles and display of associated villas.

Having considered what is known, what is unknown is reviewed and how that helps us. First, the user does not know the nature of the terrain in our villa. There are many possibilities—it may be symbolic with hexes, rectangles or squares. It may be 2D or 3D. It may have moveable (visible) user avatars. It may have webpages. It may communicate/interact directly with websites (Facebook, Twitter, etc.) It may have computer driven animations. It may have highly complex programmable functionality, perhaps even requiring many megabytes of games and data. We have discussed all of these possibilities but never said that any one of them is defined to be part of the present invention.

Because so much is unknown, it is best for our villa client to focus on handling one (or two) of the terrain possibilities, limiting its size and complexity, e.g., simultaneously supporting 2D/3D/hexes/rectangles/avatars/animation/etc. would require an immensely complex villa client, as well as support the possibility of aesthetically incoherent combinations. It can also be inferred that all of the terrain in a villa will be restricted to a type supported by its villa client. This restriction of terrain types within a villa is not really detrimental because mixing disparate terrain types, even if possible, is likely to be aesthetically undesirable.

Secondly, the nature of the terrain in the associated villas is also unknown. Without knowing the terrain of an associated villa, the user cannot be sure that the villa client will support it. However, as described above, it can be inferred that the villa client does not care about the terrain or function of associated villas. This is very liberating, and quite necessary. It means that the villa client only needs to support the terrain contained within the villa. And further, it means that the current villa is totally free to associate with other villas, without regard to their terrain. Conversely, any villa (regardless of terrain) is capable of associating with our villa.

This is important and true, not only now, but for the future. In ten or twenty years, villas we cannot know with functions we cannot conceive will still be able to associate with our villa. Having been so dogmatic, it is not actually true to say that the villa client knows and cares nothing about the associated villas. Some information (such as villa name, villa icon, how to display the associated villa, and data to be shared with the associated villa, e.g., to support portals, is known and handled by the villa client). But handling this limited information about associated villas is much less onerous that trying to support their functionality—leave that to the villa client for each of the associated villas. As for the question of transition screens or animations—we leave that question to individual villa clients—a question to be answered on a different day to best meet the needs of the users. It is not defined by our method.

As shown in sports villa 2600A, four central tiles are included, each implemented with a web page presentation module that allows direct display of web content. Photos and articles may be displayed, or videos and movies may be presented by other websites. At the bottom of each tile may be functional buttons providing features such as "Message" (like Facebook), live Chat, Videos and a link to a Shopping module which may be run by the website owner, or possibly licensed/rented to another client using this popular website to market its merchandise. Along the borders of each tile may be placed multiple white rectangles, each of which may represent associated villas from other users. Although many our previous illustrations used hexes for spatial representation, villas may also be represented with rectangles as shown in sports villa 2600A. Other polygons or positional elements may also be used. Herein, sports websites are described. However, other webpages and content could have as easily been considered—Washington Post, Twitter, political websites, hobby sites, etc. There is immense content available from web pages, and it should be easy to integrate such content into the villa clients for relational space. It is probably easiest to do that if the presentation if webpages is rather similar in the villa client to what the user might experience from an ordinary web browser.

Figure 26B:
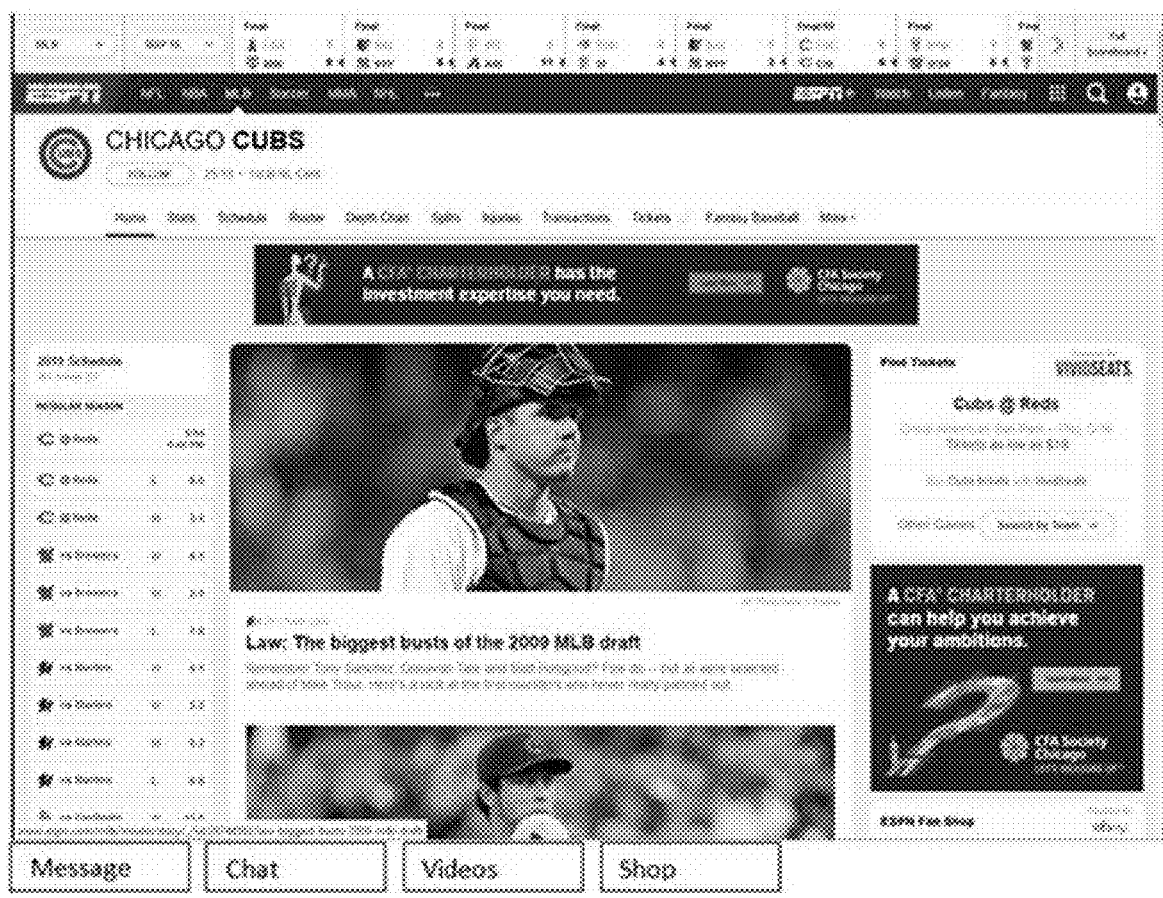
FIG. 26B illustrates an exemplary schematic diagram of a tile for the Chicago Cubs® in a full-screen TileView, in accordance with an embodiment of the present invention.

FIG. 26B illustrates an exemplary schematic diagram of a tile for the Chicago Cubs® in a full-screen TileView, in accordance with an embodiment of the present invention. Referring to the present embodiment, a full-screen TileView of a Chicago Cubs® tile 2600B is shown, where a user may select the Cubs® tile from the sports villa 2600A shown in FIG. 26A to bring up full-screen TileView of a Chicago Cubs® tile 2600B.

Figure 27:
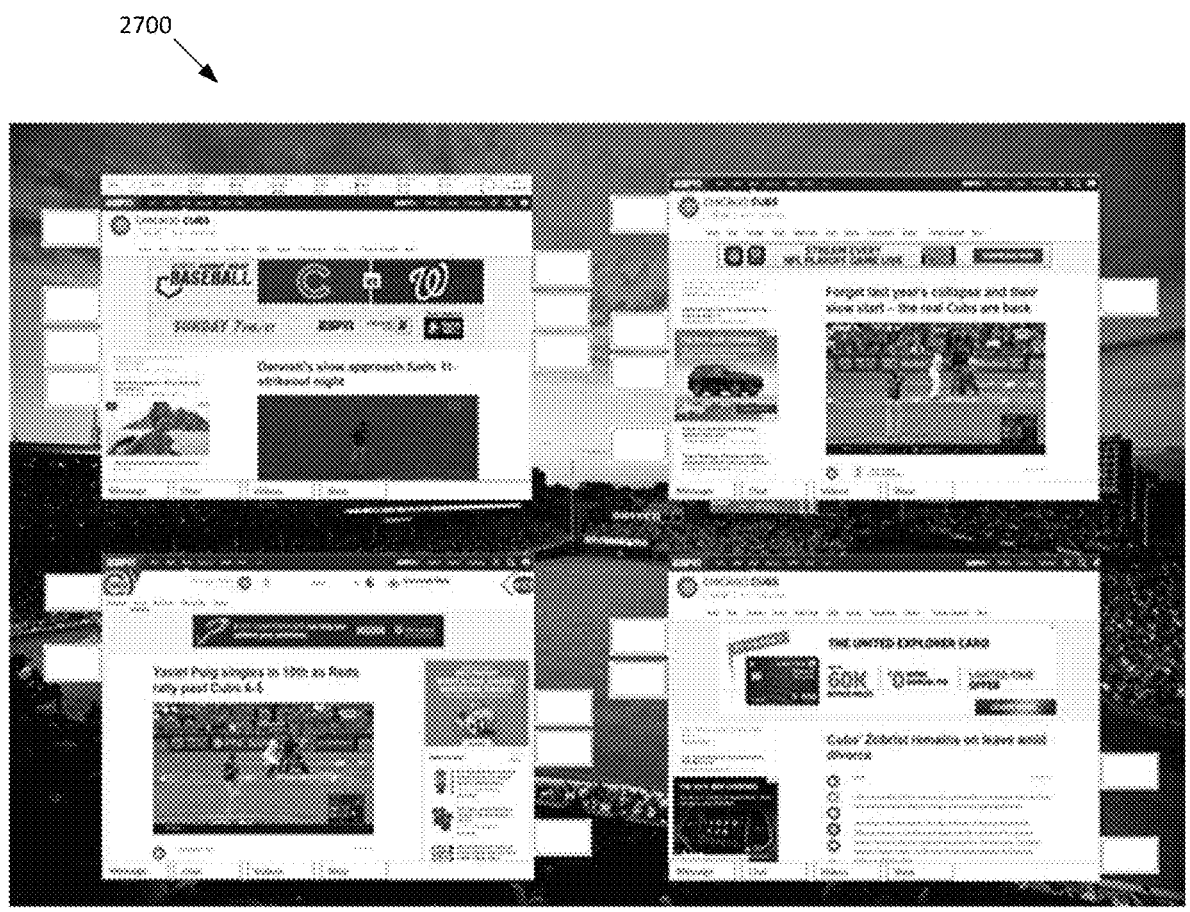
FIG. 27 illustrates an exemplary schematic diagram of a Cubs VillaView with multiple subject tiles, in accordance with an embodiment of the present invention.

FIG. 27 illustrates an exemplary schematic diagram of a Cubs VillaView with multiple subject tiles, in accordance with an embodiment of the present invention. Referring to the present embodiment, Cubs® VillaView with multiple subject tiles 2700 is shown as being displayed after an action for selecting one of the tiles at earlier screens, e.g., sports villa 2600A. Selecting the Cubs tile may bring up VillaView for a Cubs villa, as shown earlier, where the villa has a background image of Wrigley Park and a multiple tiles with Cubs content as shown. The villa owner has considerable control over default response to user actions such as selecting a tile. The small white rectangles may represent associated tiles of other villas, e.g., pursuant to preferences input by the user-owner, etc.

Figure 28:
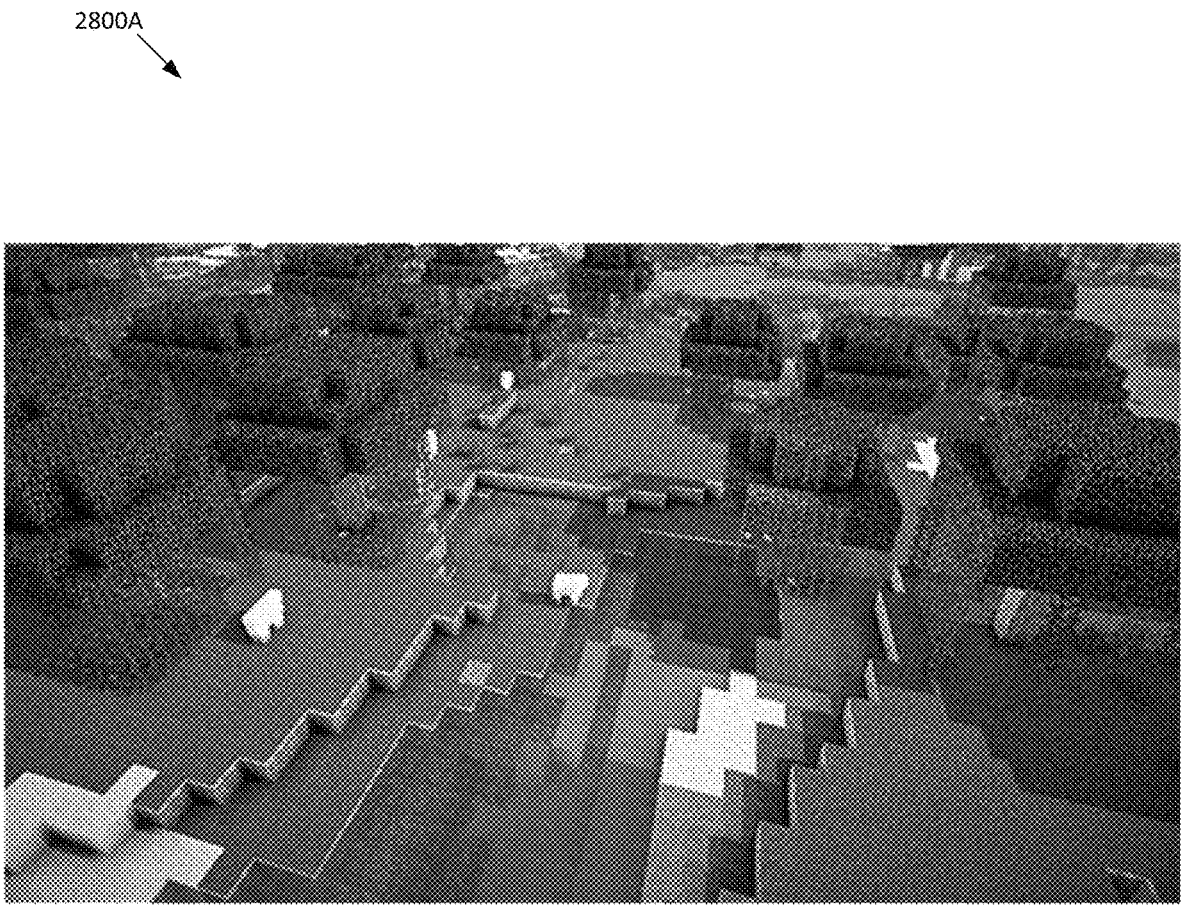
FIG. 28 illustrates an exemplary screenshot of a three-dimensional ("3D") VillaView, in accordance with an embodiment of the present invention.

FIG. 28 illustrates an exemplary screenshot of a three-dimensional ("3D") VillaView, in accordance with an embodiment of the present invention. Referring to the present embodiment, a three-dimensional ("3D") navigable view 2800A is shown of any one or more of the villas and/or tiles upon which they reside as may be implemented by the relational virtual worlds of the presently disclosed embodiments. Such a view may be seamlessly integrated with any one or more of the two-dimensional ("2D") relational virtual worlds presented herein allowing for user-owners of villas and/or participants to travel from one view and/or context to another as per their individual preference. This implies that users can select whether to view in 2D or 3D. This might be possible in some circumstances, but the terrain will be expected to be rendered in a relatively predictable and unchanging way. But of course, that would be at the discretion of the authors of the villa client for that terrain type. Some villa owners may allow visitors to be present with visual and/or virtual avatars that may explore their villas and meet others by moving around physically between the tiles in the villas. Such villas may have rich visual features (e.g., landscape and buildings worthy of exploration). Such convenient navigation of relational social world participants and/or user-owners in 3D caters, for example (but not limitation thereto), inherent interests in already familiar persons, as opposed to professional content created by strangers, e.g., the "Facebook" effect as introduced earlier.

Figure 29:
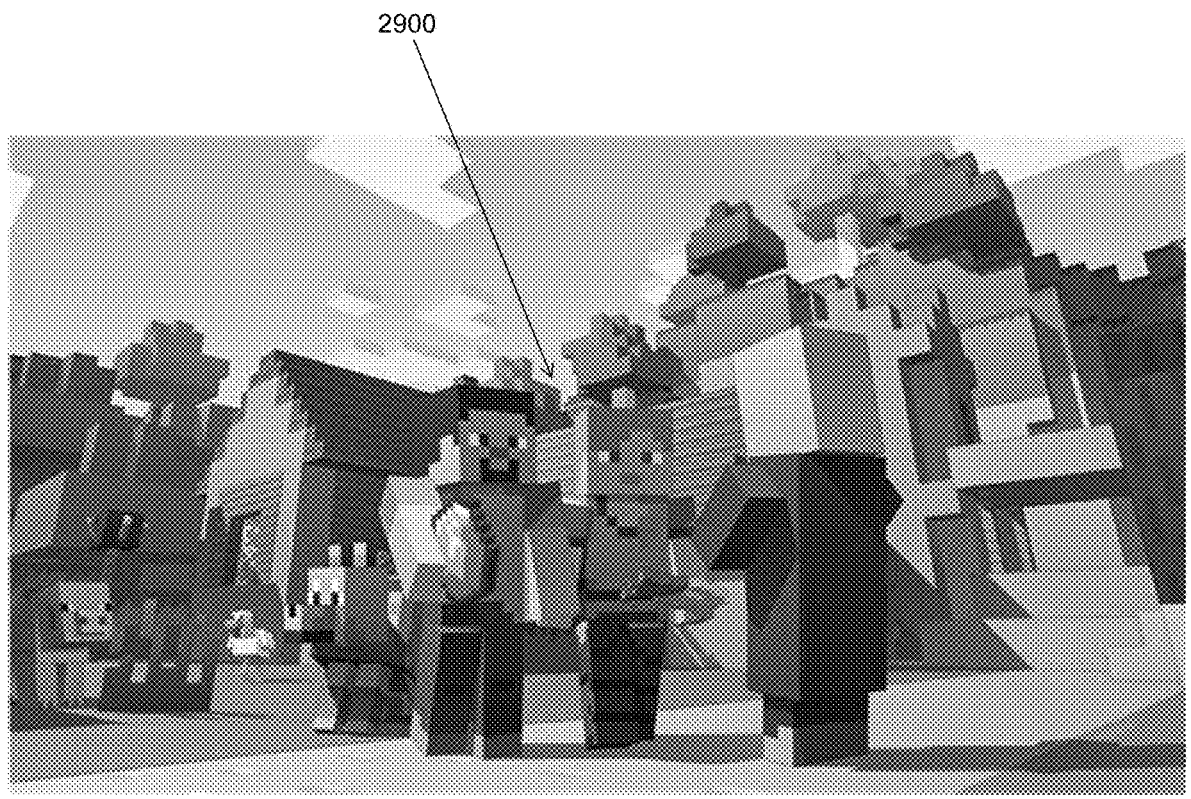
FIG. 29 illustrates another exemplary screenshot of a 3D VillaView with avatars interacting, in accordance with an embodiment of the present invention.

FIG. 29 illustrates another exemplary screenshot of a 3D VillaView with avatars interacting, in accordance with an embodiment of the present invention. Referring to the present embodiment, 3D view with avatars interacting 2900 is shown, where such villas may accommodate complex social interaction inclusive of competition and conflict resolution between various avatars. Such villas may be prepared and/or otherwise configured to maximize social relations relative to the world at large to benefit their visitors and user-owners.

Figure 30:
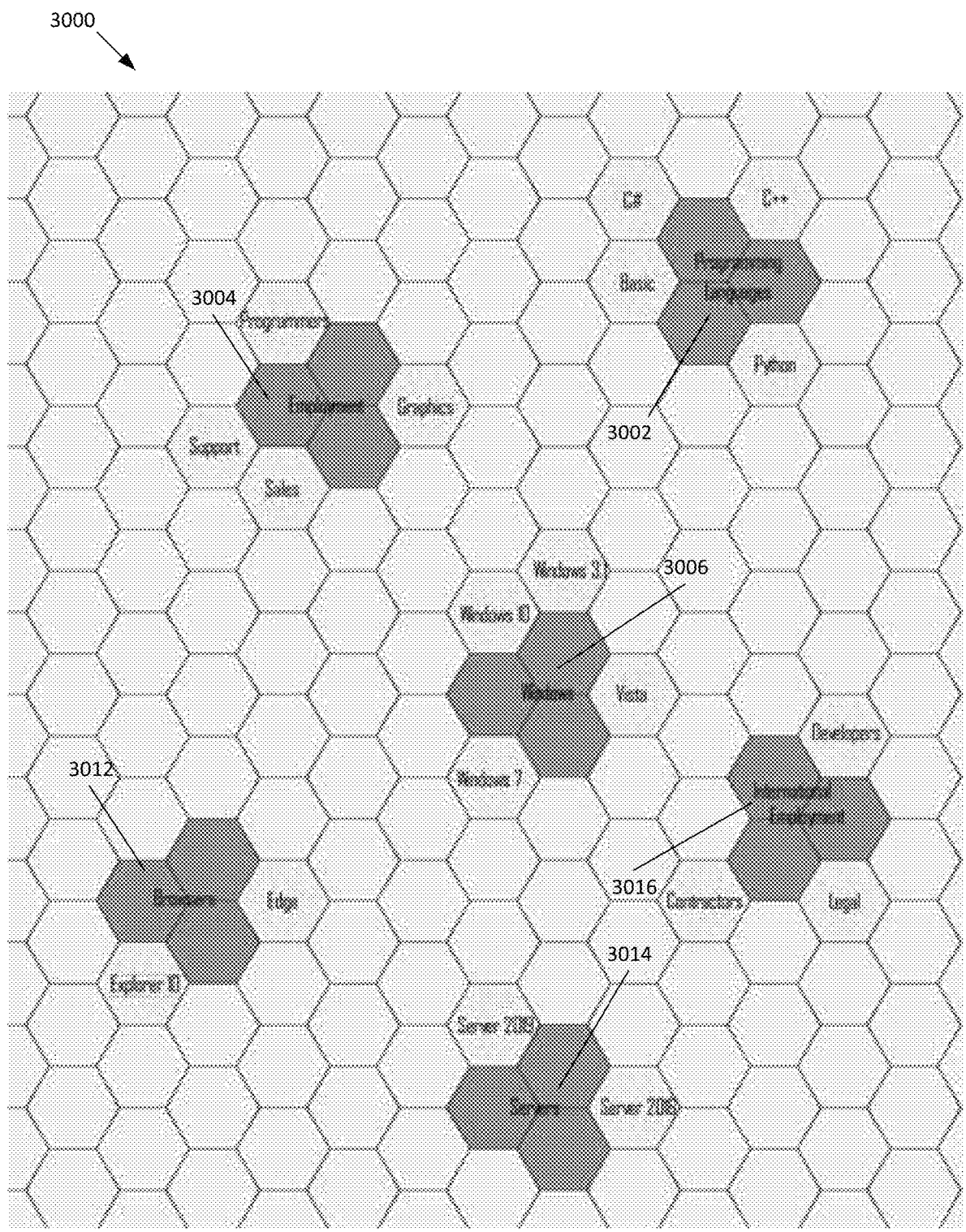
FIG. 30 illustrates an exemplary schematic diagram of a VillaView for Microsoft® demonstrating scalability for large-scale applications, in accordance with an embodiment of the present invention.

FIG. 30 illustrates an exemplary schematic diagram of a VillaView for Microsoft® demonstrating scalability for large-scale applications, in accordance with an embodiment of the present invention. Referring to the present embodiment, relational social world 3000 is shown as a VillaView, where villas, e.g., including "Programming Languages" tile 3002, "Employment" tile 3004, "Windows" tile 3006, "Browsers" tile 3012, "Servers" tile 3014, and "International Employment" 3016, shown herein are infinitely scalable (e.g., recursively defined), and may thus support massive digital enterprises (e.g., using villas of villas of villas . . . etc.). Villas may reside on groupings of multiple tiles, and tiles may be of various sizes, e.g., large. In addition, there may be dozens, or even hundreds, of associated villas for a given villa, bringing forth the need for filtering or selecting subsets of associated villas for the convenience of the viewer.

A sample top level villa for Microsoft is shown in relational social world 3000, breaking the company into several tiles, each tile having a number of associated villas which may be owned by Microsoft® and associated with tiles as shown. A programmer could express his interest in the programming languages by selecting the associated villa for C#, e.g., adjacent to "Programming Languages" tile 3002, to bring up a villa window for Microsoft C#, and so on and so forth.

Figure 31:
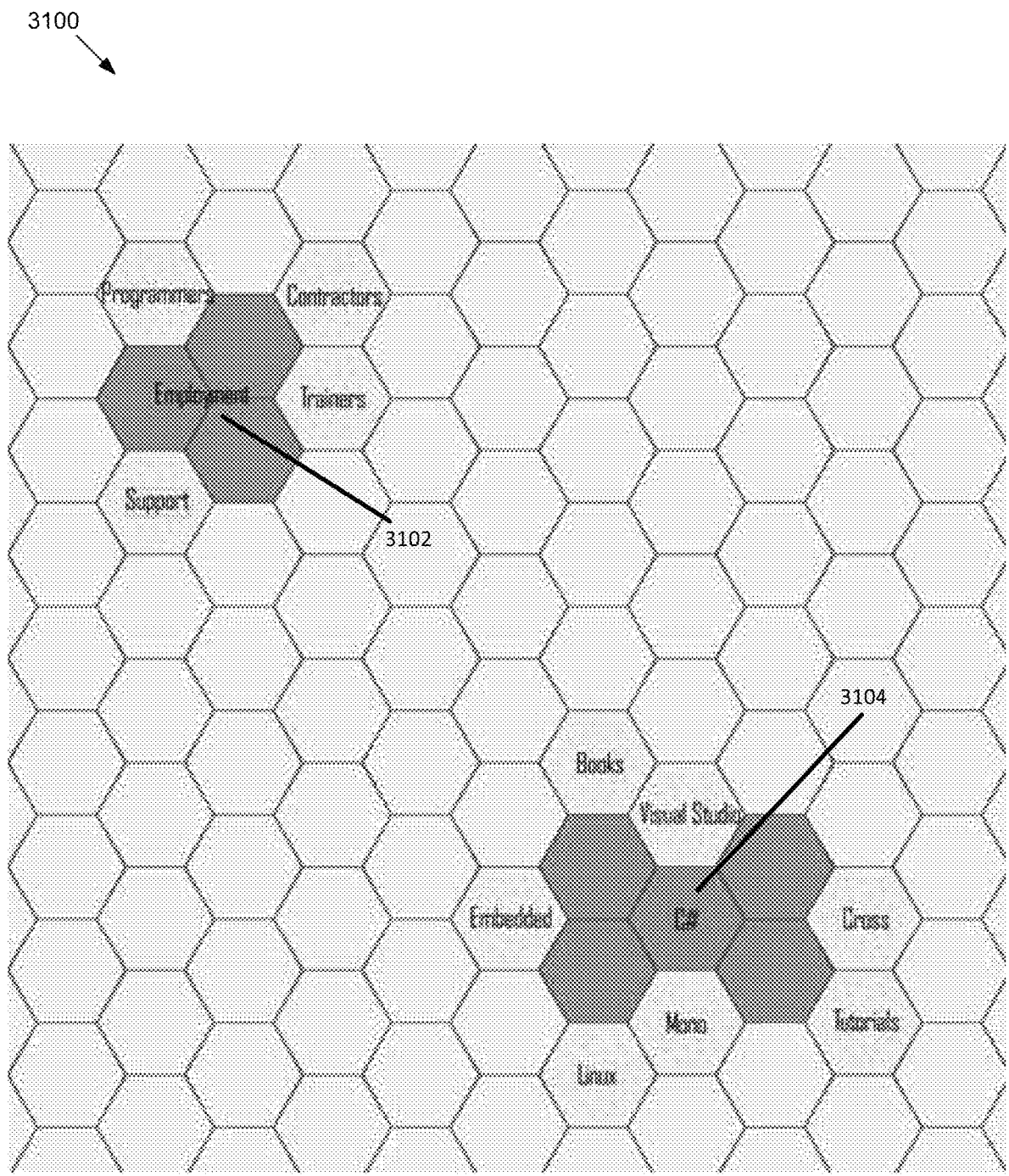
FIG. 31 illustrates an exemplary schematic diagram of a VillaView for the selection of the "C#" villa shown in FIG. 30 with subject tiles and associated villas, in accordance with an embodiment of the present invention.

FIG. 31 illustrates an exemplary schematic diagram of a VillaView for the selection of the "C#" villa shown in FIG. 30 with subject tiles and associated villas, in accordance with an embodiment of the present invention. Referring to the present embodiment, relational social world 3100 is shown, where entering VillaView of "C#" villa 3104 may bring up several more options, each option becoming increasingly specialized, etc. By way of example and not limitation, several more successive selections may bring the user to a desired destination. At a user-specified endpoint, the user can place his villa at one or more points of interest to allow direct access in the future without traversing through all of the levels.

A user may reach his destination by different relational routes, much as a user can take different physical paths on a fixed terrain map. For example (but without limitation thereto), a C# programmer seeking employment may select the "Programmers" villa adjacent to the "Employment" tile 3102, on the main Microsoft villa, but may also select "C#" villa from the Programming Languages tile 3002, only to later select "Programmers" villa. This illustrates the value of allowing a villa to have multiple relational links, just as a place on a fixed terrain map has multiple routes to reach it.

Figure 32:
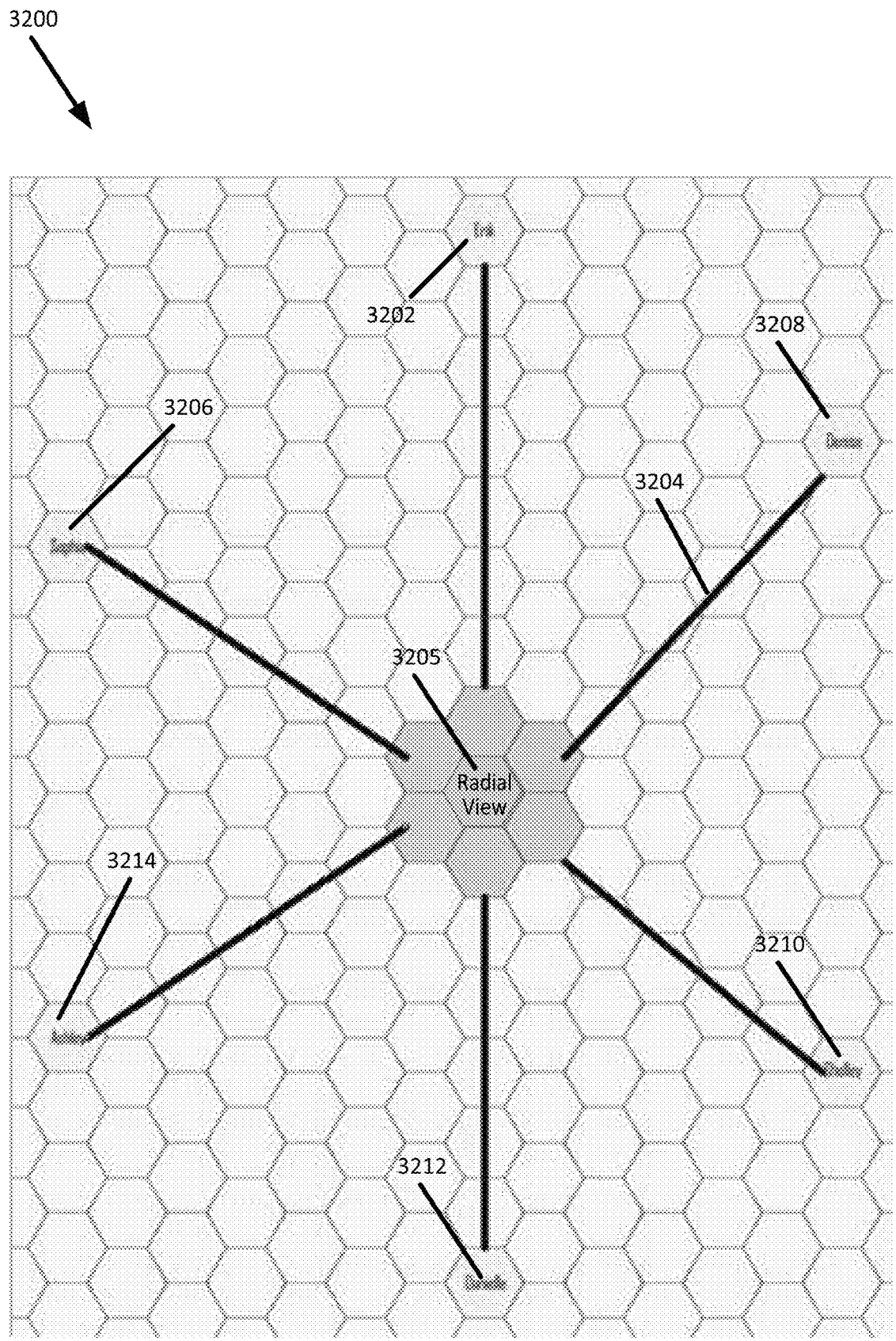
FIG. 32 illustrates an exemplary schematic diagram of a radial VillaView alternative, in accordance with an embodiment of the present invention

FIG. 32 illustrates an exemplary schematic diagram of a radial VillaView alternative, in accordance with an embodiment of the present invention. Referring to the present embodiment, relational social world 3200 is shown in a radial VillaView with "Radial" villa 3208 at a center of relational virtual world 3200, with an array of radial lines 3204 drawn to associated villas, e.g., "Erik" villa 3202. The associated villas also include "Sophia" 3206, "Denise" 3208, "Shelley" 3210, "Danielle" 3212, and "Ashley" 3214. Even in a radial view context, virtual relational space still exists as a real estate paradigm, but is adjusted in terms of navigation and/or presentation to better suit individual preferences of user-owners and/or participants.

The radial view is philosophically inferior because it lacks certain sorting and filtering capabilities, and it is also less efficient in use of space. However, the radial view is cited purely for the purpose of demonstrating that other methods of displaying a villa and its associated villas could be used, but would still essentially be a relational space model. Another alternative would be to have an indented list with the "Radial villa" at the upper level and the associated villas listed by name lines (text) indented below the "Radial villa" line. As an example, "Facebook maps" display information about where a user has been, or where he has been referenced by others, etc. "Facebook maps" are vaguely similar to direct expression of villa associations. Presumably Twitter has something similar which can be derived from their #hashtag occurrences. Obviously, Facebook "friending" is somewhat similar to the idea herein of expressing a relation. Thus, the expression of a social relation may not be novel, the use of relations to structure a new kind of virtual space, e.g., "Relational Space", is new.

Throughout the various relational virtual worlds shown and discussed in the present embodiments, a villa may be placed and/or positioned next to another villa to express relation e.g., to accommodate the notion of moving "Our" villa to a desired location. Observing a VillaView, it is possible to view a villa with its associated villas clustered around it. In contrast, looking out of a virtual "window" of the villa shows other villas to which it is (simultaneously) adjacent, e.g., in a WorldView.

By way of example and not limitation, in one or more embodiments, rather than placing his villa next to another villa to express his interest, a user-owner of a villa may simply indicate his interest without placing his villa in multiple locations. In such circumstances, if a villa is not next to the villa of interest, it may not be directly visible to other villas in the vicinity, requiring the user-owner to have some other means of detecting villas that shared his interest without being physically present. This specifies an alternate means of specifying an association, rather than adjacent placement of one villa near another, to demonstrate that visually different schemes for association are still essentially using our method.

Another variation of expressing relations would be to drag an interest next to "Our" villa in relational space. In such a circumstance, "our" villa would be visible as an associated villa on the villa view. Nevertheless, many user-owners may prefer (moving his own villa rather than moving another villa toward his own, etc.) Here, dragging an interest near "our" villa expresses association as an alternative to placing our villa near our villa of interest. Thus, a cosmetic difference in how a relation is expressed does not avoid overlap with relational space according to an embodiment of the present invention.

Another variation may be to use fixed terrain maps but allow a user-owner to place his villa in multiple locations on these maps. Doing so, his villa would be seen as an associated villa from the perspective of all villas where he placed his villa. However, villas of users may come and go and the areas around the villas would have multiple vacancies and dormant areas. Aesthetically such a situation may be visually unappealing, and may also have significant inefficiencies related to the treatment of fixed terrain with such areas. However, being limited to a hybrid of relational space and fixed terrain maps is inferior to fluid terrain.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied. Such computers referenced and/or described in this disclosure may be any kind of computer, either general purpose, or some specific purpose computer such as, but not limited to, a workstation, a mainframe, GPU, ASIC, etc. The programs may be written in C, or Java, Brew or any other suitable programming language. The programs may be resident on a storage medium, e.g., magnetic or optical, e.g., without limitation, the computer hard drive, a removable disk or media such as, without limitation, a memory stick or SD media, or other removable medium. The programs may also be run over a network, for example, with a server or other machine sending signals to the local machine, which allows the local machine to carry out the operations described herein.

Figure 33:
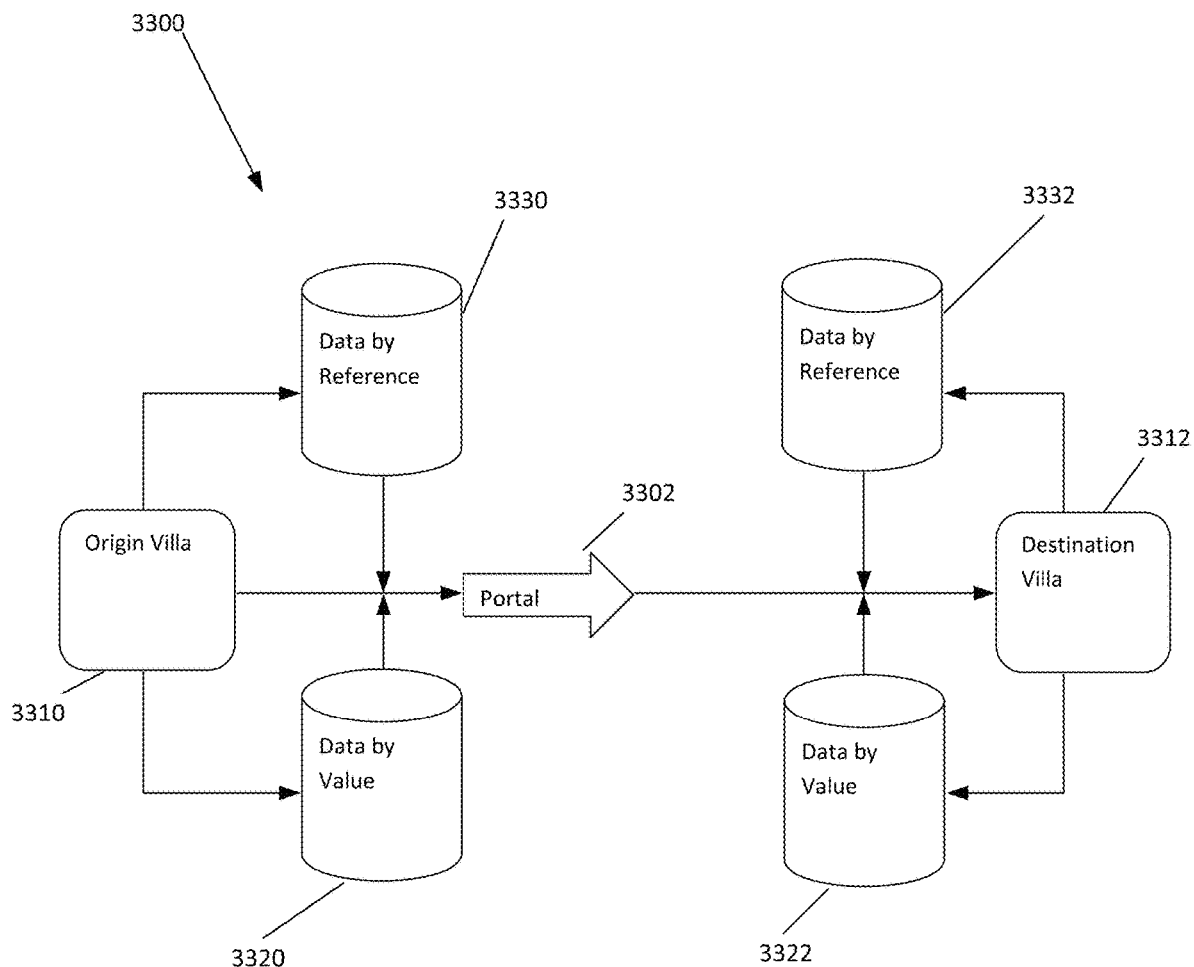
FIG. 33 illustrates an exemplary portal that allows a user to move from an origin villa to a destination villa and bring data from the origin villa and bring data from the destination villa to alter the environment, in accordance with an embodiment of the present invention.

FIG. 33 illustrates an exemplary portal that allows a user to move from an origin villa to a destination villa and bring data from the origin villa and bring data from the destination villa to alter the environment, in accordance with an embodiment of the present invention. Portals 3302 are a specialized form of (unidirectional) relation between two villas 3310, 3312. Relational space system 3300 in FIG. 33 enables data for the origin villa 3310 to be modified and then passed on through the portal 3302 to the destination villa 3312. Relational space allows a user visiting origin villa 3310 (Affiliated Villa) to easily move to destination villa 3312 (Primary Villa), and in most cases, without special arrangement (other than placing one villa near another). But there are some cases where specific data (from origin villa 3310 and/or destination villa 3312) is part of the transfer between the villas, allowing additional functionality. This data may be data by value 3320, 3322. Portals 3302 provide prearranged data enabled movement from one specific villa to another, which assist villas in monetizing the value of their relations. Note, that data by reference 3330, 3332 can be ReadOnly or ReadWrite (which would allow the other villa to make changes to the database).

Portal Example—Retail Affiliates

A major online retailer with a sophisticated platform allows affiliates to sell their products by directing customers from the Affiliate villa (origin villa 3310) to the Retailer villa (destination villa 3312). The Affiliate villa (origin villa 3310) passes data by reference 3330, providing a database of merchandise, price, and discount information to the portal 3302. The Retailer villa (destination villa 3312) could also pass data by reference 3332, such as a database containing information related to this specific Affiliate, including commissions, shipping charges and discounts that may be different for this Affiliate from other Affiliates.

Portal Example—Dungeon Game

A popular dungeon game runs from a villa (destination villa 3312). It has a ten level dungeon, each level with its own map, and a database of monsters which can be encountered, and a database of equipment available to players. The game allows users to enter from directly from its own villa (destination villa 3312), but also solicits and encourages entry from affiliated villas (origin villa 3310), which have their own user base and communities. In this example, users entering from the origin villa 3310 might have a special map or monster list passed to destination villa 3312, causing customized play of the game. This model allows the destination villa to develop and provide a popular game, but solicits numerous origin villas such as 3310 to create customized style of play and organize their own user communities, to the benefit of villas on both sides of the portal.

In the simplest case, very little data might be passed from the affiliated villa (origin villa 3310), perhaps nothing more than the affiliated villa identity. In such a case, dungeon villa (destination villa 3312) could track entries and usage from the affiliated villa (destination villa 3312) in order to pay a commission to the affiliate for directing its users. The dungeon villa (destination villa 3312) might choose to segregate users based on their affiliate villa (origin villa 3310), so that only users entering from origin villa 3310 would be able to interact with users from origin villa 3310, and the same for destination villa 3312, and other villas, etc. This would allow students from a grade school to play separately from adults in a low security prison.

In more complex cases, origin villa 3310 could specify a database 3330 of equipment items or monsters that would be allowed (or excluded) from use by players entering from that villa 3310. Affiliated villas might even provide an entirely different set of maps for a different dungeon, so that owners of associated villas could create a customized dungeon for their users, without needing to recreate the infrastructure of the dungeon on their own.

Portals 3302 allow primary villas to profit from the creative control and ownership of their own villas, but expand their influence and business by cooperating with affiliated villas. The affiliated villas maintain control and ownership of the real estate and communities they create and manage, but expand functionality and profitability by synergistic relationships with primary villas offering complementary services for their users. Portals 3302 assist both villas in monetizing the value of their relation.

Portal Example—Social Media Platform

A dominant social media provider has a villa (destination villa 3312) providing message boards, photos, videos, live chat and personal messaging. A high school uses its portal 3302 to the media provider for announcements, class related message boards, and coordinate school events and clubs. The school passes data defining its clubs, events and message boards and also takes full advantage of access control, to be sure that students are protected from interaction with unwelcome adults.

A large consumer products company places a huge priority on brand promotion and advertising, but also emphasizes strong customer relations and post purchase support. They use the portal 3302 to pass a large amount of specialized data 3320, 3330 including icons, symbols and videos related to their marketing, but also have distinctive layout requirements splitting their presentation of product information, message and chat boards, etc. over numerous different "pages" and interactive venues which are supported by the social media villa. This gives the company a unique platform tailored to its needs. Of course, the consumer products company pays more to tap all of this highly specialized functionality from the social media villa, but far less than they would to try to develop on their own. Numerous small entities and individual users would have their own portals 3302 to the same social media villa, but they would generally use a smaller subset of functions, most of which would typically be offered for free (although quite possibly supported by advertising and other revenue streams not paid directly by individual users).

Figure 34:
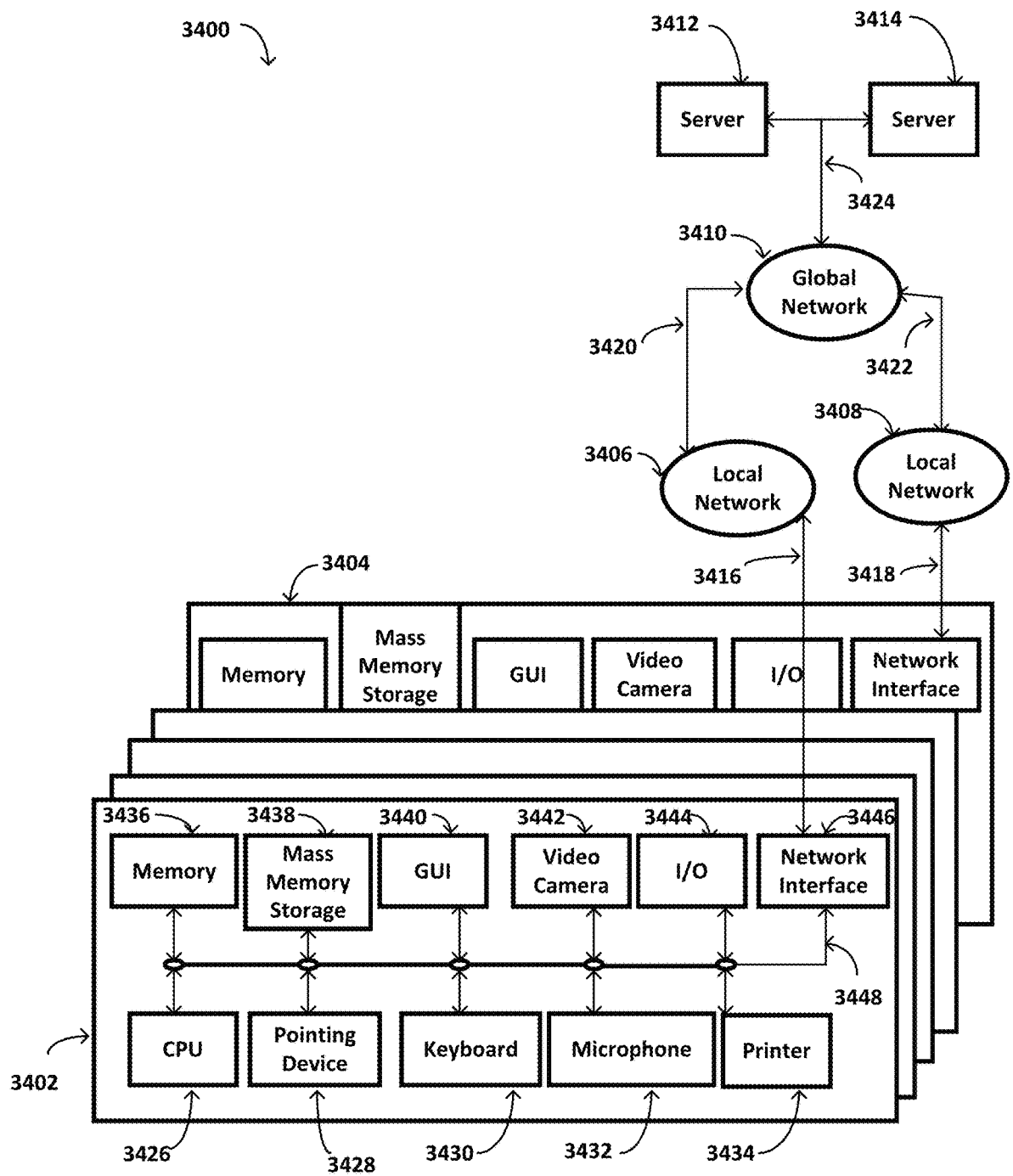
FIG. 34 illustrates an exemplary block diagram depicting an example client/server system that may be used by an example web-enabled/networked embodiment of the present invention.

FIG. 34 is a block diagram depicting an exemplary client/server system which may be used by an exemplary web-enabled/networked embodiment of the present invention. A communication system 3400 includes a multiplicity of clients with a sampling of clients denoted as a client 3402 and a client 3404, a multiplicity of local networks with a sampling of networks denoted as a local network 3406 and a local network 3408, a global network 3410 and a multiplicity of servers with a sampling of servers denoted as a server 3412 and a server 3414.

Client 3402 may communicate bi-directionally with local network 3406 via a communication channel 3416. Client 3404 may communicate bi-directionally with local network 3408 via a communication channel 3418. Local network 3406 may communicate bi-directionally with global network 3410 via a communication channel 3420. Local network 3408 may communicate bi-directionally with global network 3410 via a communication channel 3422. Global network 3410 may communicate bi-directionally with server 3412 and server 3414 via a communication channel 3424. Server 3412 and server 3414 may communicate bi-directionally with each other via communication channel 3424. Furthermore, clients 3402, 3404, local networks 3406, 3408, global network 3410 and servers 3412, 3414 may each communicate bi-directionally with each other.

In one embodiment, global network 3410 may operate as the Internet. It will be understood by those skilled in the art that communication system 3400 may take many different forms. Non-limiting examples of forms for communication system 3400 include local area networks (LANs), wide area networks (WANs), wired telephone networks, wireless networks, or any other network supporting data communication between respective entities.

Clients 3402 and 3404 may take many different forms. Non-limiting examples of clients 3402 and 3404 include personal computers, personal digital assistants (PDAs), cellular phones and smartphones.

Client 3402 includes a CPU 3426, a pointing device 3428, a keyboard 3430, a microphone 3432, a printer 3434, a memory 3436, a mass memory storage 3438, a GUI 3440, a video camera 3442, an input/output interface 3444 and a network interface 3446.

CPU 3426, pointing device 3428, keyboard 3430, microphone 3432, printer 3434, memory 3436, mass memory storage 3438, GUI 3440, video camera 3442, input/output interface 3444 and network interface 3446 may communicate in a unidirectional manner or a bi-directional manner with each other via a communication channel 3448. Communication channel 3448 may be configured as a single communication channel or a multiplicity of communication channels.

CPU 3426 may be comprised of a single processor or multiple processors. CPU 3426 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 3436 is used typically to transfer data and instructions to CPU 3426 in a bi-directional manner. Memory 3436, as discussed previously, may include any suitable computer-readable media, intended for data storage, such as those described above excluding any wired or wireless transmissions unless specifically noted. Mass memory storage 3438 may also be coupled bi-directionally to CPU 3426 and provides additional data storage capacity and may include any of the computer-readable media described above. Mass memory storage 3438 may be used to store programs, data and the like and is typically a secondary storage medium such as a hard disk. It will be appreciated that the information retained within mass memory storage 3438, may, in appropriate cases, be incorporated in standard fashion as part of memory 3436 as virtual memory.

CPU 3426 may be coupled to GUI 3440. GUI 3440 enables a user to view the operation of computer operating system and software. CPU 3426 may be coupled to pointing device 3428. Non-limiting examples of pointing device 3428 include computer mouse, trackball and touchpad. Pointing device 3428 enables a user with the capability to maneuver a computer cursor about the viewing area of GUI 3440 and select areas or features in the viewing area of GUI 3440. CPU 3426 may be coupled to keyboard 3430. Keyboard 3430 enables a user with the capability to input alphanumeric textual information to CPU 3426. CPU 3426 may be coupled to microphone 3432. Microphone 3432 enables audio produced by a user to be recorded, processed and communicated by CPU 3426. CPU 3426 may be connected to printer 3434. Printer 3434 enables a user with the capability to print information to a sheet of paper. CPU 3426 may be connected to video camera 3442. Video camera 3442 enables video produced or captured by user to be recorded, processed and communicated by CPU 3426.

CPU 3426 may also be coupled to input/output interface 3444 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 3426 optionally may be coupled to network interface 3446 which enables communication with an external device such as a database or a computer or telecommunications or internet network using an external connection shown generally as communication channel 3416, which may be implemented as a hardwired or wireless communications link using suitable conventional technologies. With such a connection, CPU 3426 might receive information from the network, or might output information to a network in the course of performing the method steps described in the teachings of the present invention.

Figure 35:
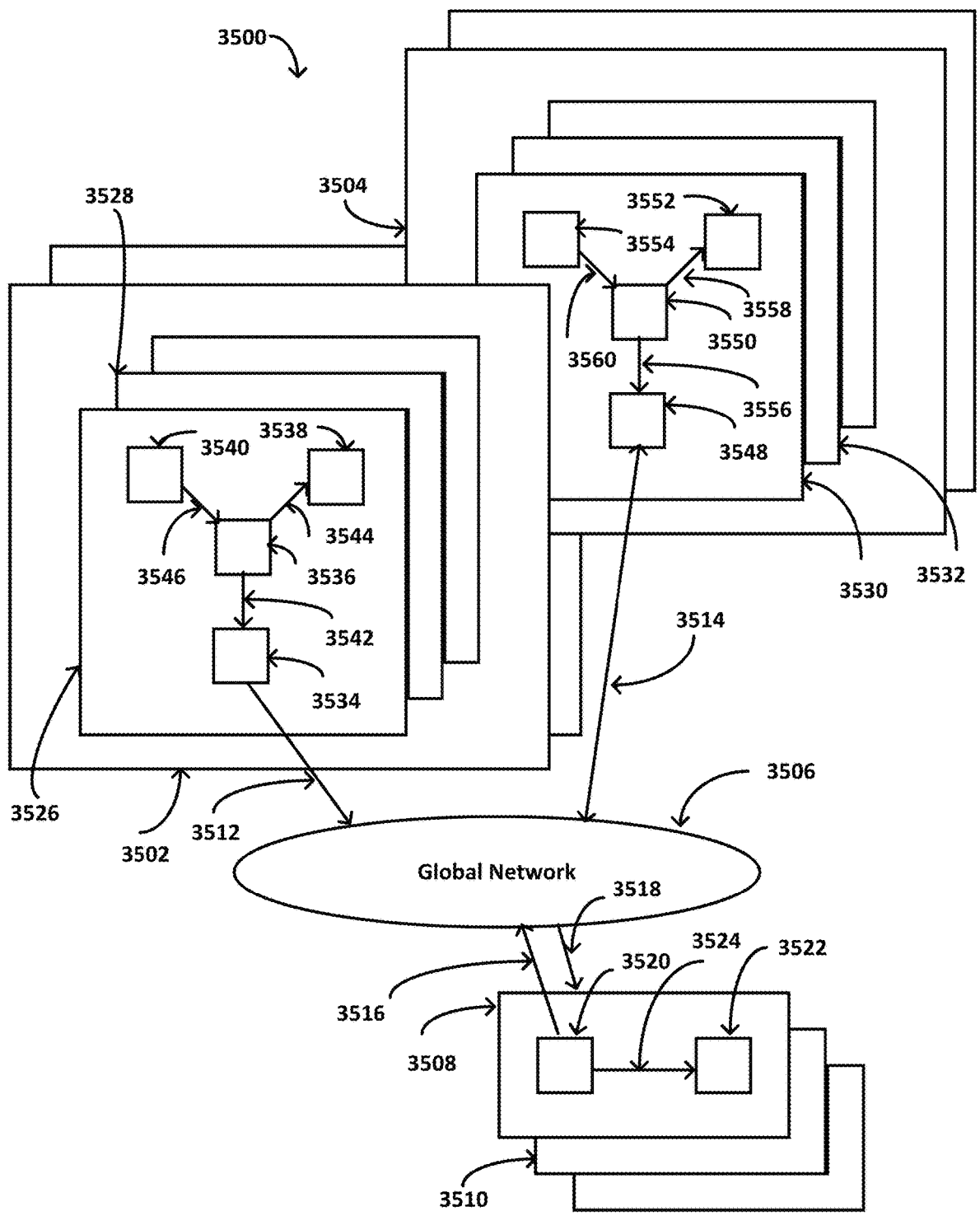
FIG. 35 illustrates an exemplary block diagram depicting an example client/server communication system that may be used for a cryptographic security system using data partitioning and configurable key-based encryption and/or decryption in accordance with an embodiment of the present invention.

FIG. 35 illustrates an exemplary block diagram depicting an example client/server communication system that may be used for a cryptographic security system using data partitioning and configurable key-based encryption and/or decryption in accordance with an embodiment of the present invention. A communication system 3500 includes a multiplicity of networked regions with a sampling of regions denoted as a network region 3502 and a network region 3504, a global network 3506 and a multiplicity of servers with a sampling of servers denoted as a server device 3508 and a server device 3510.

Network region 3502 and network region 3504 may operate to represent a network contained within a geographical area or region. Non-limiting examples of representations for the geographical areas for the networked regions may include postal zip codes, telephone area codes, states, counties, cities and countries. Elements within network region 3502 and 3504 may operate to communicate with external elements within other networked regions or within elements contained within the same network region.

In some implementations, global network 3506 may operate as the Internet. It will be understood by those skilled in the art that communication system 3500 may take many different forms. Non-limiting examples of forms for communication system 3500 include local area networks (LANs), wide area networks (WANs), wired telephone networks, cellular telephone networks or any other network supporting data communication between respective entities via hardwired or wireless communication networks. Global network 3506 may operate to transfer information between the various networked elements.

Server device 3508 and server device 3510 may operate to execute software instructions, store information, support database operations and communicate with other networked elements. Non-limiting examples of software and scripting languages which may be executed on server device 3508 and server device 3510 include C, C++, C# and Java.

Network region 3502 may operate to communicate bi-directionally with global network 3506 via a communication channel 3512. Network region 3504 may operate to communicate bi-directionally with global network 3506 via a communication channel 3514. Server device 3508 may operate to communicate bi-directionally with global network 3506 via a communication channel 3516. Server device 3510 may operate to communicate bi-directionally with global network 3506 via a communication channel 3518. Network region 3502 and 3504, global network 3506 and server devices 3508 and 3510 may operate to communicate with each other and with every other networked device located within communication system 3500.

Server device 3508 includes a networking device 3520 and a server 3522. Networking device 3520 may operate to communicate bi-directionally with global network 3506 via communication channel 3516 and with server 3522 via a communication channel 3524. Server 3522 may operate to execute software instructions and store information.

Network region 3502 includes a multiplicity of clients with a sampling denoted as a client 3526 and a client 3528. Client 3526 includes a networking device 3534, a processor 3536, a GUI 3538 and an interface device 3540. Non-limiting examples of devices for GUI 3538 include monitors, televisions, cellular telephones, smartphones and PDAs (Personal Digital Assistants). Non-limiting examples of interface device 3540 include pointing device, mouse, trackball, scanner and printer. Networking device 3534 may communicate bi-directionally with global network 3506 via communication channel 3512 and with processor 3536 via a communication channel 3542. GUI 3538 may receive information from processor 3536 via a communication channel 3544 for presentation to a user for viewing. Interface device 3540 may operate to send control information to processor 3536 and to receive information from processor 3536 via a communication channel 3546. Network region 3504 includes a multiplicity of clients with a sampling denoted as a client 3530 and a client 3532. Client 3530 includes a networking device 3548, a processor 3550, a GUI 3552 and an interface device 3554. Non-limiting examples of devices for GUI 3538 include monitors, televisions, cellular telephones, smartphones and PDAs (Personal Digital Assistants). Non-limiting examples of interface device 3540 include pointing devices, mousse, trackballs, scanners and printers. Networking device 3548 may communicate bi-directionally with global network 3506 via communication channel 3514 and with processor 3550 via a communication channel 3556. GUI 3552 may receive information from processor 3550 via a communication channel 3558 for presentation to a user for viewing. Interface device 3554 may operate to send control information to processor 3550 and to receive information from processor 3550 via a communication channel 3560.

For example, consider the case where a user interfacing with client 3526 may want to execute a networked application. A user may enter the IP (Internet Protocol) address for the networked application using interface device 3540. The IP address information may be communicated to processor 3536 via communication channel 3546. Processor 3536 may then communicate the IP address information to networking device 3534 via communication channel 3542. Networking device 3534 may then communicate the IP address information to global network 3506 via communication channel 3512. Global network 3506 may then communicate the IP address information to networking device 3520 of server device 3508 via communication channel 3516. Networking device 3520 may then communicate the IP address information to server 3522 via communication channel 3524. Server 3522 may receive the IP address information and after processing the IP address information may communicate return information to networking device 3520 via communication channel 3524. Networking device 3520 may communicate the return information to global network 3506 via communication channel 3516. Global network 3506 may communicate the return information to networking device 3534 via communication channel 3512. Networking device 3534 may communicate the return information to processor 3536 via communication channel 3542. Processor 3536 may communicate the return information to GUI 3538 via communication channel 3544. User may then view the return information on GUI 3538.

Figure 36:
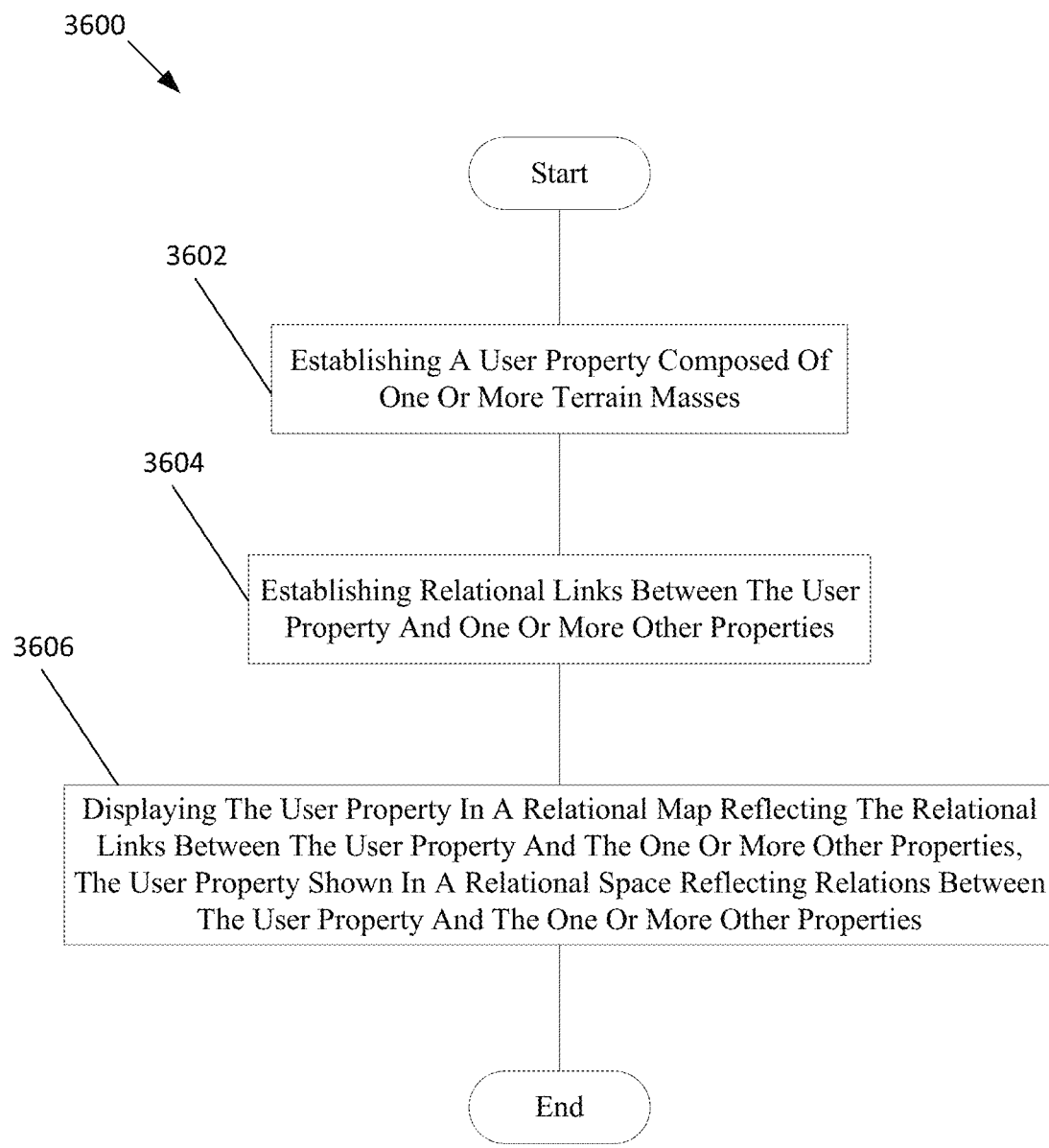
FIG. 36 is a flowchart of an exemplary method of provisioning virtual objects in a relational space of a virtual environment in accordance with an embodiment of the present invention.

FIG. 36 is a flowchart of an exemplary method of provisioning virtual objects in a relational space of a virtual environment in accordance with an embodiment of the present invention. A user property is composed of one or more terrain masses 3602. Relational links are established between the user property and one or more other properties 3604. The user property is displayed in a relational map reflecting the relational links between the user property and the one or more other properties, the user property in a relational space reflecting relations between the user property and the one or more other properties 3606. The one or more terrain masses may include tiles that formed without fixed positions to form a fluid terrain. The form of the fluid terrain and relational links reflect changeable social relationships. The user property may be formed with a relation with the one or more other properties having a related interest. A portal may be formed between the user property and a destination property to allow data to be passed and/or changed in the user property and/or the destination property when a user moves from the user property to the destination property. The relational map may show relations of the user property with the one or more other properties and provides a user-navigable virtual map with numerous user owned properties that exist in a relational space reflecting user relationships.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6)/(f) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6) pre-AIA or 35 USC § 112 (f) post AIA. In some embodiments, the methods and/or system components which may be located and/or performed remotely include, without limitation: any one or more of the system and/or method of use thereof related to the creation and/or maintenance of relational virtual worlds to accommodate intense social interaction pursuant to individual user demands and/or desires, where the content and/or context of each individual representation (e.g., a villa) thereof remains distinct and substantially free from influence of surrounding representations (e.g., associated villas), etc.

It is noted that according to USA law, all claims must be set forth as a coherent, cooperating set of limitations that work in functional combination to achieve a useful result as a whole. Accordingly, for any claim having functional limitations interpreted under 35 USC § 112 (6)/(f) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6)/(f) is/(are) dependent on one or more remote servers located outside the USA, it is intended that each such recited function under 35 USC § 112 (6)/(f) is to be interpreted as the function of the local system receiving the remotely generated information required by a locally implemented claim limitation, wherein the structures and or steps which enable, and breathe life into the expression of such functions claimed under 35 USC § 112 (6)/(f) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present patent application, and "35 USC § 112 (6)/(f)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing virtual definition of terrain in multi-dimensional space based on social relationships relative to adjacent and/or other virtual terrain by sacrificing rigid adherence to traditional fixed terrain as implemented in relational databases according to the present invention will be apparent to those skilled in the art. Various aspects of the invention have been described above by way of illustration, and the specific embodiments disclosed are not intended to limit the invention to the particular forms disclosed. The particular implementation of the virtual definition of terrain in multi-dimensional space based on social relationships relative to adjacent and/or other virtual terrain may vary depending upon the particular context or application.

By way of example, and not limitation, the virtual definition of terrain in multi-dimensional space based on social relationships relative to adjacent and/or other virtual terrain described in the foregoing were principally directed to individual human user implementations; however, similar techniques may instead be applied to groups, institutions, corporation, and/or other business entities, which implementations of the present invention are contemplated as within the scope of the present invention. For clarity, villas (e.g., user online homes) have been described as having space occupying terrain similar to the structure and function of conventional real estate. This may be a useful and familiar construct, but is not the only representation of user owned space, property or "real estate" that may be supported by the disclosed embodiments.

Other possibilities could include websites, applications, games, browser modules with programmable function, etc. By way of example and not limitation, villas may be described as "user owned property", one example could include terrain and tiles as described. Similarly, we have described our relational maps and views in a logical and familiar way, with our property (e.g., the center of attention) in the center of the map with physical structure and function, and our interests/associated villas arrayed around it in concentric circles with the more interesting villas placed more centrally and possibly shown larger.

However, other layouts and/or configurations may also be possible. For instance, a less aesthetically pleasing and less familiar design for Susie's villa may include a simple list of the associations with her villa. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre AIA) or 35 USC 112(f) post-AIA. Otherwise, no limitations from the specification are to be read into any claims, unless those limitations are expressly included in the claims.

What is claimed is:

1. A method, executed by one or more processors, for providing a relational terrain, the method comprising the following steps:
    establishing a user villa configured with one or more tiled terrain masses;
    establishing relational links between the user villa and one or more other villas, wherein said relational links are non-spatial links connecting one or more villa to another villa or tile, thereby establishing said relational terrain that is inherently not a dimensional or spatial mapping; and
    displaying the user villa in a relational map reflecting the relational links between the user villa and the one or more other villas.

2. The method of claim 1, wherein a villa owner may customize the structure and function of the relational map for the benefit of visitors to the user villa, related villas and the villa owner.

3. The method of claim 1, in which a tile from a tiled terrain mass comprises a number of positional elements.

4. The method of claim 1, wherein a tile from a tiled terrain mass may contain a partial or complete copy of another tile, wherein the copied tile can be potentially modified and improved in its new location so that one improvement can build on another and propagate throughout the system.

5. The method of claim 1, in which an outgoing relational link to a villa can be a "Tile Inclusion by Reference" to directly display a related reference tile in the map of the relating villa, potentially with all of its associated villas and interaction.

6. The method of claim 1, in which each villa may have multiple central and satellite tiles.

7. The method of claim 1, wherein a villa owner may present a subset of a villa's tiles suitable for a purpose called a Persona, in which the villa owner can present different Personas to different villa users based their shared interests.

8. The method of claim 1, in which a tile is a structural and functional unit, which may be formed (as a mosaic) from multiple smaller positional elements or tiles, wherein the splitting of complex structure/function into multiple simpler tiles allows these simpler tiles to be reused elsewhere, in different combinations to allow for more complex meaning/functionality and flexibility in relational terrain, given its fluid and recombinant nature.

9. The method of claim 1, allowing a user villa multiple simultaneous locations, and designing the user villa to best meet needs of owner and visitor to enable a "user centric internet" where each user can see the world as it relates to his interests and social interaction, all centered around his own villa.

10. The method of claim 1, in which the user villa is the center of all of the social contacts, interactions and creativity of the villa owner to allows a "unified identity" for the villa owner in his own villa.

11. The method of claim 1, allowing a villa owner to place functionality directly in the user villa using positional elements or tiles for software as a service to create a model to decentralize communication, content creation and interaction away from large monolithic websites, wherein the user selects which services to place in the user villa, rather than the websites compelling the expression and behavior of the villa owner.

12. A system for providing a relational terrain, comprising:

a memory for storing data defining one or more central tiles for a user villa;

a processor for establishing said user villa such that said user villa is at least operational as a virtual root space for a user in a virtual world, that a user controls and may customize, and is configured with one or more terrain masses, wherein said processor is further configured to process the one or more central tiles, establishing relational links between the user villa and one or more adjacent villas, wherein said relational links are non-spatial links connecting one or more villa to another villa or tile, thereby establishing said relational terrain that is inherently not a dimensional or spatial mapping;

processing the one or more central tiles and the one or more adjacent tiles to form a villa linked with the user, and establishing the villa of the user in a relational map defining relations of the user villa and the one or more adjacent villas; and a graphic user interface (GUI) for displaying the user villa in the relational map showing relations of the user villa with the one or more adjacent villas.

13. A non-transitory computer-readable storage medium with an executable program stored thereon, wherein the program instructs one or more processors to perform a method for providing a relational terrain, the method comprising the steps:

establishing a user villa such that is at least operational as a virtual root space for a user, that a user controls and may customize, and is configured with one or more terrain masses;

establishing one or more central tiles for said user villa;

establishing relational links between the user villa and one or more other villas, wherein said relational links are non-spatial links connecting one or more villa to another villa or tile, thereby establishing said relational terrain that is inherently not a dimensional or spatial mapping; and displaying the user villa in a relational map showing relations of the user villa with the one or more other villas.

* * * * *